(12) United States Patent
Hui et al.

(10) Patent No.: US 12,295,025 B2
(45) Date of Patent: May 6, 2025

(54) WIRELESS RESOURCE SELECTION

(71) Applicant: Comcast Cable Communications, LLC, Philadelphia, PA (US)

(72) Inventors: Bing Hui, Herndon, VA (US); Esmael Hejazi Dinan, McLean, VA (US); Yunjung Yi, Vienna, VA (US); Hyukjin Chae, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 391 days.

(21) Appl. No.: 18/053,903

(22) Filed: Nov. 9, 2022

(65) Prior Publication Data

US 2023/0080200 A1 Mar. 16, 2023

Related U.S. Application Data

(63) Continuation of application No. 17/219,983, filed on Apr. 1, 2021, now Pat. No. 12,101,799.

(60) Provisional application No. 63/007,730, filed on Apr. 9, 2020, provisional application No. 63/004,716, filed on Apr. 3, 2020.

(51) Int. Cl.
*H04W 72/56* (2023.01)
*H04W 72/20* (2023.01)
*H04W 72/542* (2023.01)

(52) U.S. Cl.
CPC ........... *H04W 72/56* (2023.01); *H04W 72/20* (2023.01); *H04W 72/542* (2023.01)

(58) Field of Classification Search
CPC .... H04W 72/56; H04W 72/20; H04W 72/542
See application file for complete search history.

(56) References Cited

U.S. PATENT DOCUMENTS

| | | |
|---|---|---|
| 2018/0270801 A1 | 9/2018 | Novlan et al. |
| 2020/0100215 A1 | 3/2020 | Li et al. |
| 2020/0214016 A1 | 7/2020 | Dong et al. |
| 2020/0235848 A1 | 7/2020 | Nguyen et al. |
| 2020/0337067 A1 | 10/2020 | Chae et al. |
| 2021/0007081 A1 | 1/2021 | Shin et al. |
| 2021/0219320 A1 | 7/2021 | Belleschi et al. |
| 2022/0060929 A1 | 2/2022 | Hassan et al. |
| 2022/0078805 A1 | 3/2022 | Yoshioka et al. |
| 2022/0123904 A1 | 4/2022 | Wang et al. |

(Continued)

FOREIGN PATENT DOCUMENTS

| | | |
|---|---|---|
| EP | 3179794 A1 | 6/2017 |
| EP | 3211959 A1 | 8/2017 |
| EP | 3346740 A1 | 7/2018 |

(Continued)

OTHER PUBLICATIONS

Mediatek Inc. "Discussion on Physical Layer Pricedure" 3GPP TSG RAN WG1 #96, Athens, Greece, Feb. 25-Mar. 1, 2019.

(Continued)

*Primary Examiner* — Won Tae C Kim
(74) *Attorney, Agent, or Firm* — Banner & Witcoff, Ltd.

(57) ABSTRACT

Wireless resources may be determined for communications between wireless devices. A wireless device may select resources based on measuring one or more channels (e.g., associated with sidelink transmission, feedback transmission, etc.). Resource selection may comprise exclusion of certain resources being used for other communications and/ or exclusion or selection of resources based on one or more priorities.

24 Claims, 48 Drawing Sheets

(56) References Cited

U.S. PATENT DOCUMENTS

2022/0394560 A1  12/2022  Yu et al.

FOREIGN PATENT DOCUMENTS

| WO | 2016017099 A1 | 2/2016 |
| --- | --- | --- |
| WO | 2020011336 A1 | 1/2020 |
| WO | 2020017939 A1 | 1/2020 |
| WO | 2020068973 A1 | 4/2020 |
| WO | 2020145223 A1 | 7/2020 |
| WO | 2020210333 A1 | 10/2020 |

OTHER PUBLICATIONS

Sep. 3, 2021—European Search Report—EP 21166695.3.
R1-2001138 3GPP TSG RAN WG1 Meeting #100-E, e-Meeting, Feb. 24-Mar. 6, 2020, Source: Intel Corporation, Title: FL summary of critical issues for 7.2.4.2.2—V2X Mode 2.
R1-2001009 3GPP TSG RAN WG1 Meeting #100-e, e-Meeting, Feb. 24-Mar. 6, 2020, Source: Ericsson, Title: Resource allocation Mode 2 for NR SL.
R1-2001006 3GPP TSG RAN WG1 Meeting #100, e-Meeting, Feb. 24-28, 2020, Source: ITL, Title: Remain details on mode-2 resource allocation for NR V2X.
R1-2000996 3GPP TSG RAN WG1 Meeting #100, e-Meeting, Feb. 24-Mar. 6, 2020, Source: ASUSTeK, Title: Remaining issue for Mode 2 resource allocation in NR V2X.
R1-2000963 3GPP TSG RAN WG1 Meeting #100-e, Feb. 24-Mar. 6, 2020, Source: Qualcomm Incorporated, Title: Sidelink Resource Allocation Mechanism for NR V2X.
R1-2000916 3GPP TSG RAN WG1 Meeting #100, e-Meeting, Feb. 24-Mar. 6, 2020, Source: NTT Docomo, Inc., Title: Remaining issues on resource allocation mechanism mode 2.
R1-2000905 3GPP TSG RAN WG1 Meeting #100, Athens, Greece, Feb. 24-28, 2020, Source: AT&T, Title: Remaining details of resource allocation mode-2 for NR sidelink.
R1-2000852 3GPP TSG RAN WG1 Meeting #100-e, e-Meeting, Feb. 24-Mar. 6, 2020, Source: Apple, Title: Remaining Details on Resource Allocation for Mode 2.
R1-2000836 3GPP TSG RAN WG1 Meeting #100, e-Meeting, Feb. 24-Mar. 6, 2020, Source: InterDigital, Inc., Title: Remaining Issues on NR Sidelink Mode 2 Resource Allocation.
R1-2000783 3GPP TSG RAN WG1 Meeting #100, e-Meeting, Feb. 24-Mar. 6, 2020, Source: LG Electronics, Title: Discussion on resource allocation for Mode 2.
R1-2000731 3GPP TSG RAN WG1 Meeting #100-E, e-Meeting, Feb. 24-Mar. 6, 2020, Source: Intel Corporation, Title: Remaining opens of resource allocation mode-2 for NR V2X design.
R1-2000695 3GPP TSG RAN WG1 Meeting #100-e, e-Meeting, Feb. 24-Mar. 6, 2020, Source: ITRI, Title: Remaining Issues on NR Sidelink Mode 2 Resource Allocation.
R1-2000617 3GPP TSG RAN WG1 Meeting #100, e-Meeting, Feb. 24-Mar. 6, 2020, Source: Samsung, Title: On Mode 2 for NR Sidelink.
R1-2000566 3GPP TSG RAN WG1 Meeting #100-e, e-Meeting, Feb. 24-Mar. 6, 2020, Source: FUTUREWEI, Title: Remaining details on mode-2 resource allocation.
R1-2000547 3GPP TSG RAN WG1 Meeting #100, e-Meeting, Feb. 24-Mar. 6, 2020, Source: Fujitsu, Title: Remaining details on mode 2 resource allocation for NR V2X.
R1-2000542 3GPP TSG RAN WG1 Meeting #100, E-Meeting, Feb. 24-Mar. 6, 2020, Source: Panasonic, Title: Remaining Issues on Sidelink Mode 2 Resource Allocation.
R1-2000522 3GPP TSG RAN WG1 Meeting #100, e-Meeting, Feb. 24-Mar. 6, 2020, Source: CATT, Title: Remaining issues on Mode 2 resource allocation in NR V2X.
R1-2000493 3GPP TSG RAN WG1 Meeting #100e, e-Meeting, Feb. 24-Mar. 6, 2020, Source: OPPO, Title: Discussion on remaining open issue for mode 2.
R1-2000447 3GPP TSG RAN WG1 Meeting #100, e-Meeting, Feb. 24-Mar. 6, 2020, Source: MediaTek Inc., Title: On sidelink mode-2 resource allocation.
R1-2000430 3GPP TSG RAN WG1 Meeting #100-E, e-Meeting, Feb. 24-Mar. 6, 2020, Source: TCL Communication, Title: Resource allocation for NR sidelink—Mode 2.
R1-2000422 3GPP TSG RAN WG1 Meeting #100-e, e-Meeting, Feb. 24-Mar. 6, 2020, Source: Spreadtrum Communications, Title: Remaining issues in NR sidelink mode 2 resource allocation.
R1-2000403 3GPP TSG RAN WG1 Meeting #100-e, e-Meeting, Feb. 24-Mar. 6, 2020, Source: ZTE, Sanechips, Title: Remaining issues of mode 2 resource allocation.
R1-2000384 3GPP TSG RAN WG1 Meeting #100, Feb. 24-Mar. 6, 2020, Source: Nokia, Nokia Shanghai Bell, Title: Remaining details of resource allocation for sidelink—Mode 2.
R1-2000317 3GPP TSG RAN WG1 Meeting #100, e-Meeting, Feb. 24-Mar. 6, 2020, Source: vivo, Title: Remaining issues on mode 2 resource allocation mechanism.
R1-2000183 3GPP TSG RAN WG1 Meeting #100-e, Feb. 24-Mar. 6, 2020, Source: Huawei, HiSilicon, Title: Remaining details of sidelink resource allocation mode 2.
R1-20xxxxx 3GPP TSG RAN WG1 Meeting #100bis, Busan, Korea, Apr. 20-24, 2020, Source: MCC Support, Title: Draft Report of 3GPP TSG RAN WG1 #100-e v0.2.0 (Online meeting, Feb. 24-Mar. 6, 2020).
3GPP TSG RAN WG1 Meeting #99, Reno, USA, Nov. 18-22, 2019, Title: RAN1 Chairman's Notes.
3GPP TSG RAN WG1 Meeting #98bis, Chongqing, China, Oct. 14-20, 2019, Title: RAN1 Chairman's Notes.
3GPP TS 38.215 V16.0.0 (Dec. 2019) 3rd Generation Partnership Project; Technical Specification Group Radio Access Network; NR; Physical layer measurements (Release 16).
3GPP TS 38.214 V16.0.0 (Dec. 2019) 3rd Generation Partnership Project; Technical Specification Group Radio Access Network; NR; Physical layer procedures for data (Release 16).
3GPP TS 38.213 V16.0.0 (Dec. 2019) 3rd Generation Partnership Project; Technical Specification Group Radio Access Network; NR; Physical layer procedures for control (Release 16).
3GPP TS 38.212 V16.0.0 (Dec. 2019), 3rd Generation Partnership Project; Technical Specification Group Radio Access Network; NR; Multiplexing and channel coding (Release 16).
3GPP TS 38.211 V16.0.0 (Dec. 2019), Technical Specification, 3rd Generation Partnership Project; Technical Specification Group Radio Access Network; NR; Physical channels and modulation (Release 16).
3GPP TS 36.331 V15.8.0 (Dec. 2019), Technical Specification, 3rd Generation Partnership Project; Technical Specification Group Radio Access Network; Evolved Universal Terrestrial Radio Access (E-UTRA); Radio Resource Control (RRC); Protocol specification (Release 15).
3GPP TS 36.321 V15.8.0 (Dec. 2019), Technical Specification, 3rd Generation Partnership Project; Technical Specification Group Radio Access Network; Evolved Universal Terrestrial Radio Access (E-UTRA); Medium Access Control (MAC) protocol specification (Release 15).
3GPP TS 36.214 V16.0.0 (Dec. 2019), Technical Specification, 3rd Generation Partnership Project; Technical Specification Group Radio Access Network; Evolved Universal Terrestrial Radio Access (E-UTRA); Physical layer; Measurements (Release 16).
3GPP TS 36.212 V16.0.0 (Dec. 2019), Technical Specification, 3rd Generation Partnership Project; Technical Specification Group Radio Access Network; Evolved Universal Terrestrial Radio Access (E-UTRA); Multiplexing and channel coding (Release 16).
3GPP TS 36.213 V16.0.0 (Dec. 2019), Technical Specification, 3rd Generation Partnership Project; Technical Specification Group Radio Access Network; Evolved Universal Terrestrial Radio Access (E-UTRA); Physical layer procedures (Release 16).
3GPP TS 36.211 V16.0.0 (Dec. 2019), Technical Specification, 3rd Generation Partnership Project; Technical Specification Group Radio Access Network; Evolved Universal Terrestrial Radio Access (E-UTRA); Physical channels and modulation (Release 16).

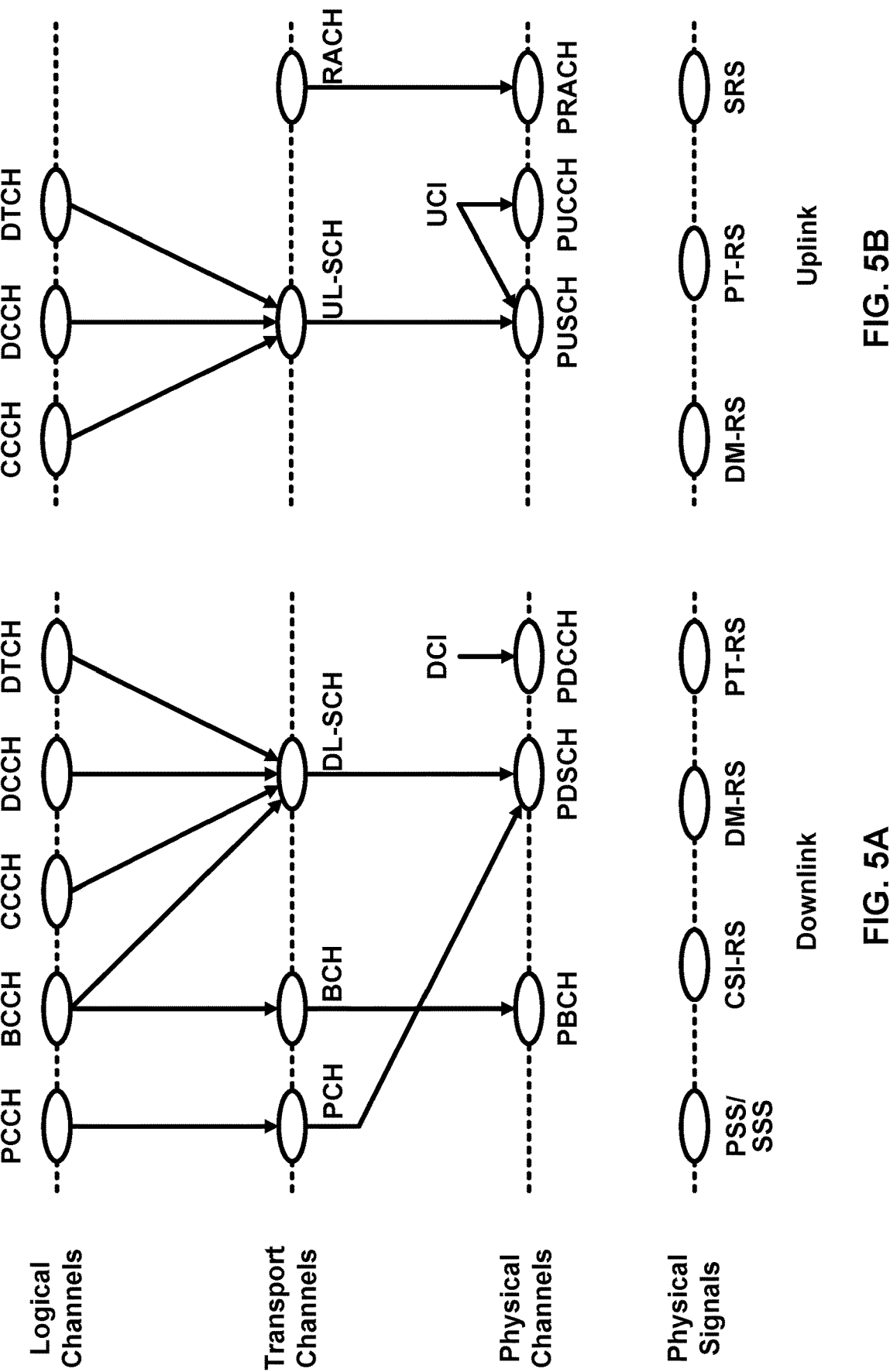

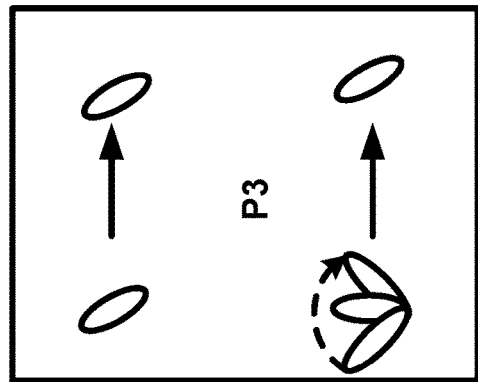
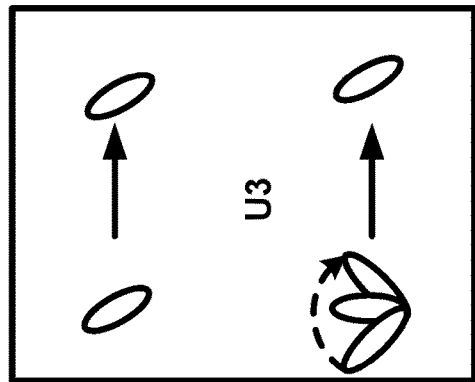
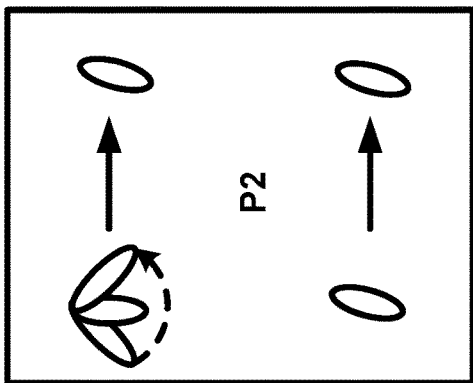
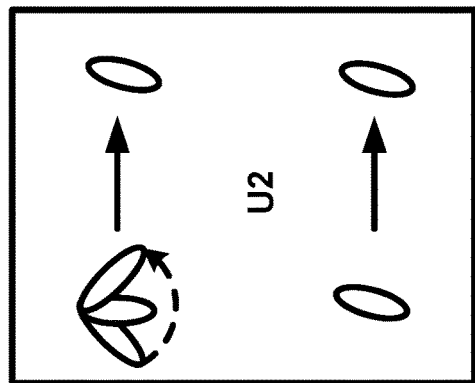
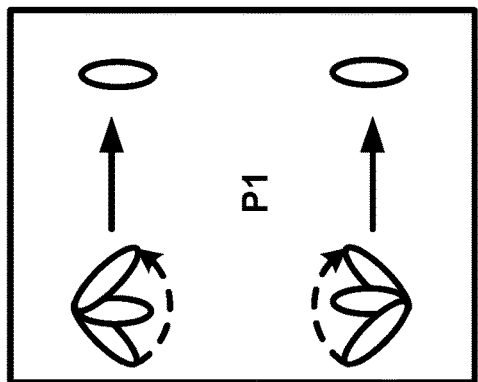
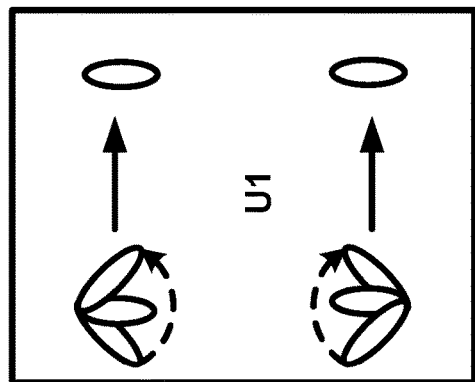
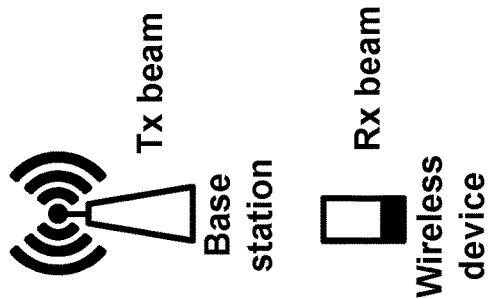
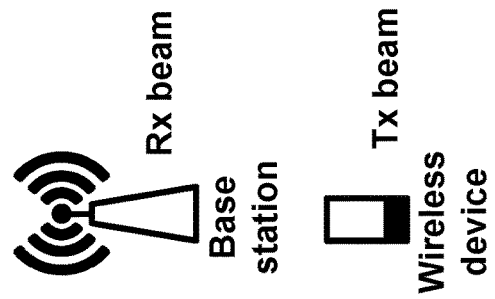
FIG. 12A
FIG. 12B

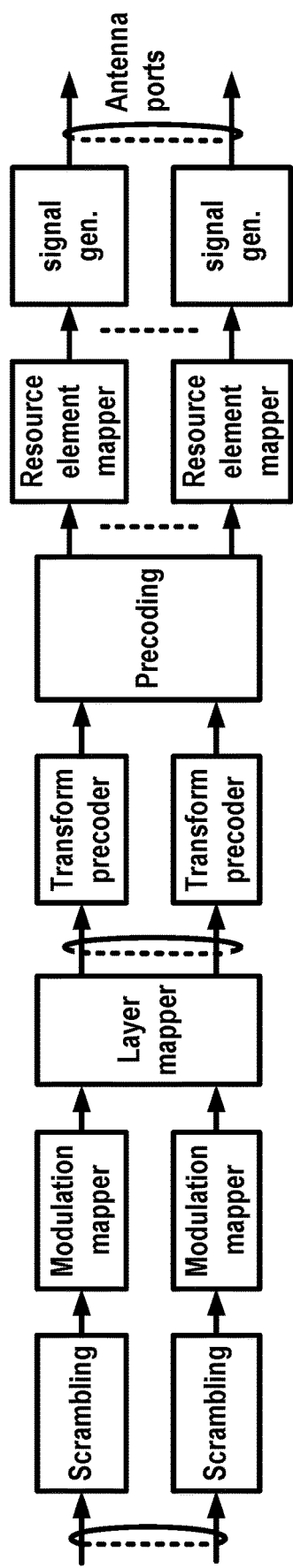
FIG. 16A
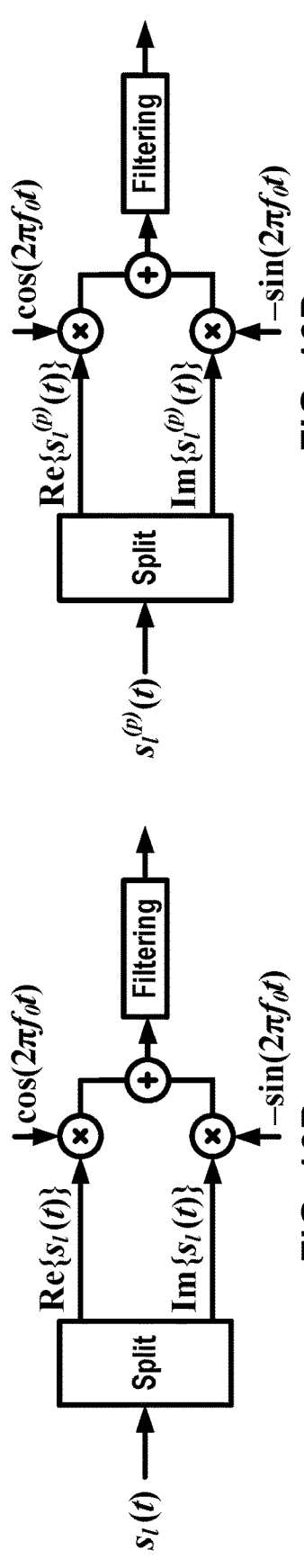
FIG. 16B
FIG. 16D
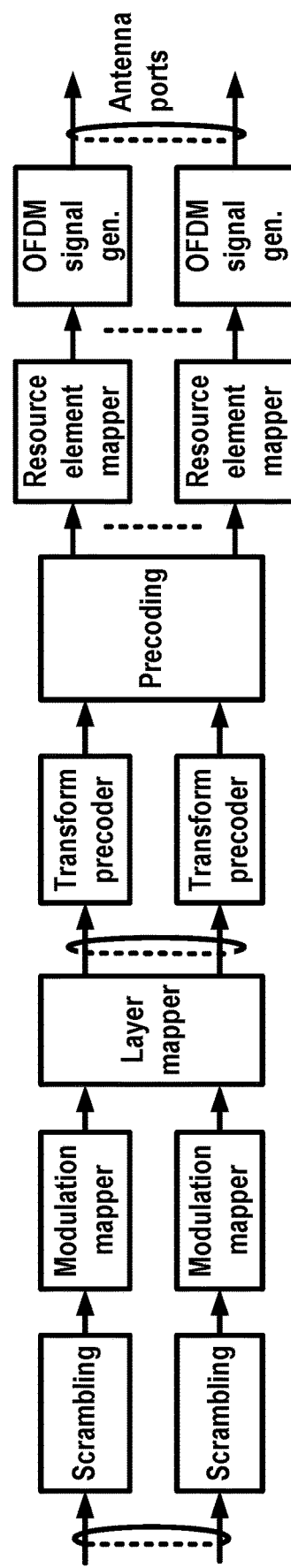
FIG. 16C

WIRELESS RESOURCE SELECTION

CROSS-REFERENCE TO RELATED APPLICATIONS

This application claims priority to and is a continuation of U.S. application Ser. No. 17/219,983, filed on Apr. 1, 2021, which claims the benefit of U.S. Provisional Application No. 63/004,716, filed on Apr. 3, 2020, and U.S. Provisional Application No. 63/007,730, filed on Apr. 9, 2020. Each of the above-referenced applications is hereby incorporated by reference in its entirety.

BACKGROUND

A base station and a wireless device communicate via uplink and/or downlink communication. A wireless device communicates with another device (e.g., other wireless devices) via sidelink communications.

SUMMARY

The following summary presents a simplified summary of certain features. The summary is not an extensive overview and is not intended to identify key or critical elements.

Wireless devices may communicate via a communication link. A wireless device may determine/select one or more wireless resources for communicating with another device (e.g., another wireless device). Selection of wireless resources may be based on excluding certain wireless resources that may already be in use or that may be reserved for other wireless communications. For example, a wireless device may exclude wireless resource(s) based on measurements associated with other communications (e.g., a sidelink transmission and/or a feedback transmission associated with the sidelink transmission) and comparing the measurements with one or more threshold values. The one or more threshold values may be based on one or more priorities associated with a communication. Wireless resource selection as described herein may provide advantages such as reduced interference, reduced power consumption, and/or reduced latency.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

DETAILED DESCRIPTION

Figure 1A:
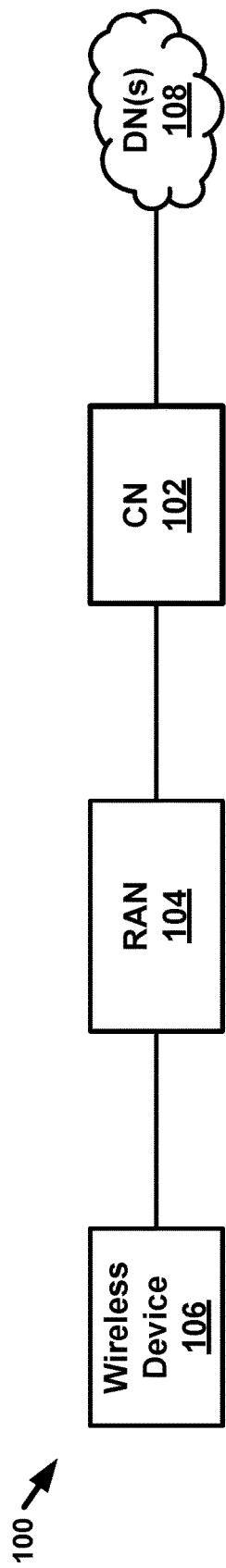
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to communications (e.g., sidelink communications) between wireless devices.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
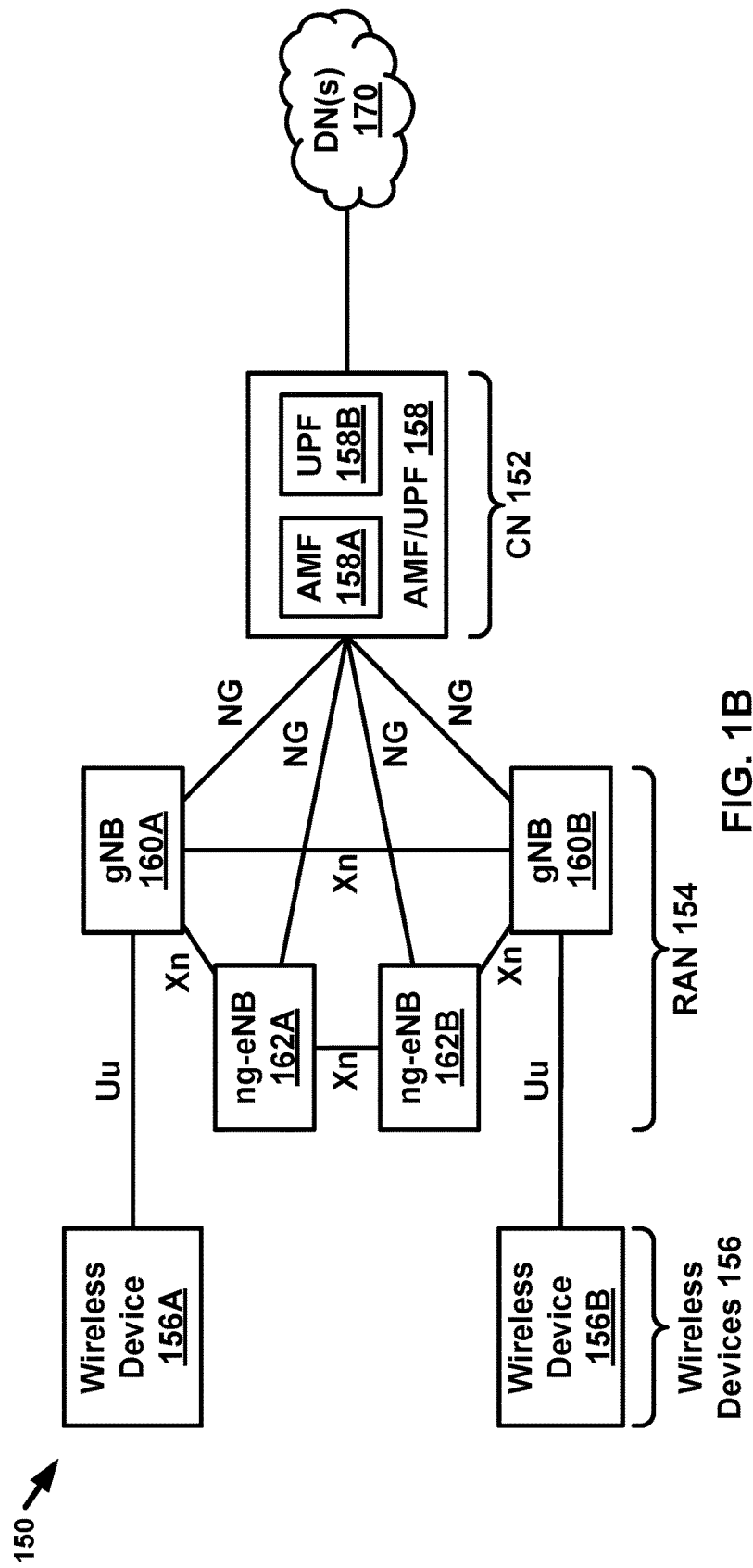

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
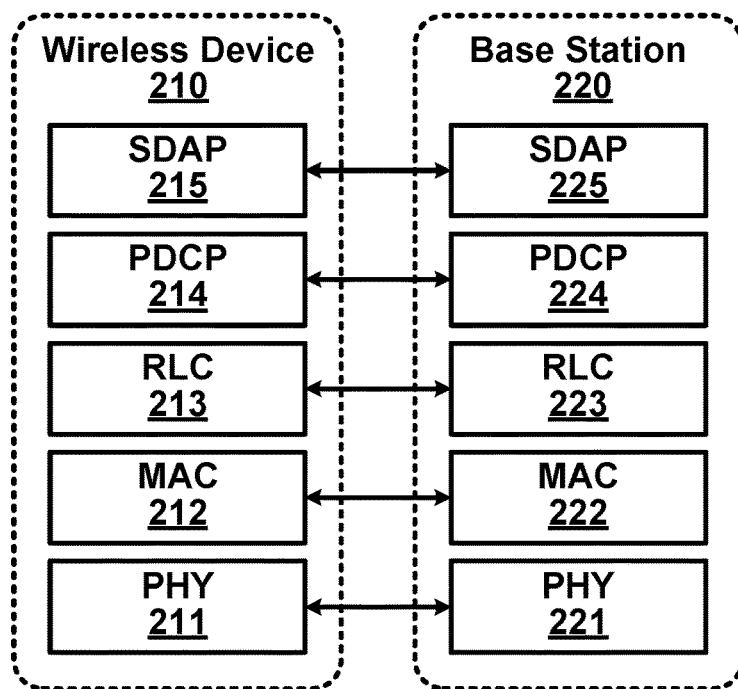
FIG. 2A shows an example user plane.
Figure 2B:
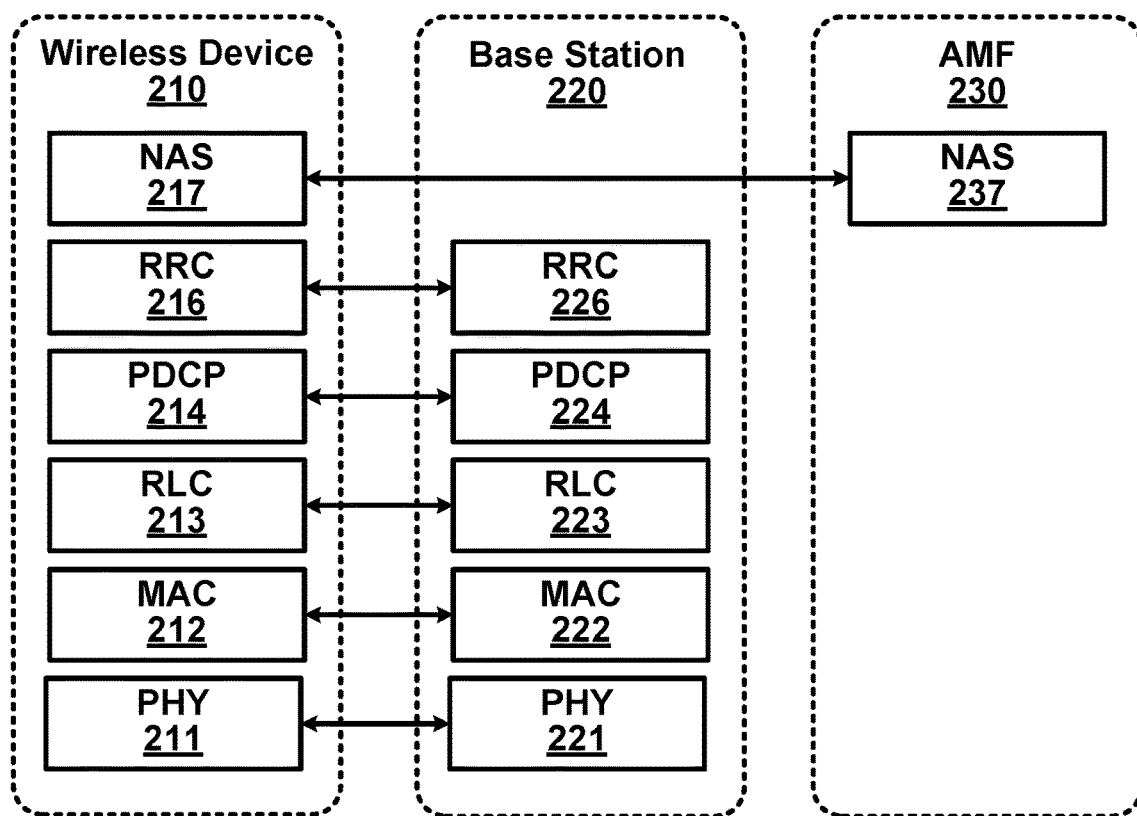
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
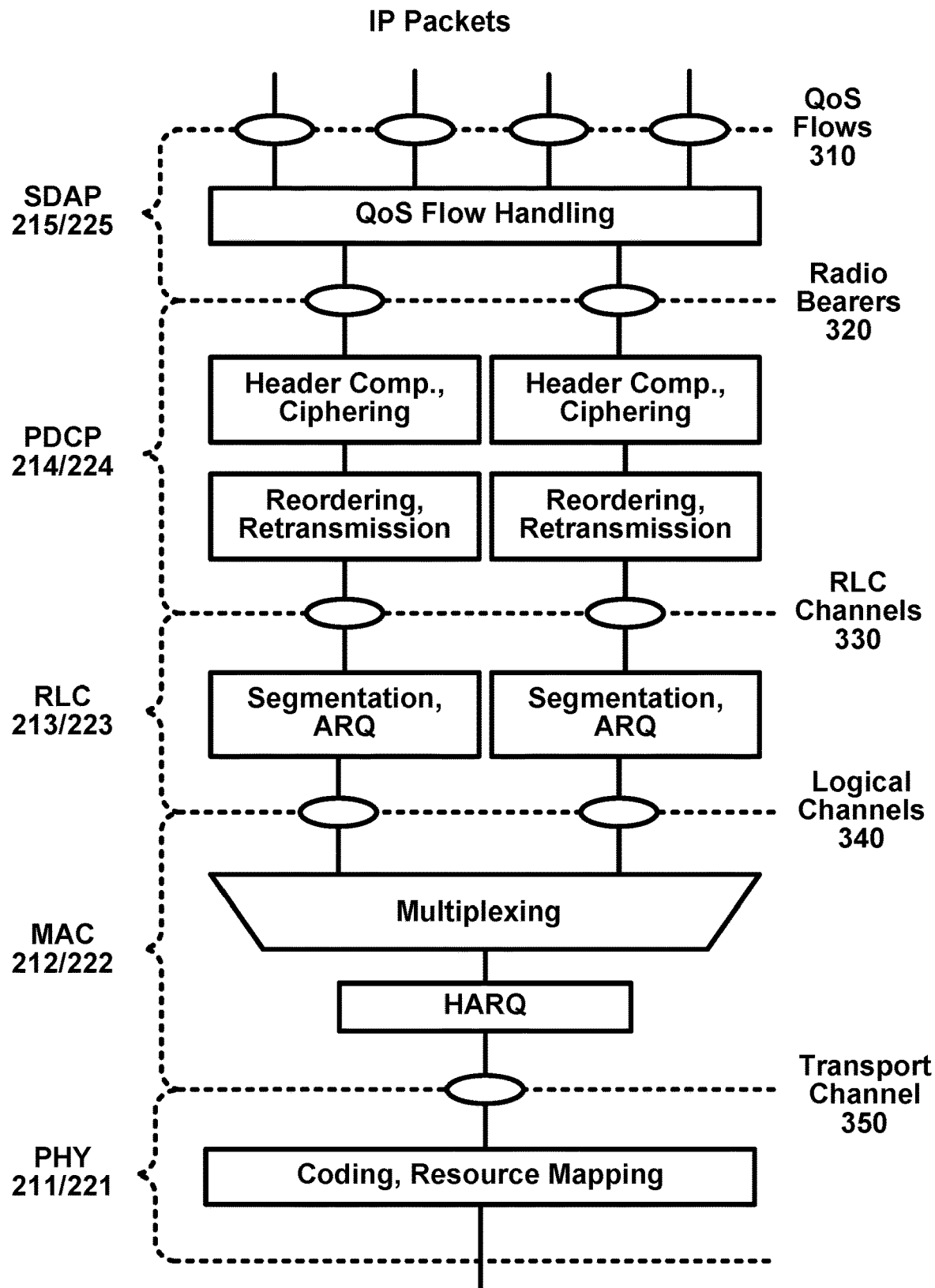
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity example/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations).

The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
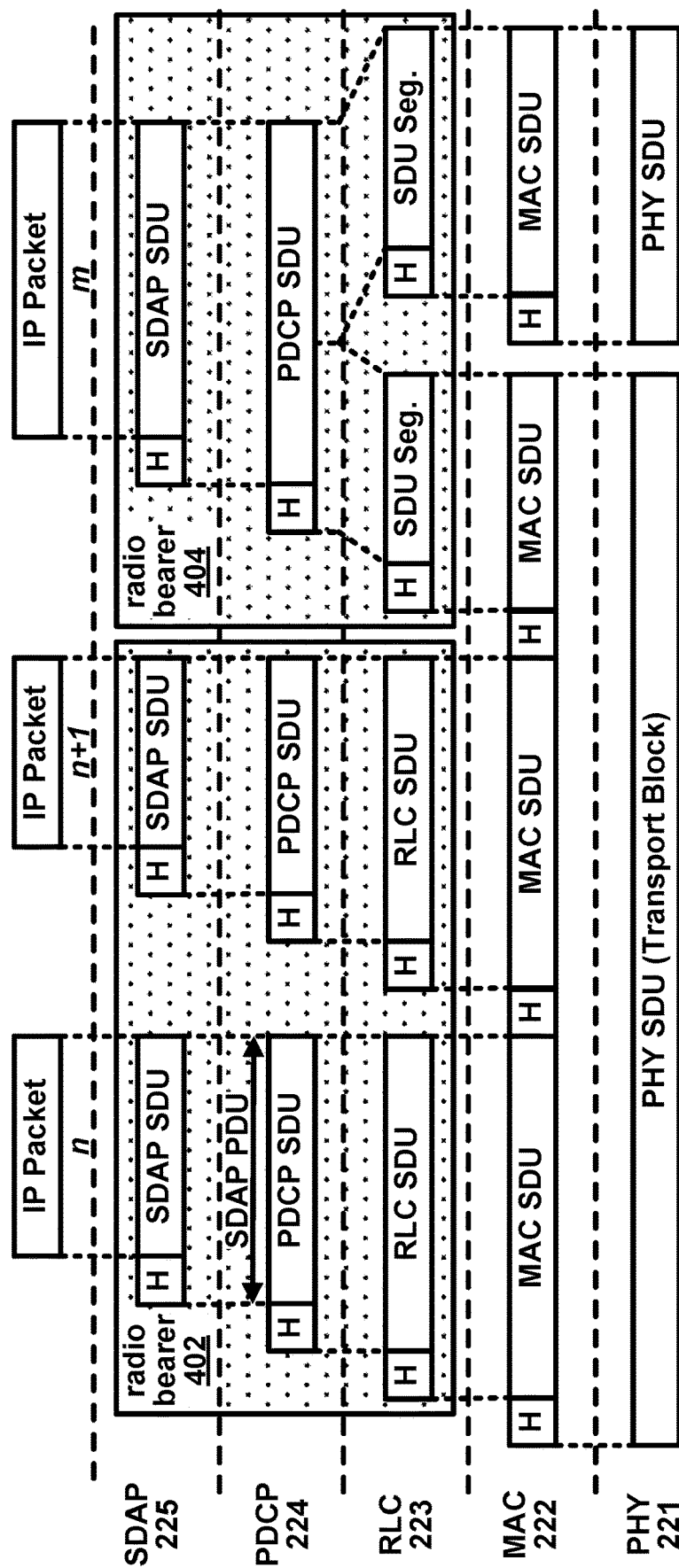
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
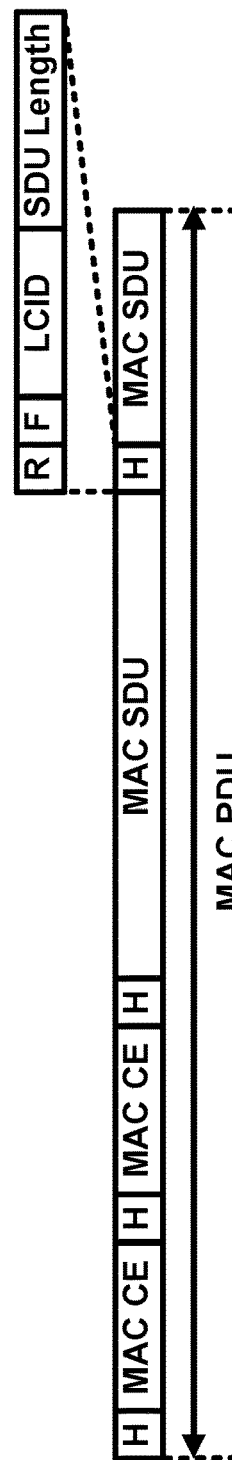
FIG. 4B shows an example format of a Medium Access Control (MAC) sub header in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
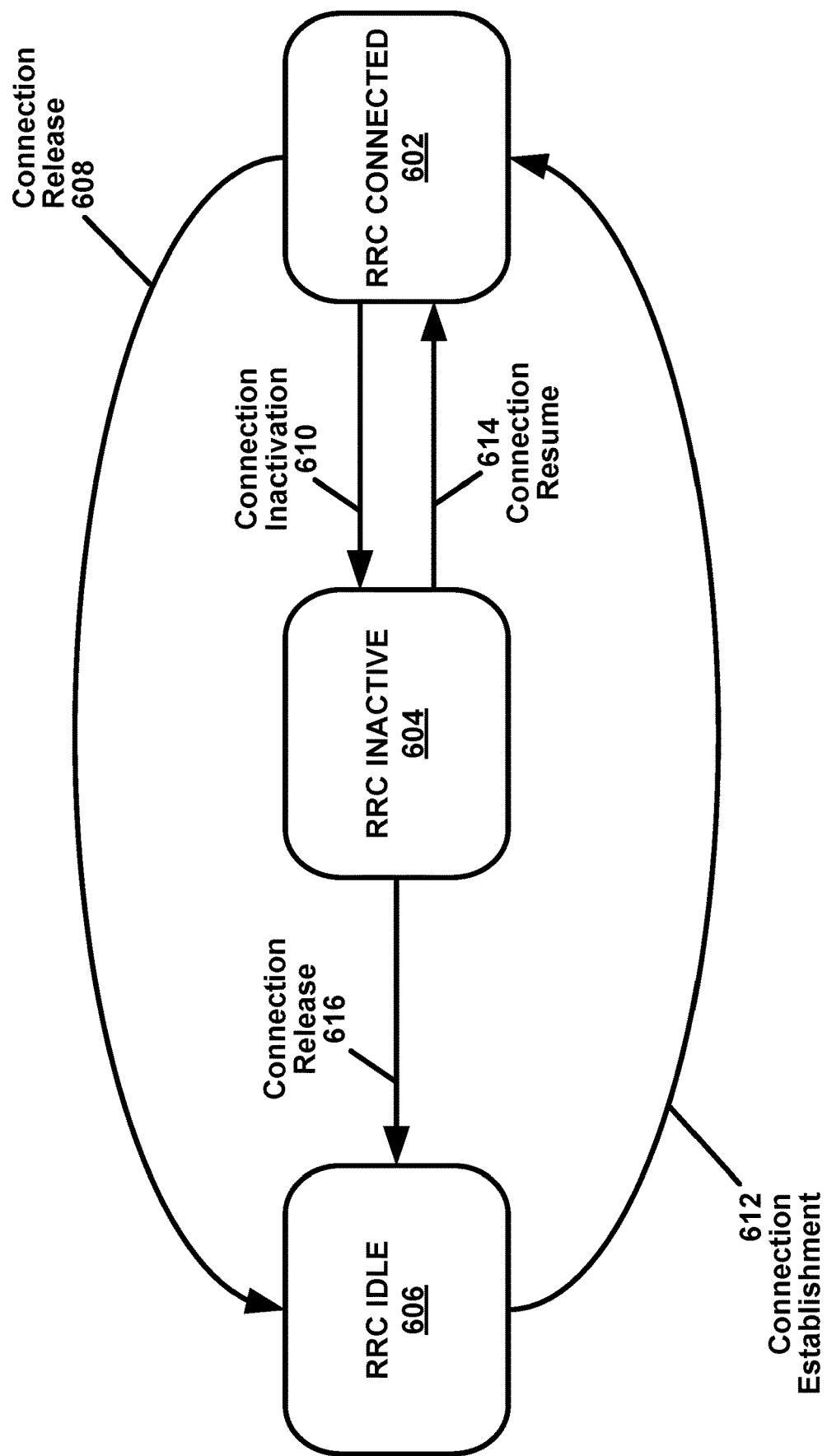
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
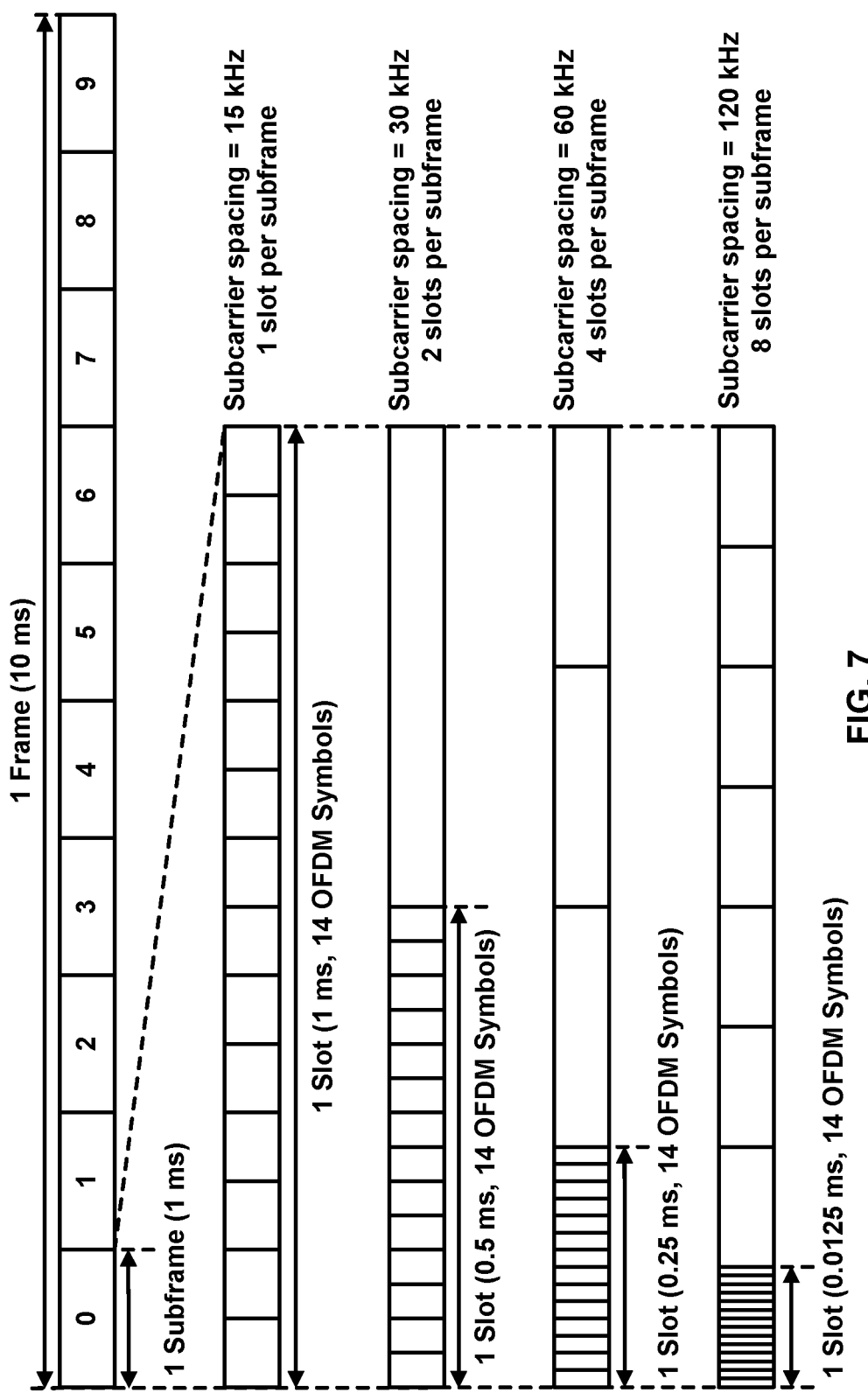
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
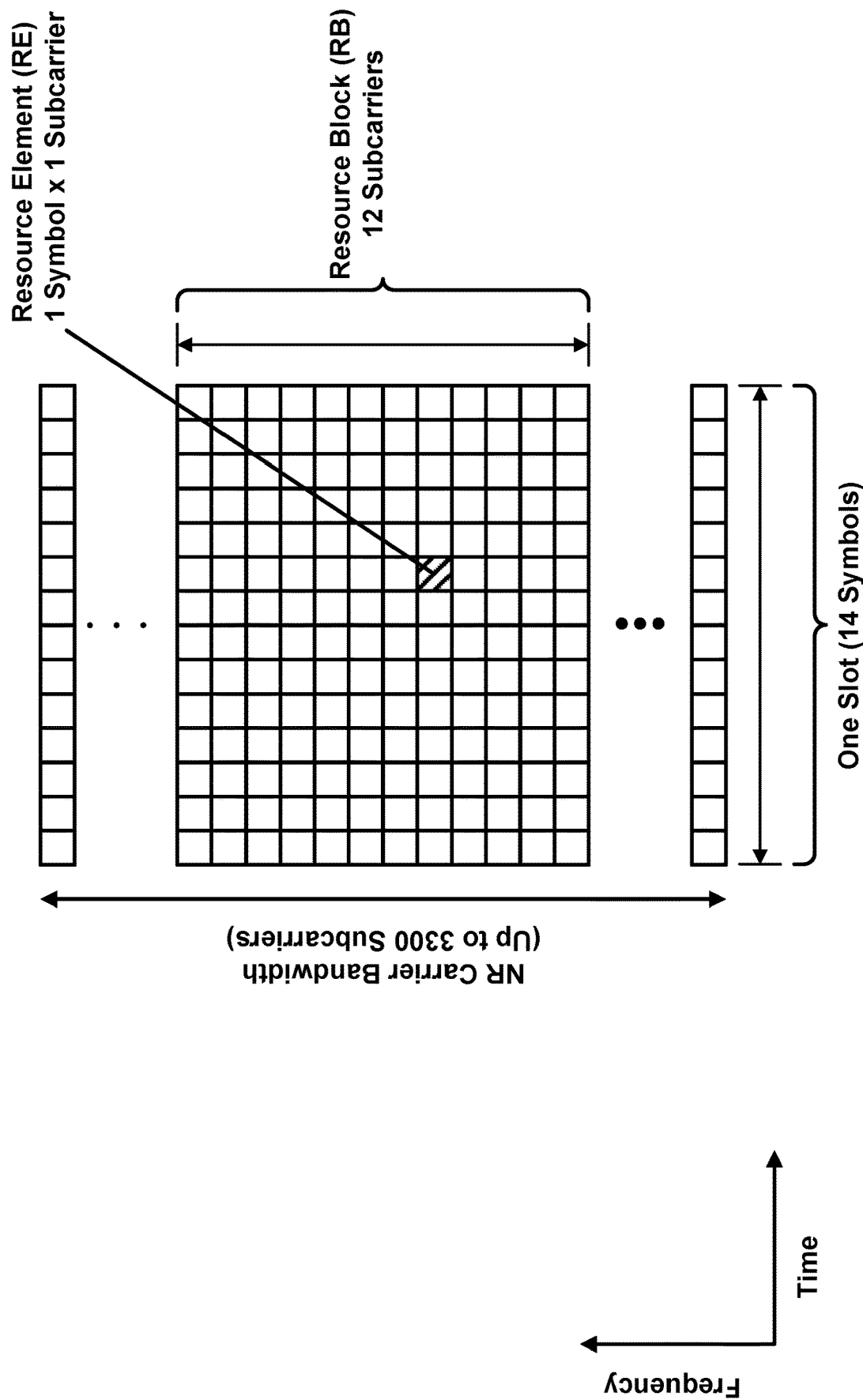
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
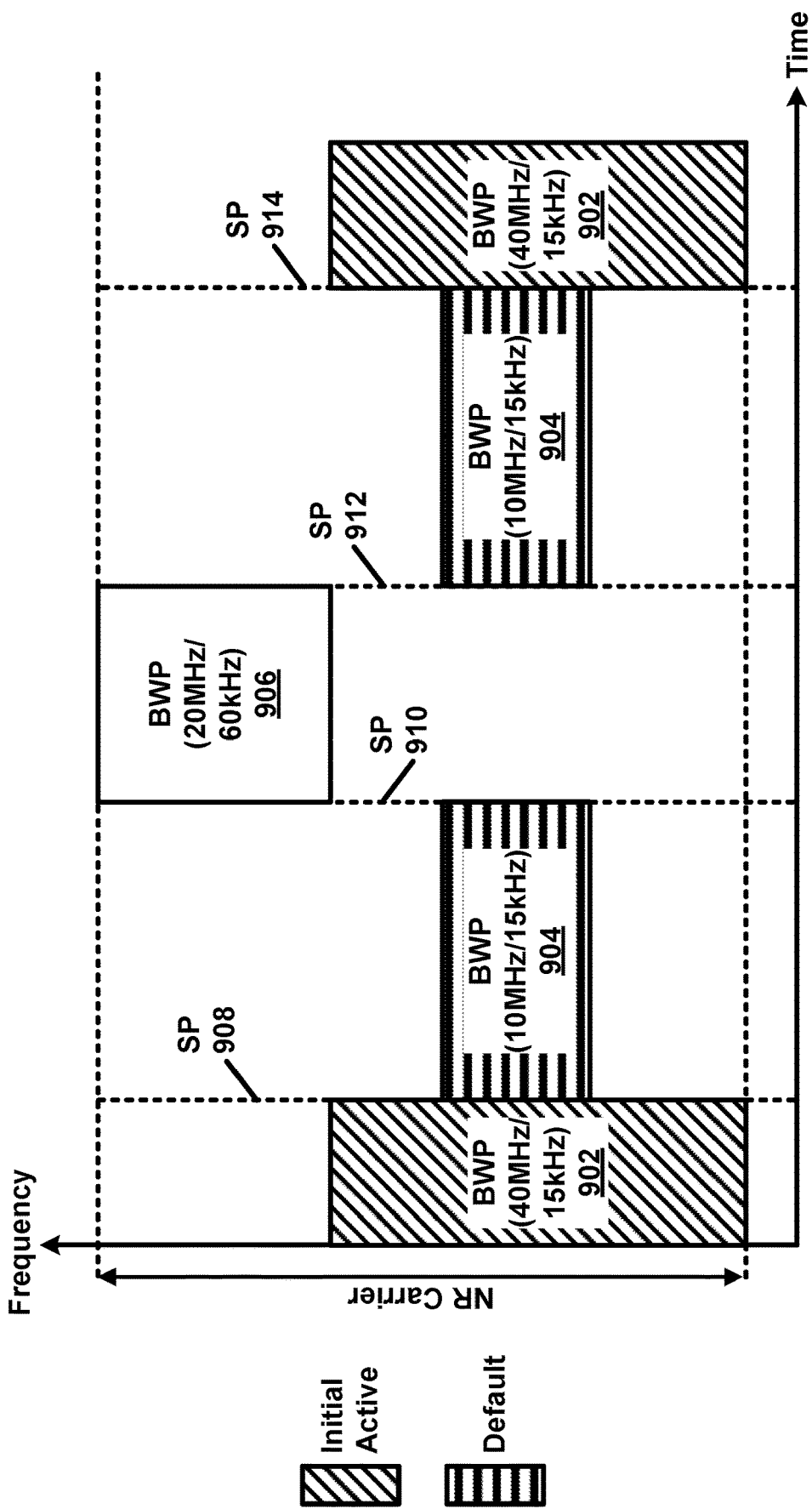
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
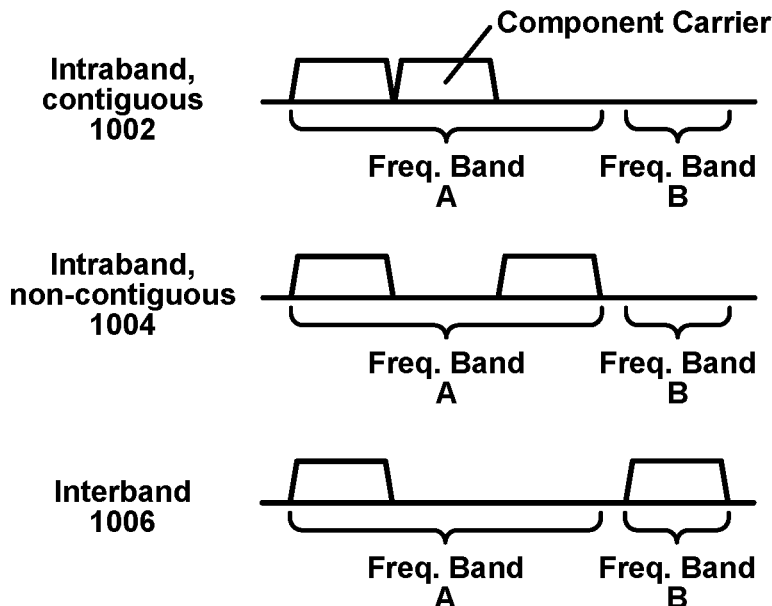
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
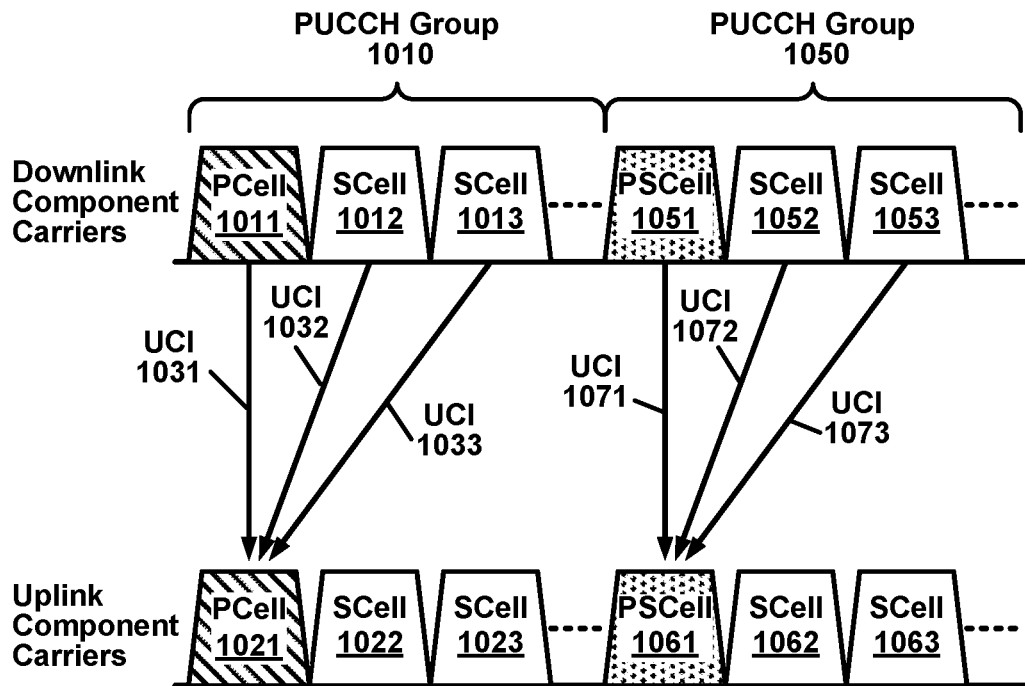
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
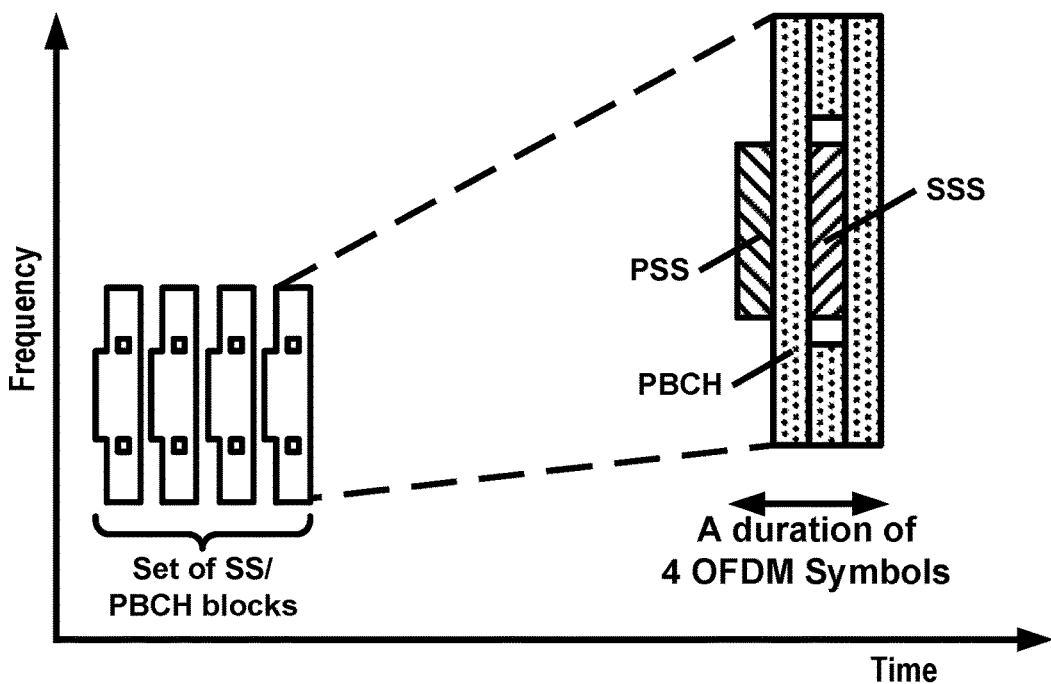
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
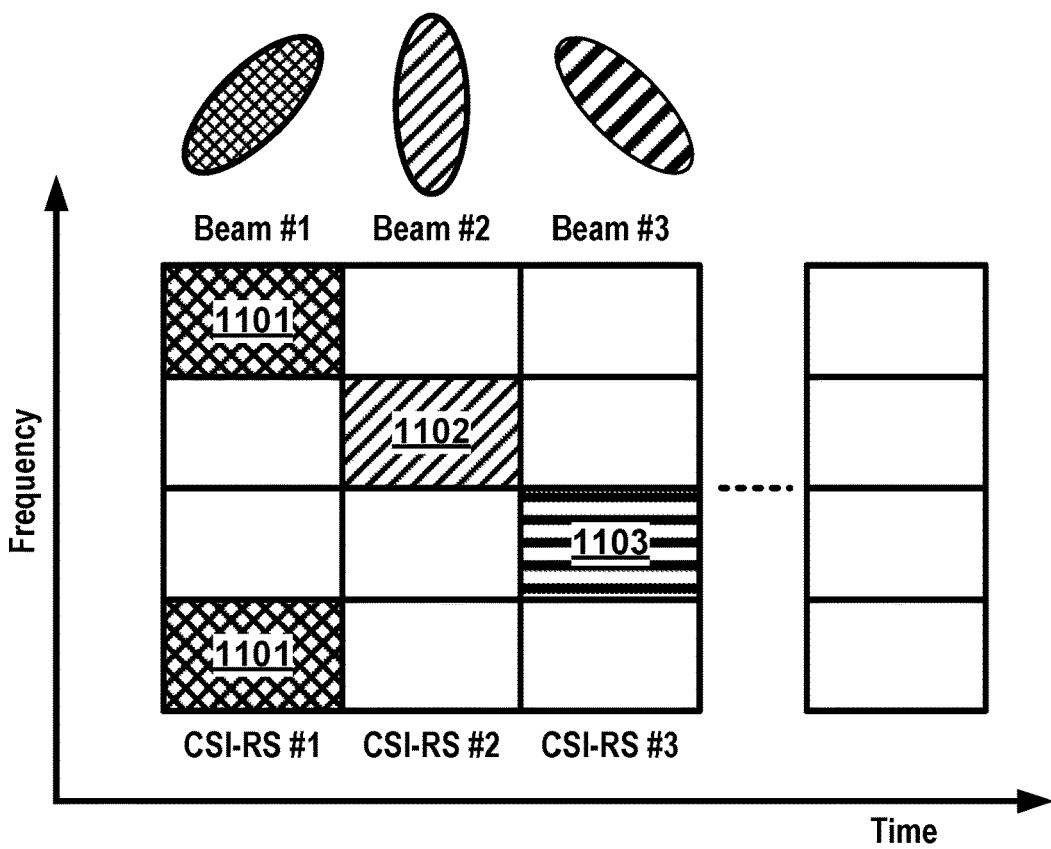
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
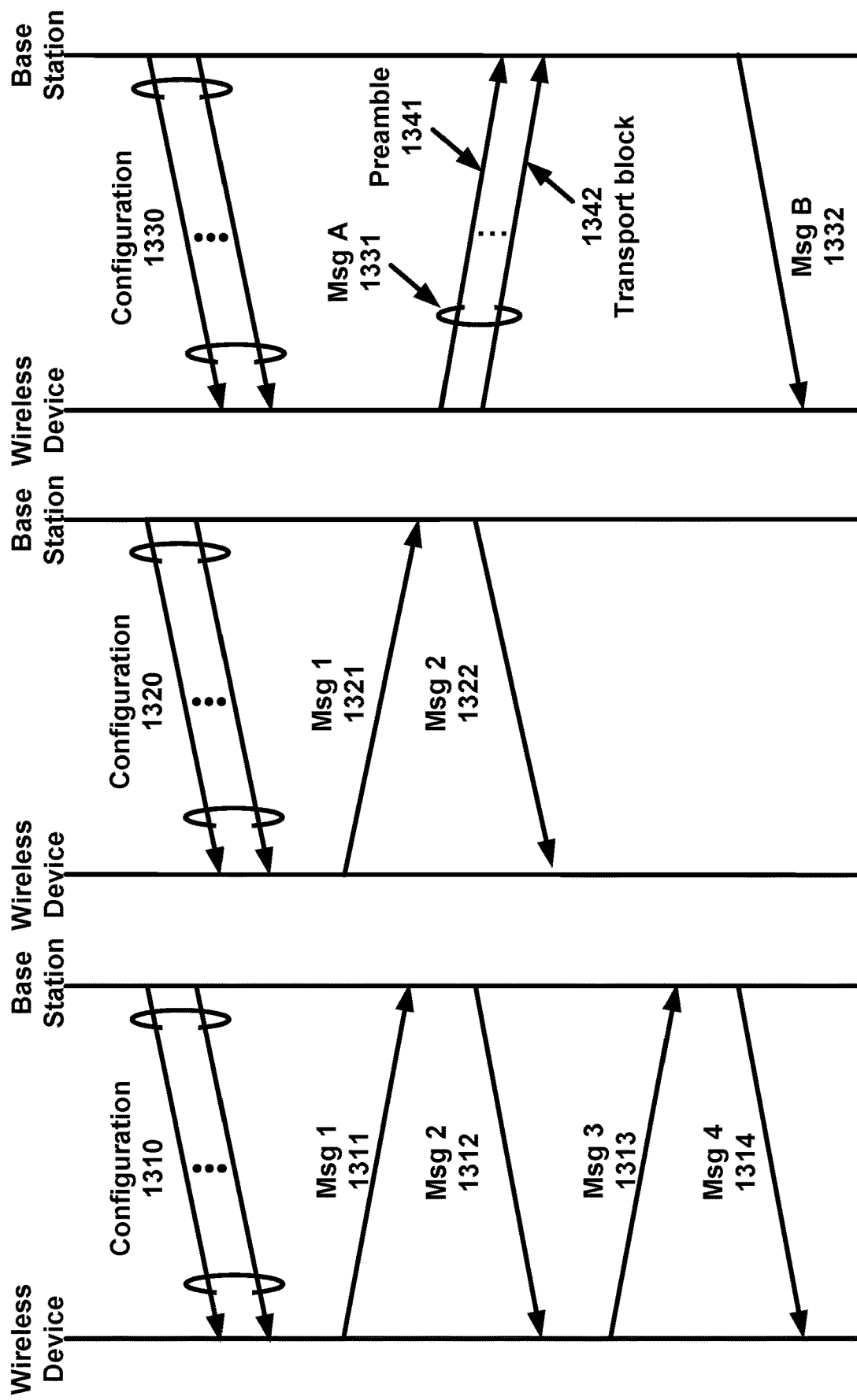
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id≤14), t_id may be an index of a first slot of the PRACH occasion in a system frame (e.g., 0≤t_id≤80), f_id may be an index of the PRACH occasion in the frequency domain (e.g., 0≤f_id≤8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). A fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
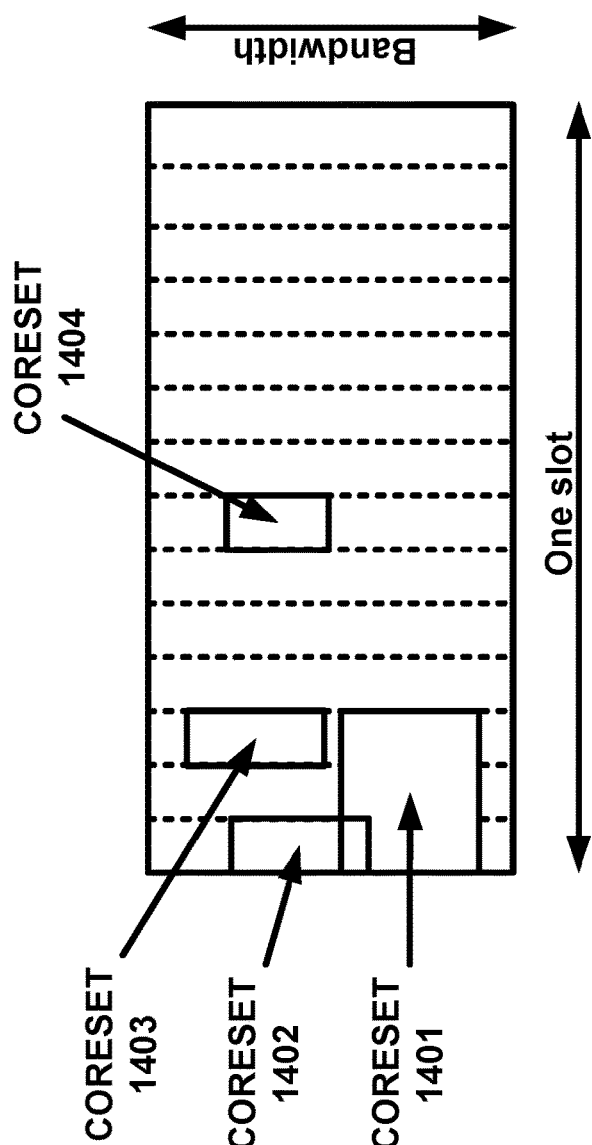
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
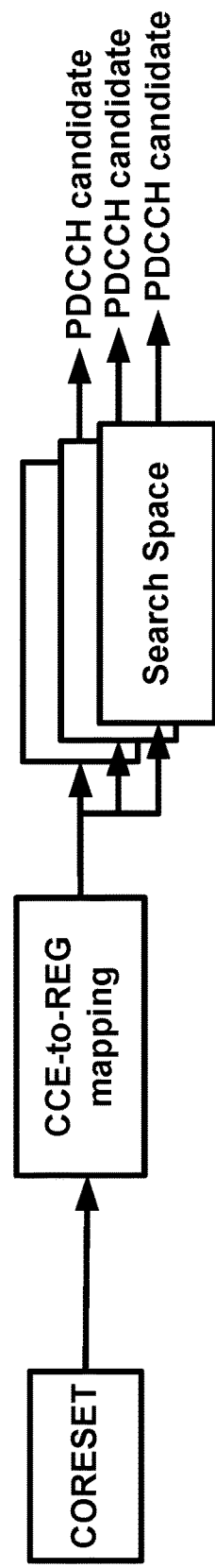
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
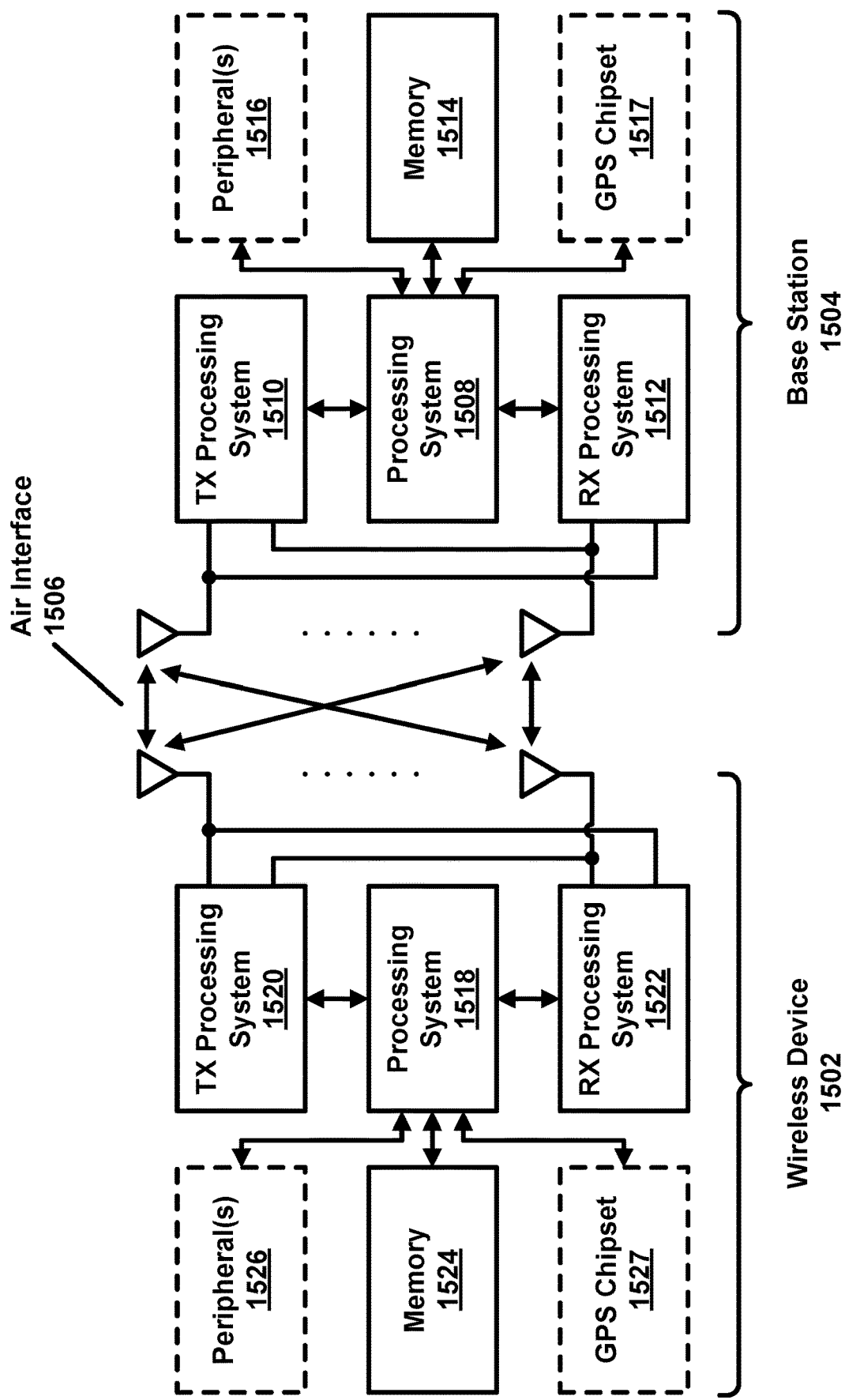
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
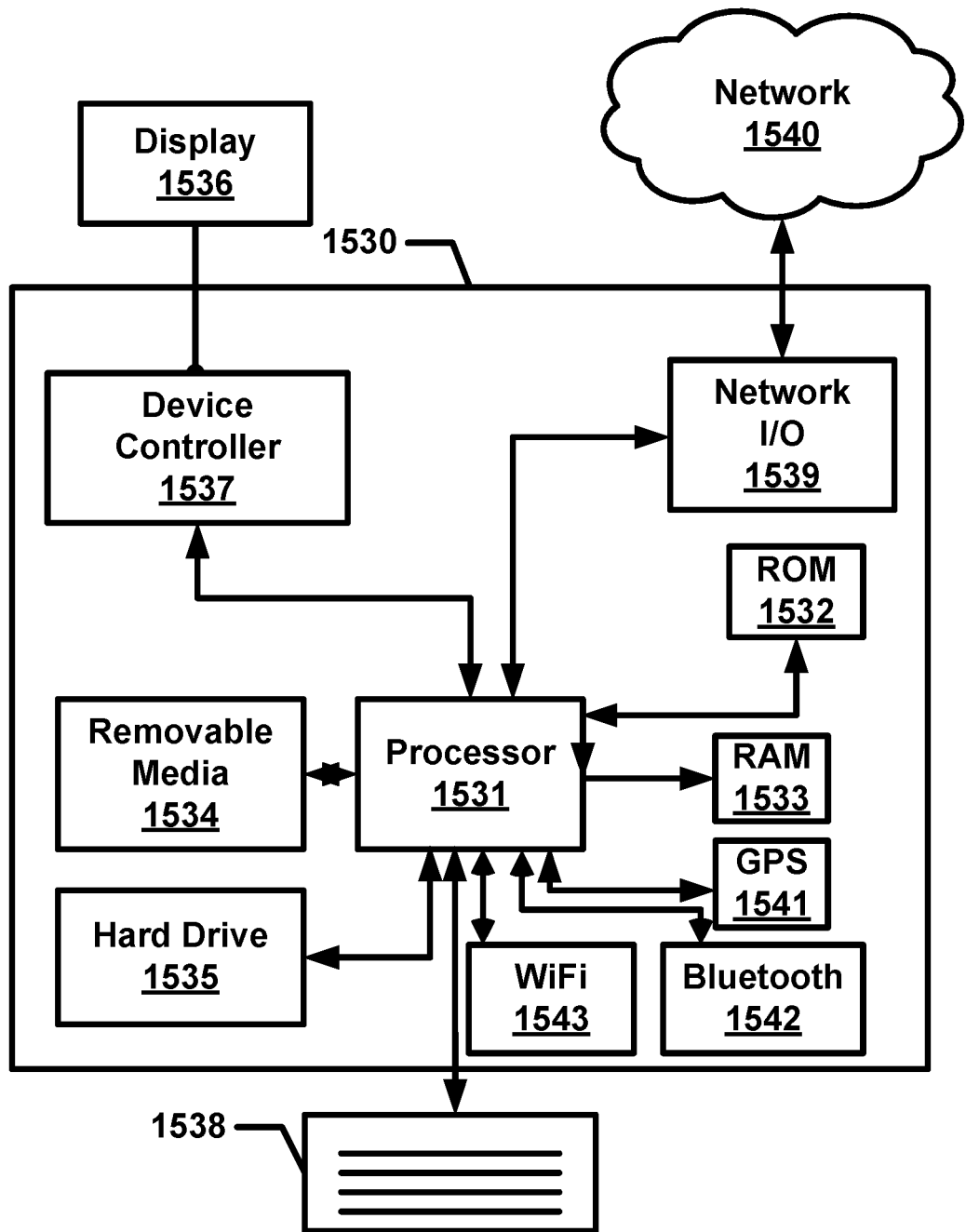
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc.

The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
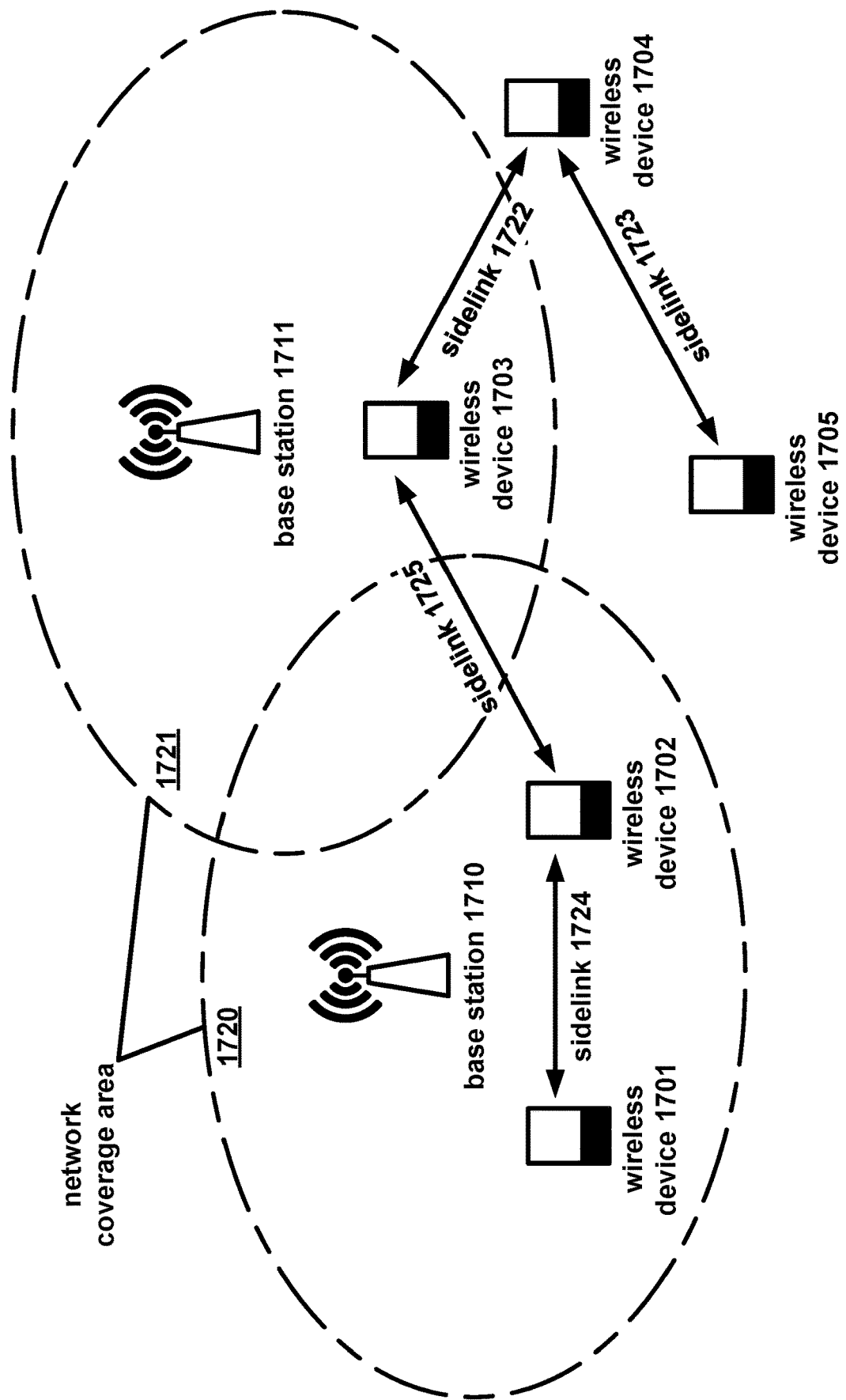
FIG. 17 shows an example of wireless communications.

FIG. 17 shows an example of wireless communications. There may be a direct communication between wireless devices, for example, in wireless communication (e.g., sidelink communications, device-to-device (D2D) communications, vehicle-to-everything (V2X) communications, etc.). The direct communication may be performed via a communications link, such as a sidelink (SL) or any other link. The wireless devices may exchange communications, such as sidelink communications, via an interface such as a sidelink interface (e.g., a PC5 interface). The direct communications, such as sidelink communications, may differ from uplink communications (e.g., in which a wireless device may communicate to a base station) and/or downlink communications (e.g., in which a base station may communicate to a wireless device). Reference made herein to sidelink, SL, and/or to sidelink communications may comprise any link and/or any link communications, including, for example, any direct link and/or any direct link communications between any user devices (e.g., wireless devices, user devices, user equipments, etc.). Although sidelink is used as an example, one skilled in the art will appreciate that any communications can use these concepts. A wireless device and a base station may exchange uplink and/or downlink communications via an interface, such as a user plane interface (e.g., a Uu interface).

A first wireless device (e.g., a wireless device 1701) and a second wireless device (e.g., a wireless device 1702) may be in a first coverage area (e.g., a coverage area 1720) of a first base station (e.g., a base station 1710). The first wireless device and the second wireless device may communicate with the first base station, for example, via a Uu interface. The coverage area may comprise any quantity of wireless devices that may communicate with the base station. A third wireless device (e.g., a wireless device 1703) may be in a second coverage area (e.g., a coverage area 1721) of a second base station (e.g., a base station 1711). The second coverage area may comprise any quantity of wireless devices that may communicate with the second base station. The first base station and the second base station may share a network and/or may jointly establish/provide a network coverage area (e.g., 1720 and 1721). A fourth wireless device (e.g., a wireless device 1704) and a fifth wireless device (e.g., a wireless device 1705) may be outside of the network coverage area (e.g., 1720 and 1721). Any quantity of wireless devices that may be outside of the network coverage area (e.g., 1720 and 1721).

Wireless communications may comprise in-coverage D2D communication. In-coverage D2D communication may be performed, for example, if two or more wireless devices share a network coverage area. The first wireless device and the second wireless device may be in the first coverage area of the first base station. The first wireless device and the second wireless device may perform a direct communication (e.g., an in-coverage intra-cell direct communication via a sidelink 1724). The second wireless device and the third wireless device may be in the coverage areas of different base stations (e.g., 1710 and 1711) and/or may share the same network coverage area (e.g., 1720 and/or 1721). The second wireless device and the third wireless device may perform a direct communication (e.g., an in-coverage inter-cell direct communication via a sidelink 1725). Partial-coverage direct communications (e.g., partial-coverage D2D communications, partial-coverage V2X communications, partial-coverage sidelink communications, etc.) may be performed. Partial-coverage direct communications may be performed, for example, if one wireless device is within the network coverage area and the other wireless device is outside the network coverage area. The third wireless device and the fourth wireless device may perform a partial-coverage direct communication (e.g., via a sidelink 1722). Out-of-coverage direct communications may be performed. Out-of-coverage direct communications may be performed, for example, if both wireless devices are outside of a network coverage area. The fourth wireless device and the fifth wireless device may perform an out-of-coverage direct communication (e.g., via a sidelink 1723).

Wireless communications, such as sidelink communications, may be configured using physical channels. Wireless communications, such as sidelink communications, may be configured using physical channels, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. A PSBCH may be similar in some respects to a PBCH. The broadcast information may comprise a slot format indication, resource pool information, a sidelink system frame number, and/or any other suitable broadcast information. A PSFCH may be used by a first wireless device to send feedback information to a second wireless device. The feedback information may comprise HARQ feedback information. A PSDCH may be used by a first wireless device to send discovery information to a second wireless device. The discovery information may be used by a wireless device to signal its presence and/or the availability of services to other wireless devices in the area. A PSCCH may be used by a first wireless device to send sidelink control information (SCI) to a second wireless device. A PSCCH may be similar in some respects to PDCCH and/or PUCCH. The control information may comprise time/frequency resource allocation information (e.g., RB size, a number of retransmissions, etc.), demodulation related information (e.g., DM-RS, MCS, redundancy version (RV), etc.), identifying information for a sending (e.g., transmitting) wireless device and/or a receiving wireless device, a process identifier (e.g., HARQ, etc.), and/or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar in some respects to PDSCH and/or PUSCH. A sidelink channel may be associated with one or more demodulation reference signals. For example, each of the sidelink channels may be associated with one or more demodulation reference signals. Sidelink operations may utilize sidelink synchronization signals to establish a timing of sidelink operations. Wireless devices configured for sidelink operations may send sidelink synchronization signals, for example, with the PSBCH. The sidelink synchronization signals may include primary sidelink synchronization signals (PSSS) and/or secondary sidelink synchronization signals (SSSS).

A wireless device may be configured with wireless resources (e.g., sidelink resources). A wireless device may be configured (e.g., pre-configured) for a sidelink. A wireless device may be configured (e.g., pre-configured) with sidelink resource information. A network may broadcast system information relating to a resource pool for a sidelink. A network may configure a particular wireless device with a dedicated sidelink configuration. The configuration may identify/indicate sidelink resources to be used for sidelink operation (e.g., configure a sidelink band combination).

A wireless device may operate in one or more (e.g., different) modes. The wireless device may operate in an assisted mode (e.g., mode 1) and/or an autonomous mode (e.g., mode 2). Mode selection may be based on a coverage status of the wireless device, a radio resource control status of the wireless device, information and/or instructions from the network, and/or any other suitable factors. The wireless device may select to operate in autonomous mode. The wireless device may select to operate in autonomous mode, for example, if the wireless device is idle or inactive, or if the wireless device is outside of network coverage. The wireless device may select to operate (or be instructed by a base station to operate) in an assisted mode. The wireless device may select to operate (or be instructed by a base station to operate) in an assisted mode, for example, if the wireless device is in a connected mode (e.g., connected to a base station). The network (e.g., a base station) may instruct a connected wireless device to operate in a particular mode.

The wireless device may request scheduling from the network. The wireless device may request scheduling from the network, for example, in an assisted mode. The wireless device may send a scheduling request to the network and the network may allocate sidelink resources to the wireless device. Assisted mode may be referred to as network-assisted mode, gNB-assisted mode, or a base station-assisted mode. The wireless device may select sidelink resources. The wireless device may select sidelink resources, for example, in an autonomous mode. The wireless device may select sidelink resources, for example, based on measurements within one or more resource pools (e.g., pre-configured resource pools, network-assigned resource pools), sidelink resource selections made by other wireless devices, and/or sidelink resource usage of other wireless devices.

A wireless device may use a sensing window. A wireless device may use a selection window. A wireless device may use a sensing window and/or a selection window, for example, to determine/select sidelink resources. The wireless device may receive/determine SCI sent (e.g., transmitted) by other wireless devices using a sidelink resource pool. The wireless device may receive/determine SCI sent (e.g., transmitted) by other wireless devices using the sidelink resource pool, for example, in the sensing window. The SCIs may identify/determine resources that may be used and/or reserved for sidelink transmissions. The wireless device may determine/select resources within the selection window (e.g., resources that are different from the resources identified in the SCIs). The wireless device may determine/select resources within the selection window, for example, based on the resources identified in the SCIs. The wireless device may send (e.g., transmit) using the selected sidelink resources.

Figure 18:
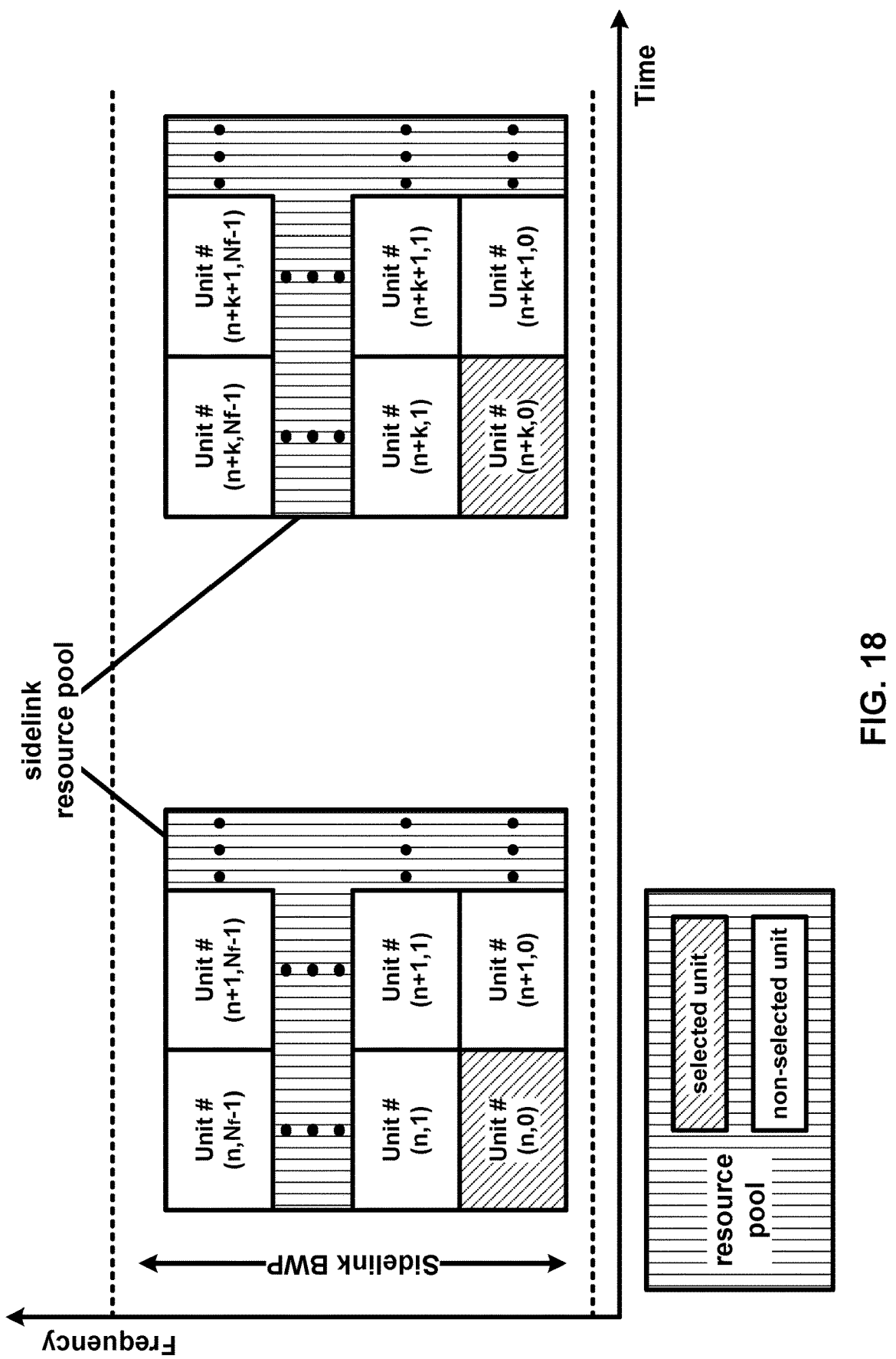
FIG. 18 shows an example of a resource pool for communication link (e.g., a sidelink).

FIG. 18 shows an example of a resource pool for sidelink operations. A wireless device may operate using one or more sidelink cells. A sidelink cell may include one or more resource pools. A resource pool (e.g., each resource pool) may be configured to operate in accordance with a particular mode (e.g., assisted mode, autonomous mode, and/or any other mode). The resource pool may be divided into one or more resource units (e.g., one or more resources). Each resource unit may comprise one or more resource blocks. Each resource unit may comprise one or more resource blocks, for example, in the frequency domain. Each resource unit may comprise one or more resource blocks, for example, which may be referred to as a sub-channel. Each resource unit may comprise one or more slots, one or more subframes, and/or one or more OFDM symbols. Each resource unit may comprise one or more slots, one or more subframes, and/or one or more OFDM symbols, for example, in the time domain. The resource pool may be continuous or non-continuous in the frequency domain and/or the time domain (e.g., comprising contiguous resource units or non-contiguous resource units). The resource pool may be divided into repeating resource pool portions. The resource pool may be shared among one or more wireless devices. Each wireless device may attempt to send (e.g., transmit) using different resource units, for example, to avoid collisions.

A resource pool (e.g., a sidelink resource pool) may be arranged in any suitable manner. The resource pool may be non-contiguous in the time domain and/or confined to a single sidelink BWP, for example, as shown in FIG. 18. Frequency resources may be divided into Nf resource units per unit of time, for example, as shown in FIG. 18. Frequency resources may be numbered from zero to Nf-1, for example, as shown in FIG. 18. The example resource pool may comprise a plurality of portions (e.g., non-contiguous portions) that may repeat every k units of time. Time resources may be numbered as n, n+1 . . . n+k, n+k+1 . . . , etc., for example, as shown in FIG. 18.

A wireless device may determine/select for transmission one or more resource units from a resource pool. The wireless device may select resource unit (n,0) for sidelink transmission. The wireless device may determine/select periodic resource units in later portions of the resource pool, for example, resource unit (n+k,0), resource unit (n+2k,0), resource unit (n+3k,0), etc. The wireless device may determine/select periodic resource units, for example, based on a determination that a transmission using resource unit (n,0) will not (or is not likely) to collide with a sidelink transmission of a wireless device that shares the sidelink resource pool. The determination may be based on behavior of other wireless devices that share the resource pool. The wireless device may select resource unit (n,0), resource (n+k,0), etc., for example, if no sidelink transmissions are detected in resource unit (n−k,0). The wireless device may avoid selection of resource unit (n,1), resource (n+k,1), etc., for example, if a sidelink transmission from another wireless device is detected in resource unit (n−k,1).

Different sidelink physical channels may use different resource pools. PSCCH may use a first resource pool and PSSCH may use a second resource pool. Different resource priorities may be associated with different resource pools. Data associated with a first QoS, service, priority, and/or other characteristic may use a first resource pool and data associated with a second QoS, service, priority, and/or other characteristic may use a second resource pool. A network (e.g., a base station) may configure a priority level for each resource pool, a service to be supported for each resource pool, etc. A network (e.g., a base station) may configure a first resource pool for use by unicast wireless devices (e.g., UEs), a second resource pool for use by groupcast wireless devices (e.g., UEs), etc. A network (e.g., a base station) may configure a first resource pool for transmission of sidelink data, a second resource pool for transmission of discovery messages, etc.

Figure 19:
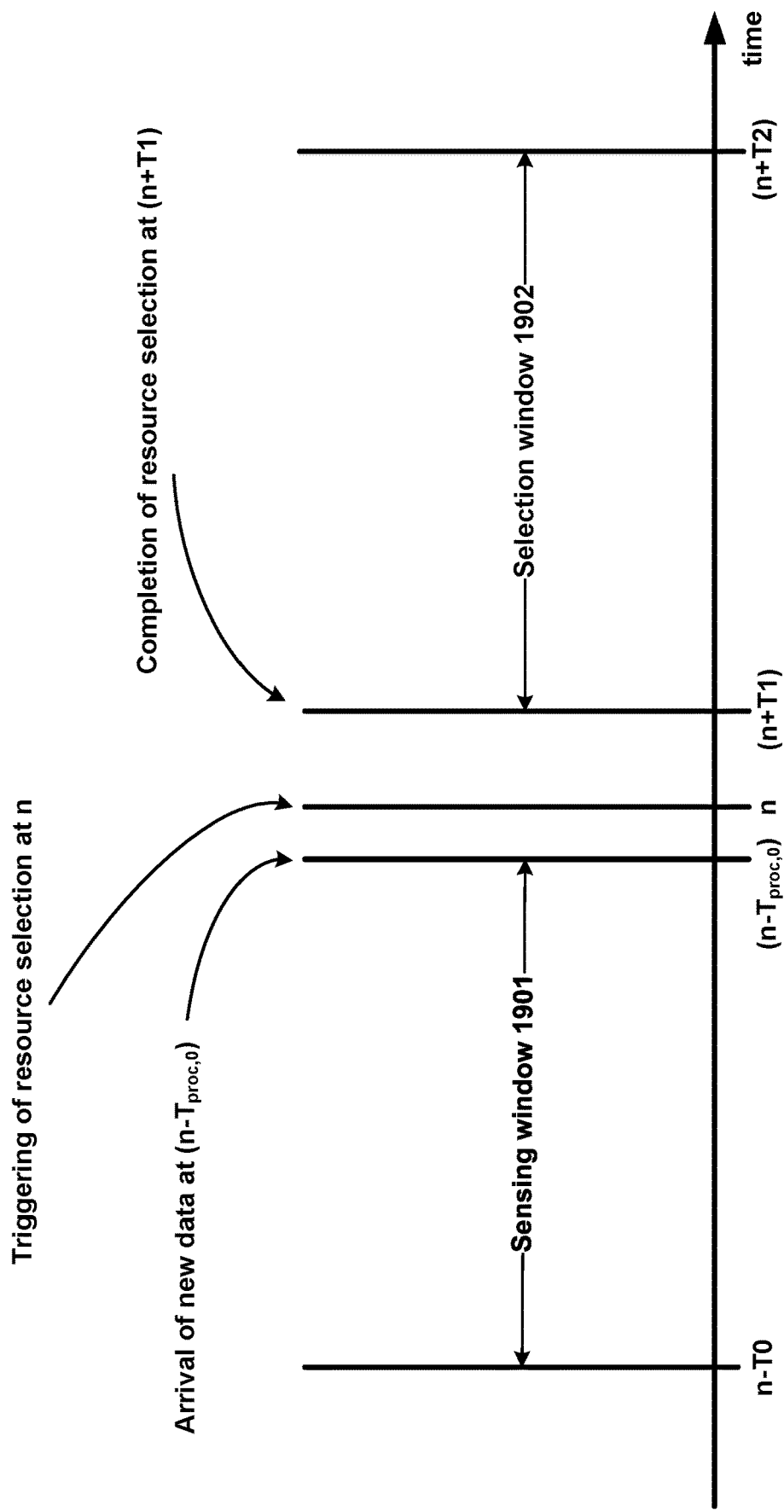
FIG. 19 shows an example of a resource selection.

FIG. 19 shows an example of timing for a resource selection procedure. A wireless device may perform the resource selection procedure to select radio resources for a sidelink transmission. A sensing window 1901 of the resource selection procedure may start at time (n−T0), for example, as shown in FIG. 19. The sensing window 1901 may end at time $(n-T_{proc,0})$ The wireless device may receive new data for the sidelink transmission at time $(n-T_{proc,0})$ The time period $T_{proc,0}$ may be a processing delay of the wireless device to determine to trigger the resource selection procedure. The wireless device may determine to trigger the resource selection procedure at time n to select the radio resources for the new data arrived at time $(n-T_{proc,0})$ The wireless device may complete the resource selection procedure at time (n+T1). The wireless device may determine the parameter T1, for example, based on a capability of the wireless device. The capability of the wireless device may be based on a processing delay of a processor of the wireless device. A selection window 1902 of the resource selection procedure may start at time (n+T1). The selection window 1902 may end at time (n+T2). The time (n+T2) may indicate/define the ending of the selection window. The wireless device may determine the parameter T2 subject to T2 min≤T2≤PDB, for example, where the PDB (packet delay budget) may be an allowable delay, such as a maximum allowable delay, (e.g., a delay budget) for sending (e.g., transmitting) the new data via the sidelink transmission. The wireless device may determine/set the parameter T2 min to a corresponding value for a priority of the sidelink transmission. The wireless device may determine/set the parameter T2=PDB, for example, if the parameter T2 min>PDB.

Figure 20:
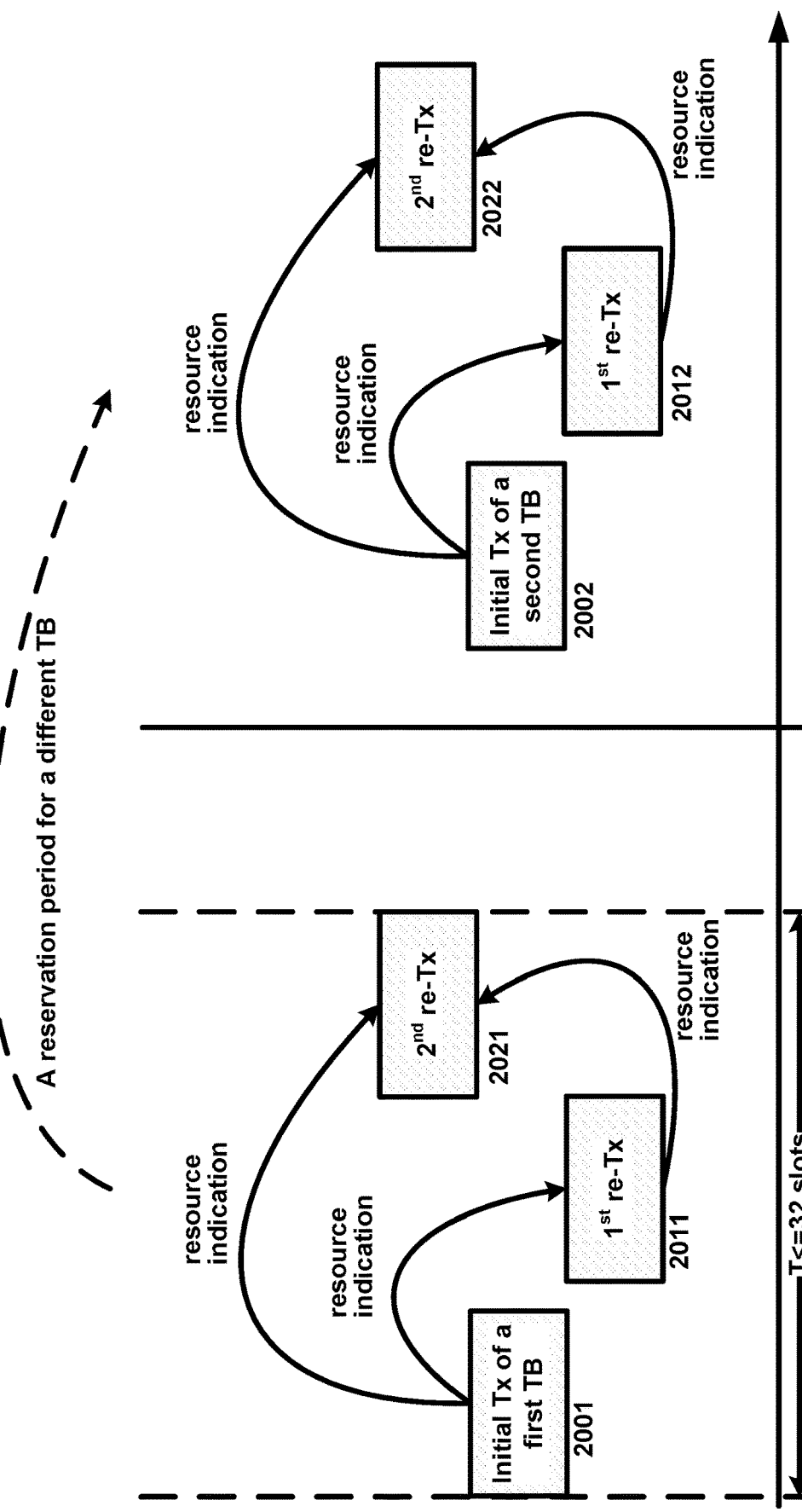
FIG. 20 shows an example of a resource indication for a transport block (TB) and a resource reservation for a TB.

FIG. 20 shows an example of a resource indication. The resource indication may comprise a resource indication for a first TB and/or a resource reservation for a second TB. A sidelink transmission may comprise an SCI. The sidelink transmission may comprise a TB. The SCI may comprise one or more first parameters indicating one or more first time and frequency (T/F) resources for transmission and/or retransmission of the first TB. The SCI may comprise one or more second parameters indicating a reservation period of one or more second T/F resources for transmission and/or retransmission of the second TB.

A wireless device may determine/select one or more first T/F resources for transmission and/or retransmission of a first TB. A wireless device may determine/select one or more first T/F resources for transmission and/or retransmission of the first TB, for example, based on triggering a resource selection procedure (e.g., as described above in FIG. 19). The wireless device may select three resources for sending (e.g., transmitting) the first TB, for example, such as shown in FIG. 20. The wireless device may send (e.g., transmit) an initial transmission (e.g., an initial Tx of a first TB in FIG. 20) of the first TB via a first resource 2001 of the three resources. The wireless device may send (e.g., transmit) a first retransmission (e.g., a 1st re-Tx in FIG. 20) of the first TB via a second resource 2011 of the three resources. The wireless device may send (e.g., transmit) a second retransmission (e.g., a 2nd re-Tx in FIG. 20) of the first TB via a third resource 2021 of the three resources. A time duration between a starting time of the initial transmission of the first TB (e.g., via the first resource 2011) and the second retransmission of the first TB (e.g., via the third resource 2021) may be smaller than or equal to 32 sidelink slots (e.g., T≤32 slots in FIG. 20) or any other quantity of sidelink slots or any other duration. A first SCI may associate with the initial transmission of the first TB. The first SCI may indicate a first T/F resource indication for the initial transmission of the first TB, the first retransmission of the first TB, and the second retransmission of the first TB. The first SCI may indicate a reservation period of resource reservation for a second TB, for example, via a fourth resource 2002. A second SCI may associate with the first retransmission of the first TB. The second SCI may indicate a second T/F resource indication for the first retransmission of the first TB (e.g., via the second resource 2011) and the second retransmission of the first TB (e.g., via a fifth resource 2012). The second SCI may indicate the reservation period of resource reservation for the second TB. A third SCI may associate with the second retransmission of the first TB. The third SCI may indicate a third T/F resource indication for the second retransmission of the first TB (e.g., via a sixth resource 2022). The third SCI may indicate the reservation period of resource reservation for the second TB.

Figure 21:
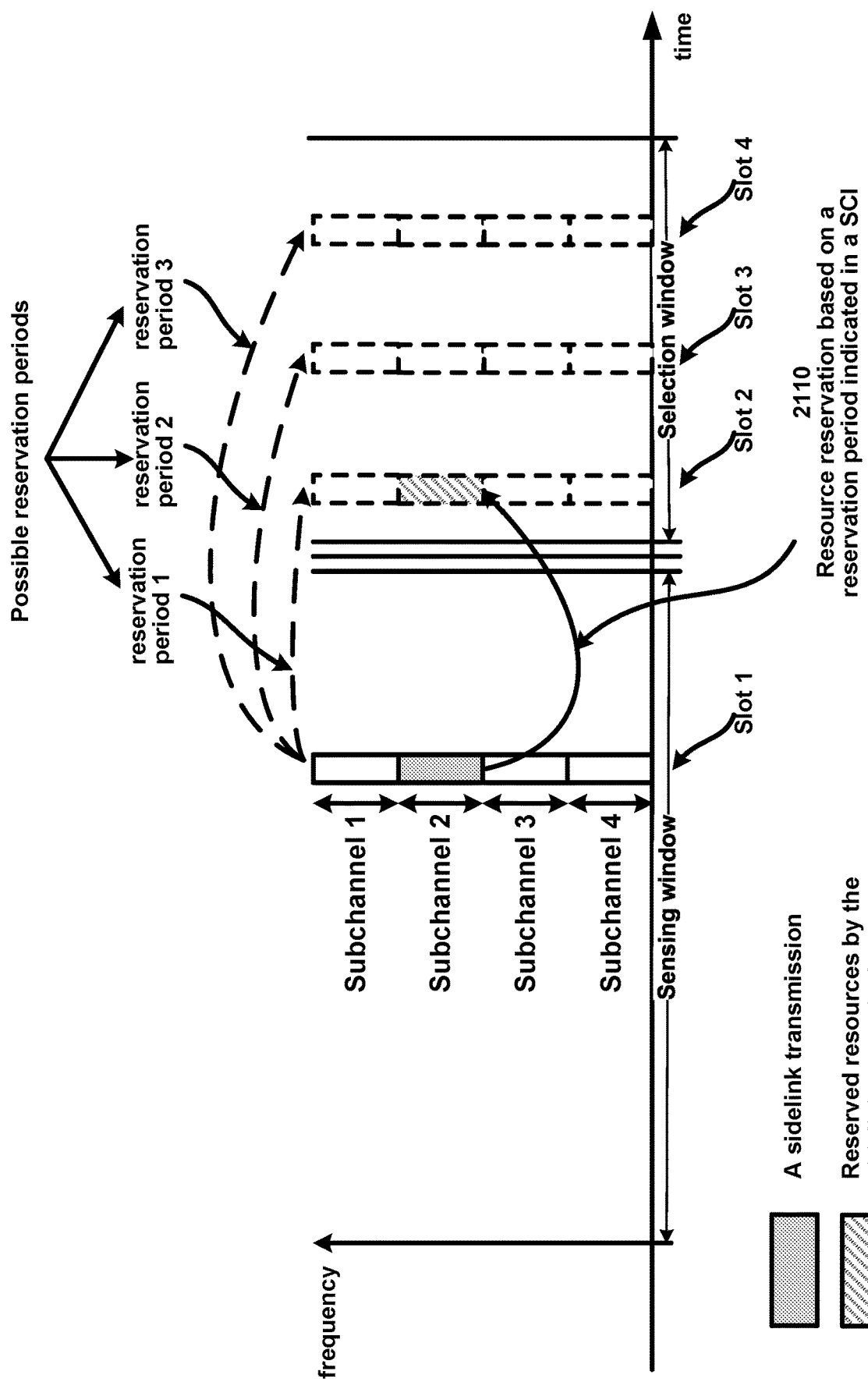
FIG. 21 shows an example of a resource reservation based on sensing of a wireless device.

FIG. 21 shows an example resource reservation. The example resource reservation 2110 may be based on sensing/monitoring of resources, by a wireless device. A base station may send one or more parameters to the wireless device. The one or more parameters may configure one or more reservation periods (e.g., reservation period 1, reservation period 2, and reservation period 3) of a resource pool. The wireless device may receive a first sidelink transmission in a subchannel 2 of a slot 1 in a sensing window. SCI of the first sidelink transmission may indicate a reservation period (e.g., the reservation period 1) of the one or more reservation periods. The wireless device may determine, based on the SCI, that a subchannel 2 of a slot 2 in a selection window has been reserved for a sidelink transmission. The wireless device may not select the subchannel 2 of slot 2 in the selection window for sending a second sidelink transmission, for example, based on the determination. The wireless device may or may not monitor a slot 1 in a sensing window. The wireless device may not monitor the slot 1, for example, if the wireless device may only have a half-duplex capability of and/or if the wireless device may be sending/transmitting in the slot 1. The wireless device may determine the one or more reservation periods of the resource pool as the possible reservation periods of a sidelink transmission via the resource pool. The wireless device may assume resources in slot 2, slot 3 and slot 4 might be reserved by a first sidelink transmission in the slot 1 based on the one or more reservation periods. The wireless device may not select the resources (e.g., resources shown in dotted boxes in FIG. 21) in the slot 2, the slot 3 and the slot 4 for avoiding potential resource collision between a second sidelink transmission sent by the wireless device and a possible sidelink transmission indicated by SCI of the first sidelink transmission in the slot 1.

Figure 22:
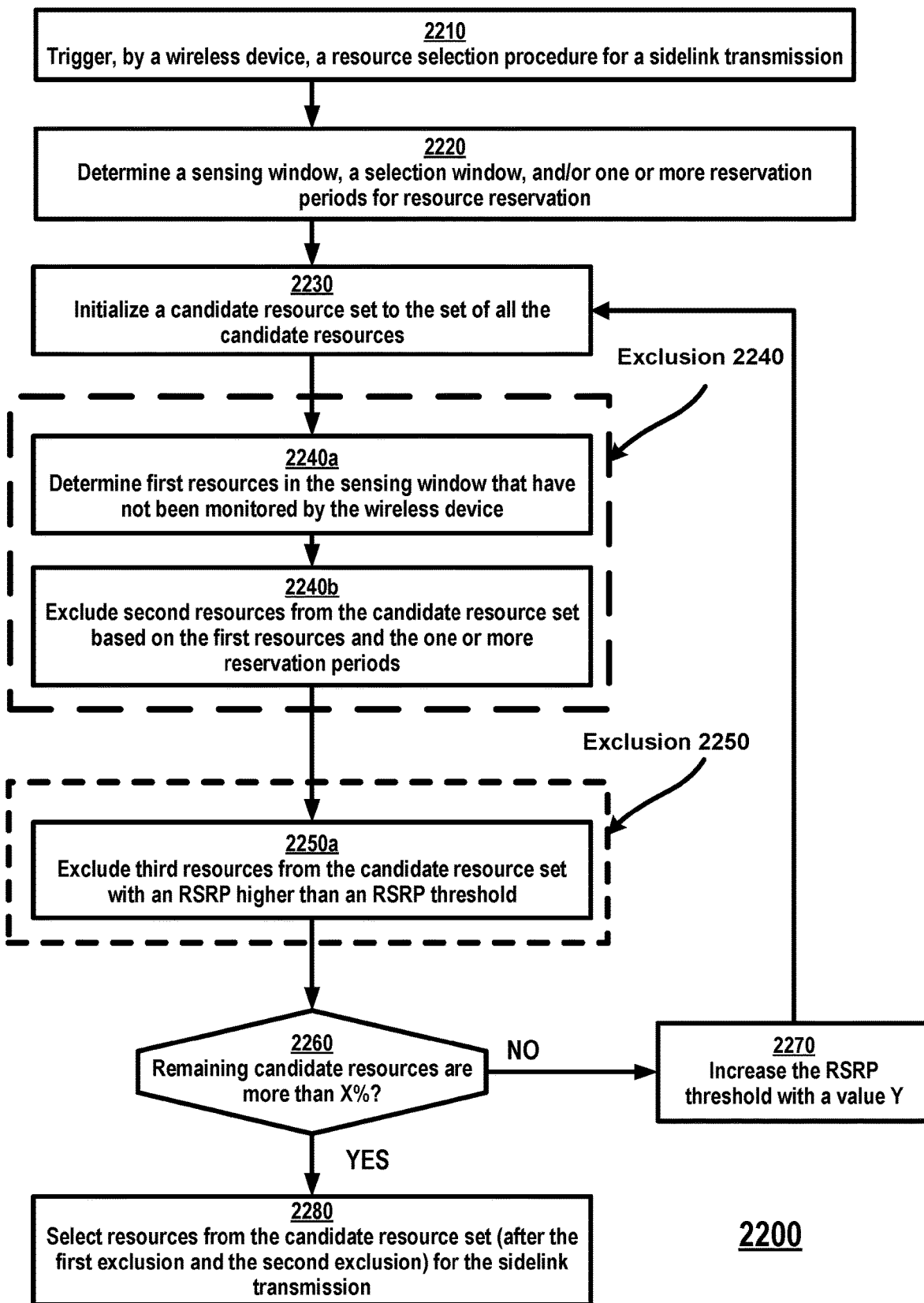
FIG. 22 shows an example method of a resource selection procedure.

FIG. 22 shows an example method of a resource selection. The example method 2200 may be performed by a wireless device for a sidelink transmission. At step 2210, the wireless device may trigger a resource selection procedure. The wireless device may trigger the resource selection procedure, for example, based on a determination that there are not enough available resources at the wireless device for sending a sidelink transmission. At 2220, the wireless device may determine a sensing window (e.g., the sensing window shown in FIG. 19) based on the triggering the resource selection procedure. The wireless device may determine a selection window (e.g., the selection window shown in FIG. 19) based on the triggering the resource selection procedure. The wireless device may determine one or more reservation periods for resource reservation.

At step 2230, the wireless device may initialize a candidate resource set. The candidate resource step may comprise a plurality of candidate resources. The candidate resource set may be the union of candidate resources within the selection window. A candidate resource for the sidelink transmission may be a T/F resource with a size matched to the sidelink transmission. A candidate resource with a size matched to a sidelink transmission may indicate that the candidate resource comprises a quantity of subchannels sufficient to send the data of the sidelink transmission. A candidate resource may be a single-subframe resource. A candidate resource may be a single-slot resource.

At step 2240a, the wireless device may determine first resources, within a sensing window, that are not monitored by the wireless device. The wireless device may not monitor the first resources, for example, if the wireless device is performing transmission of other signals via the first resources, or if the wireless device is in a sleep mode (e.g., power saving mode, DRX OFF state, etc.). The wireless device may perform a first exclusion 2240 for excluding second resources (e.g., step 2240b) from the candidate resource set based on the first resources and the one or more reservation periods. The one or more reservation periods may be configured/associated with a resource pool of the second resources. The wireless device may determine the second resources within the selection window, for example, based on the one or more reservation periods. The second resources may be reserved by a transmission sent via the first resources.

The wireless device may perform a second exclusion 2250 for excluding third resources from the candidate resource set. SCI may indicate a resource reservation of the third resources. The SCI may further indicate a priority value. The wireless device may exclude the third resources from the candidate resource set based on an RSRP of the third resources being higher than an RSRP threshold. The RSRP threshold may be associated with the priority value based on a mapping list of RSRP thresholds to priority values (e.g., configured and/or pre-configured to the wireless device). A base station may send a message to the wireless device for configuring the mapping list. The message may comprise an RRC message. The mapping list may be pre-configured for the wireless device. A memory associated with the wireless device may store the mapping list.

At step 2260, the wireless device may determine whether the remaining resources in the candidate resource set (e.g., based on/after performing the first exclusion 2240 and the second exclusion 2250) are sufficient for selecting resources for the sidelink transmission and/or retransmission. The determination of whether the remaining resources are sufficient may be based on one or more conditions. For example, the determination of whether the remaining resources are sufficient may be based on a first quantity of remaining radio resources and a second quantity of the candidate resources in the candidate resource set before performing the first exclusion and the second exclusion. The wireless device may determine a ratio of the first quantity and the second quantity. At steps 2260 and 2270, the wireless device may increase the RSRP threshold used to exclude the third resources (e.g., by a quantity Y), for example, if the ratio is less than a threshold value (e.g., X %). The wireless device may iteratively re-perform the initialization, the first exclusion 2240, and the second exclusion 2250 at least until the condition is met (e.g., at least until the ratio is greater than the threshold value). The wireless device may select fourth resources from remaining candidate resources of the candidate resource set for the sidelink transmission and/or retransmission, at step 2280, for example, if the ratio is greater than a threshold value.

Figure 23:
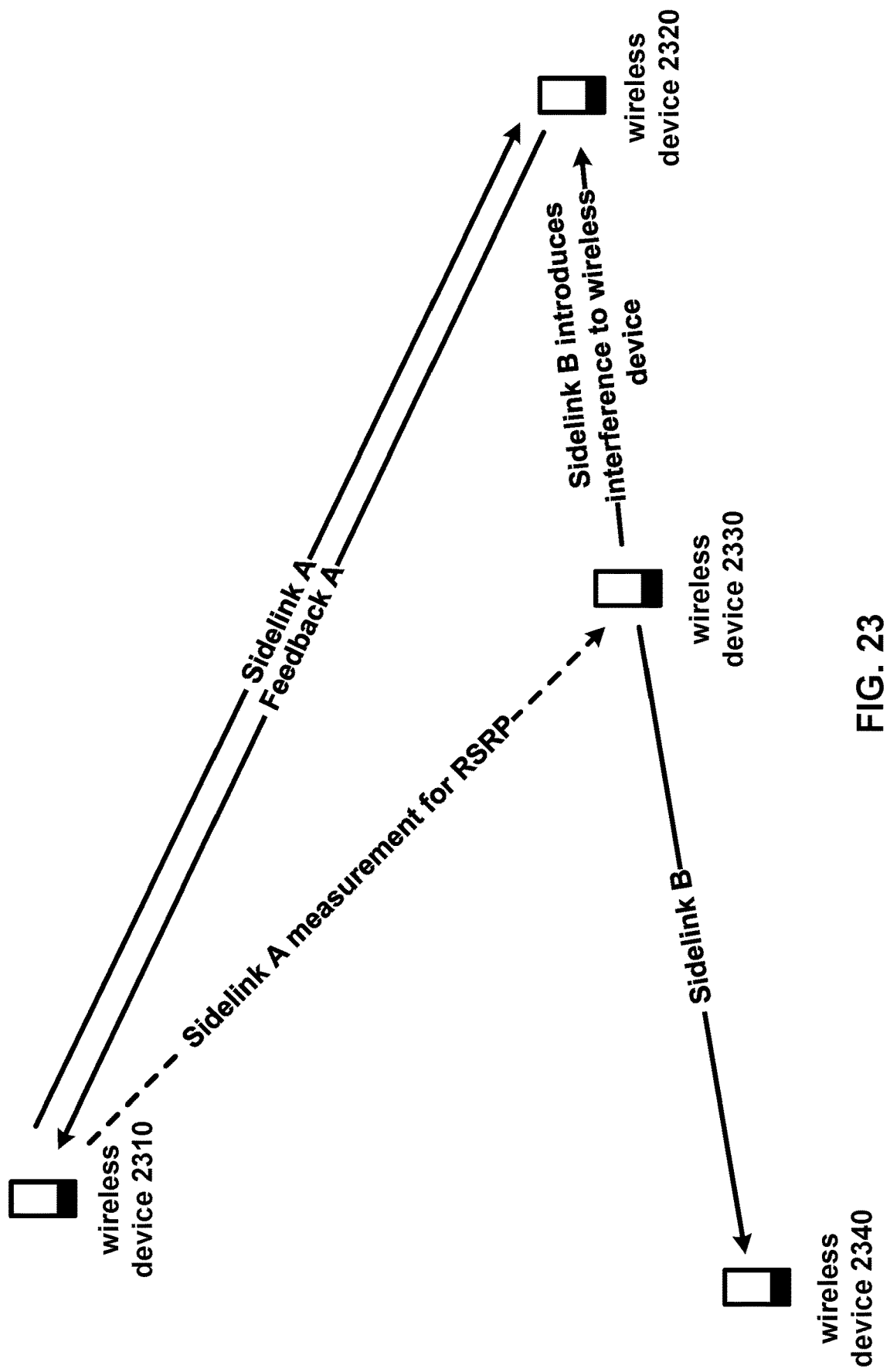
FIG. 23 shows an example of interference between communications.

FIG. 23 shows an example of interference between sidelink communications. A wireless device 2310 may send a sidelink transmission A, via first resources, to a wireless device 2320. SCI of the sidelink transmission A may indicate a resource assignment and/or a reservation of second resources (e.g., for a future sidelink transmission from the wireless device 2310 to the wireless device 2320). The wireless device 2320 may send feedback A to the wireless device 2310, for example, based on the receipt of the sidelink transmission A.

A wireless device 2330 may trigger a resource selection procedure (e.g., as shown in FIG. 22) to select third resources for sending a sidelink transmission B to a wireless device 2340. The wireless device 2330 may receive the sidelink transmission A in a sensing window. The wireless device 2330 may determine an RSRP based on a measurement of the sidelink transmission A. The wireless device 2330 may use the determined RSRP (e.g., of the sidelink transmission A) to determine an estimate of an interference that the sidelink transmission B may cause to wireless device 2310. The wireless device 2330 may select the third resources, for example, based on the determined RSRP being less than an RSRP threshold. The wireless device 2330 may select the third resources such that the third resources may fully or partially overlap with the second resources. Using only the determined RSRP of the sidelink transmission A for selection of third resources for the sidelink transmission B does not account for the interference that the sidelink transmission B may cause to wireless device 2320 that receives the sidelink transmission A. The interference to wireless device 2320 may be significant depending on the distance between wireless device 2330 and wireless device 2320.

A first wireless device may determine/select channel resources (e.g., for a sidelink transmission) based on various channel measurements (e.g., RSRP). For example, the first wireless device may measure an RSRP for a sidelink transmission from a second wireless device to a third wireless device. The sidelink transmission may comprise transmission via a PSCCH or a PSSCH. The first wireless device may determine channel resources based on the RSRP (e.g., as described with reference to FIG. 23). Selection of channel resources based only on the sidelink transmission (e.g., from the second wireless device) does not account for the extent of interference that a transmission from the first wireless device may cause to the third wireless device. For example, among the second wireless device and the third wireless device, the third wireless device may be closer to the first wireless device. The third wireless device may be subject to increased interference from transmissions by the first wireless device. The first wireless device may select and send a signal via a channel resource that may interfere with signal receptions at the third wireless device.

Various examples herein describe enhanced resource selection. A wireless device may perform the enhanced resource selection for sidelink communication (or any other type of communication, such as uplink and/or downlink communication). The wireless device may determine/select channel resources for signal transmission based on measurements associated with a signal (e.g., a sidelink signal sent by a second wireless device) and/or measurements associated with a feedback signal (e.g., a feedback signal, responsive to the sidelink signal, sent by a third wireless device). The wireless device may exclude resources from a candidate resource set based on a feedback measurement (e.g., of a feedback signal associated with sidelink communications). The wireless device may exclude the resources from the candidate resource set, for example, if a received power of the feedback signal is higher than a threshold value. The wireless device may exclude resources from a candidate resource set, for example, based on a sidelink measurement and/or a feedback measurement. For example, the wireless device may measure one or more feedback channels (e.g., PSFCH or any other feedback channel(s)), and based on the measurement(s), the wireless device may select one or more resources for a sidelink communication with another wireless device that may (or may not) overlap with resources associated with the feedback channel(s). For example, if the measurement(s) satisfy/satisfies a threshold, the wireless device may (or may not) select the corresponding one or more resources. The wireless device may select the one or more resources, for example, if the measurement(s) are less than (or equal to) a threshold. The wireless device may exclude (e.g., not select) the one or more resources, for example, if the measurement(s) are greater than (or equal to) a threshold. By selecting one or more resources based on the measurement(s) of feedback channel(s) satisfying a threshold, the wireless device may avoid and/or reduce a likelihood of selecting resource(s) that may cause interference with other communications.

A wireless device may exclude the resources from the candidate resource set based on a received power (e.g., RSRP) of a sidelink signal being higher than a first threshold value (e.g., an RSRP threshold value) and/or a received power of a feedback signal being higher than a second threshold value. The first threshold value and the second threshold value may be same or different. A wireless device may exclude resources from a candidate resource set based on an RSRP threshold value. The wireless device may determine the RSRP threshold based on a received power of a feedback signal. The wireless device may exclude the resources from the candidate resource set, for example, if an RSRP of the sidelink signal is higher than the RSRP threshold value. The wireless device may determine a transmit power for sending a sidelink signal based on a feedback signal measurement. Excluding resources based on a feedback signal measurement may provide advantages such as reduced interference and/or improved sidelink transmission integrity.

A wireless device may determine to trigger an enhanced resource selection procedure, for example, based on one or more triggering conditions. A triggering condition may be based on communication activity between other wireless devices and/or an urgency of data to be transmitted by a wireless device. For example, a triggering condition may be based on at least one of: a channel busy ratio measurement in a sensing window, a packet delay budget of a sidelink transmission, and/or a priority of a sidelink transmission. The conditional triggering of the enhanced resource selection process may provide advantages such as reduced power consumption by a wireless device.

Figure 24:
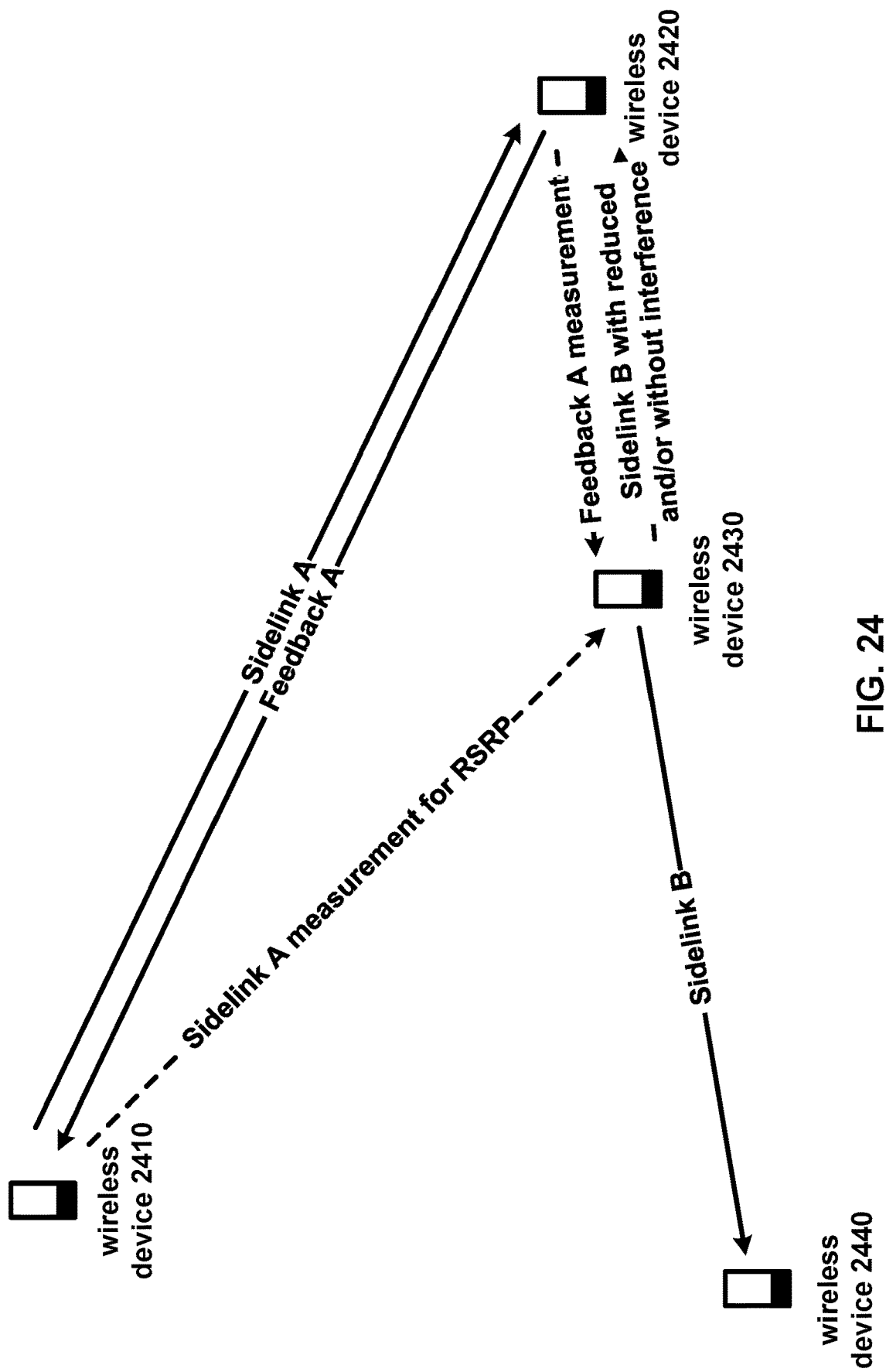
FIG. 24 shows an example of interference reduction using an enhanced resource selection procedure.

FIG. 24 shows an example of an enhanced resource selection procedure. The enhanced resource selection process may reduce interference between sidelink communications associated with different communication devices. A wireless device 2410 may send a sidelink transmission A via first resources to a wireless device 2420. SCI of the sidelink transmission A may indicate a resource assignment and/or a reservation of second resources for a future sidelink transmission from the wireless device 2410 to the wireless device 2420. The wireless device 2420 may send a feedback A to the wireless device 2410, for example, based on (e.g., after or in response to) the sidelink transmission A.

A wireless device 2430 may trigger the enhanced resource selection procedure to select third resources. The third resource may be for sending a sidelink transmission B to a wireless device 2440. The wireless device 2430 may receive the sidelink transmission A and the feedback A in a sensing window. The wireless device 2430 may determine the third resources based on measurements associated with both the sidelink transmission A (e.g., sidelink transmission A measurement) and the feedback A (e.g., feedback A measurement). The third resources may or may not overlap with the second resources. The sidelink transmission B from the wireless device 2430, via the third resources, may not introduce interference to the wireless device 2420, for example, if the third resources do not overlap with the second resources. The wireless device 2430 may reduce power for sending the sidelink transmission B via third resources, for example, if the third resources are partially or fully overlapped with the second resources. The sidelink transmission B from the wireless device 2430, via the third resources, may reduce interference to the wireless device 2420, such as compared to the interference that may introduced by other resource selection procedures (e.g., as described above in FIG. 23).

The wireless device 2430 may exclude the second resources from a candidate resource set based on the feedback A measurement. The wireless device 2430 may exclude the second resources from the candidate resource set, for example, if the feedback A measurement indicates that a received power of the feedback A is greater than a threshold value. The wireless device 2430 may exclude the second resources from the candidate resource set based on the sidelink transmission A measurement and/or the feedback A measurement. The wireless device 2430 may exclude the second resources from the candidate resource set based on an RSRP of the sidelink transmission A being greater than an RSRP threshold value and/or a received power of the feedback A being greater than a threshold value. The wireless device 2430 may exclude the second resources from the candidate resource set based on an RSRP threshold value. The wireless device 2430 may determine the RSRP threshold based on a received power of the feedback A. The wireless device 2430 may exclude the second resources from the candidate resource set, for example, if the sidelink transmission A measurement indicates that an RSRP of the first resources is greater than the RSRP threshold. The wireless device 2430 may determine a transmit power for sending the sidelink transmission B (e.g., via the third resources) based on the feedback A measurement. The wireless device 2430 may send the sidelink transmission B, via the third resources, using the transmit power. The wireless device 2430 may determine to trigger the enhanced resource selection procedure based on a triggering condition. The triggering condition may be based on a channel busy ratio measurement in the sensing window, a packet delay budget of a sidelink transmission, and/or a priority of a sidelink transmission. Implementing the enhanced resource selection procedure may help to reduce and/or avoid interference from a first wireless device (e.g., wireless device 2430) that transmits via a first sidelink (e.g., sidelink transmission B) to a second wireless device (e.g., wireless device 2420) that receives via a second sidelink (e.g., sidelink transmission A).

An association mapping between a PSSCH and one or more PSFCH resources may exist. A wireless device may be scheduled, via SCI, with a PSSCH reception (e.g., in one or more sub-channels from a quantity of $N_{subch}^{PSSCH}$ sub-channels). The SCI may indicate that the wireless device may send a PSFCH transmission. The PSFCH transmission may comprise HARQ-ACK information based on the PSSCH reception. The wireless device may provide HARQ-ACK information that comprises ACK or NACK, or only NACK. The wireless device may be provided a quantity of slots in a resource pool for a period corresponding to PSFCH transmission occasion resources. PSFCH transmissions via the resource pool may be disabled, for example, if the quantity is zero. The wireless device may be indicated (e.g., by higher layers) to not send a PSFCH transmission based on the PSSCH reception. The wireless device may provide the HARQ-ACK information in a PSFCH transmission via a resource pool, for example, if the wireless device performs a PSSCH reception via the resource pool and a field in the SCI (e.g., corresponding to an SCI format 0-2) scheduling the PSSCH reception indicates that the wireless device is to report HARQ-ACK information for the PSSCH reception.

The wireless device may send the PSFCH transmission in a first slot that includes PSFCH resources and is at least a quantity of slots of the resource pool after a last slot of the PSSCH reception. The wireless device may be provided a set of $M_{PRB,\,set}^{PSFCH}$ PRBs in a resource pool for PSFCH transmission in a PRB of the resource pool. For a quantity of $N_{subch}$ sub-channels for the resource pool and a quantity of $N_{PSSCH}^{PSFCH}$ PSSCH slots associated with a PSFCH slot, the wireless device may allocate the $[(i+j\cdot N_{PSSCH}^{PSFCH})\cdot M_{subch,\,slot}^{PSFCH},\,(i+1+j\cdot N_{PSSCH}^{PSFCH})\cdot M_{subch,\,slot}^{PSFCH}-1]$ PRBs from the $M_{PRB,\,set}^{PSFCH}$ PRBs to slot i and sub-channel j, where $M_{subch,\,slot}^{PSFCH}=M_{PRB,\,set}^{PSFCH}/(N_{subch}\cdot N_{PSSCH}^{PSFCH})$, $0\leq i<N_{PSSCH}^{PSFCH}$, $0\leq j<N_{subch}$. The allocation may start in an ascending order of i and continue in an ascending order of j. The wireless device may determine a quantity of PSFCH resources available for multiplexing HARQ-ACK information in a PSFCH transmission as $R_{PRB,\,CS}^{PSFCH}=N_{type}^{PSFCH}\cdot M_{subch,\,slot}^{PSFCH}\cdot N_{CS}^{PSFCH}$ where $N_{CS}^{PSFCH}$ is a quantity of cyclic shift pairs for the resource pool and, based on an indication by higher layers: $N_{type}^{PSFCH}=1$ and the $M_{subch,\,slot}^{PSFCH}$ PRBs are in one sub-channel; and/or $N_{type}^{PSFCH}=N_{subch}^{PSSCH}$ and the $N_{subch}^{PSSCH}\cdot M_{subch,\,slot}^{PSFCH}$ are located in one or more sub-channels from the $N_{subch}^{PSSCH}$ sub-channels.

The wireless device may use/apply one cyclic shift from a cyclic shift pair to a sequence used for the PSFCH transmission. The PSFCH resources may be first indexed according to an ascending order of the PRB index, from the $N_{type}^{PSFCH}\cdot M_{subch,\,slot}^{PSFCH}$ PRBs, and then according to an ascending order of the cyclic shift pair index from the $N_{CS}^{PSFCH}$ cyclic shift pairs. The wireless device may determine an indicator/index of a PSFCH resource for a PSFCH transmission, based on (e.g., after or in response to) a PSSCH reception, using a sequence associated with the resource pool. The indicator/index of the PSFCH resource may be determined as $(P_{ID}+M_{ID})\bmod R_{PRB,\,CS}^{PSFCH}$, where $P_{ID}$ is a physical layer source identity (ID) provided by SCI format 0-2 scheduling the PSSCH reception, $M_{ID}$ is zero or $M_{ID}$ is the ID of the wireless device performing the PSSCH reception (e.g., as indicated by higher layers).

Figure 25:
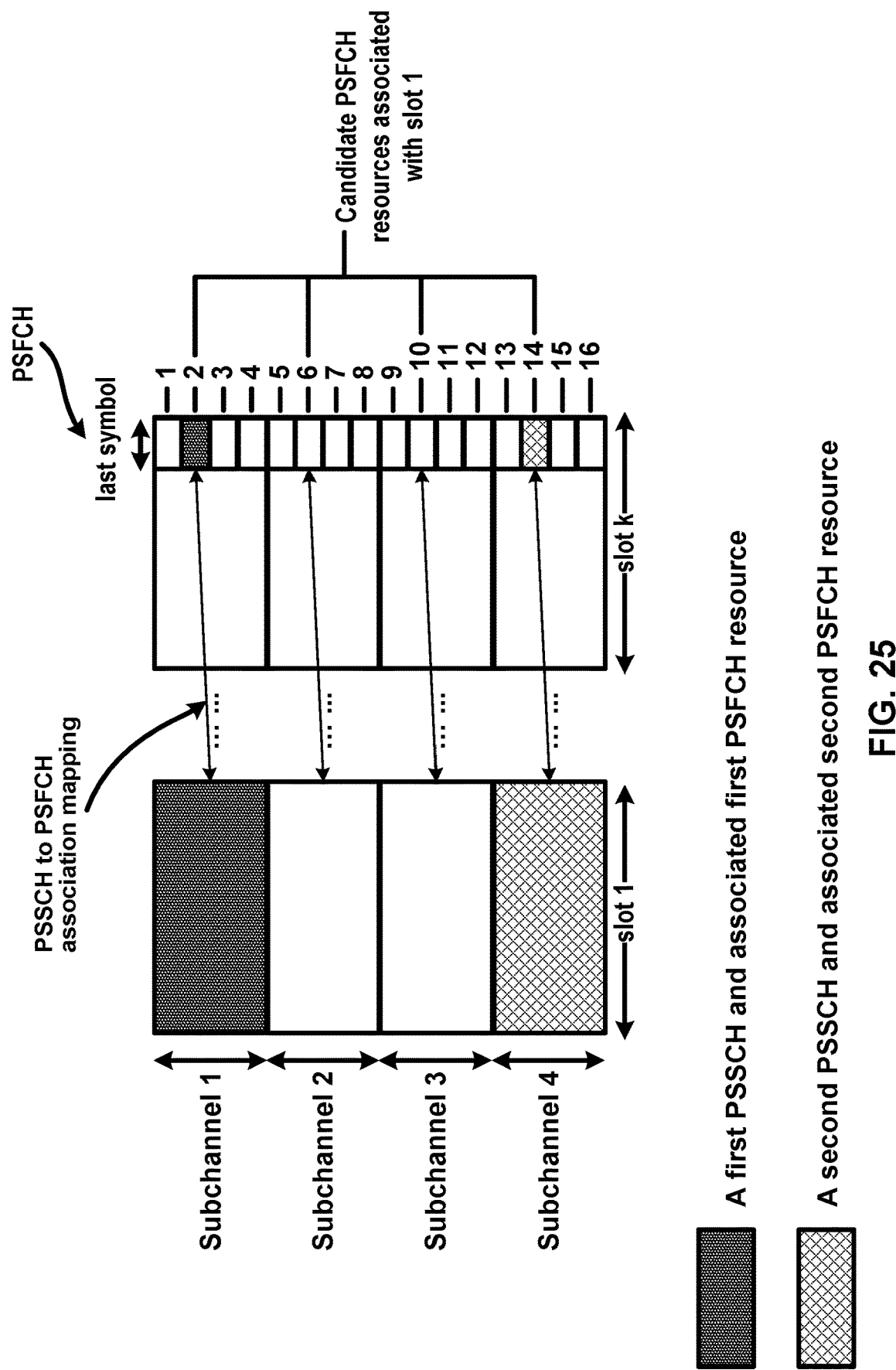
FIG. 25 shows an example association mapping between a physical sidelink shared channel (PSSCH) and a physical sidelink feedback channel (PSFCH) resource.

FIG. 25 shows an example of an association mapping between a PSSCH of a sidelink transmission and a PSFCH resource. A resource pool may comprise four (or any other quantity of) subchannels (X) in the frequency domain. The resource pool may comprise n slots (Y) in the time domain. The resource pool may comprise up to X*Y T/F resources. A wireless device may be configured, by a base station or by a second wireless device or by pre-configuration, with PSFCH resources for HARQ-ACK feedbacks. For example, the wireless device may be configured with a period of PSFCH resource (e.g., periodPSFCHresource, k). The period of PSFCH may be configured as a quantity of slots. The wireless device may determine the PSFCH resources of the resource pool in every slot with an interval of the period of PSFCH resource. The wireless device may determine PSFCH resources of the resource pool in every two slots, for example, if period of the PSFCH resource is two slots. The period of the PSFCH resource may be any other quantity of slots (or frames, subframes, etc.). A PSFCH may be configured with the resource pool. A last symbol of slot k may be the PSFCH. The PSFCH may comprise sixteen candidate PSFCH resources. An association mapping may be configured/pre-configured for the resource pool. A first resource of subchannel 1 in slot 1 may be associate with the candidate PSFCH resource 2. A second resource of subchannel 2 in slot 1 may be associated with the candidate PSFCH resource 6. A third resource of subchannel 3 in slot 1 may be associated with the candidate PSFCH resource 10. A fourth resource of subchannel 4 in slot 1 may be associated with the candidate PSFCH resource 14. A first sidelink transmission may be sent via the first resource of subchannel 1 in slot 1. The first sidelink transmission may comprise a first PSCCH transmission and a first PSSCH transmission. A first HARQ feedback corresponding to the first PSSCH transmission may be sent via the candidate PSFCH resource 2. A second sidelink transmission may be sent via the fourth resource of subchannel 4 in slot 1. The second sidelink transmission may comprise a second PSCCH transmission and a second PSSCH transmission. A second HARQ feedback corresponding to the second PSSCH may be sent via the second candidate PSFCH resource 14. As shown in FIG. 25, the first sidelink transmission and the second sidelink transmission may be sent via different resources. The candidate PSFCH resource 2 which is associated with the first PSSCH transmission of the first sidelink transmission is not overlapped with the candidate PSFCH resource 14 which is associated with the second PSSCH transmission of the second sidelink transmission.

Figure 26:
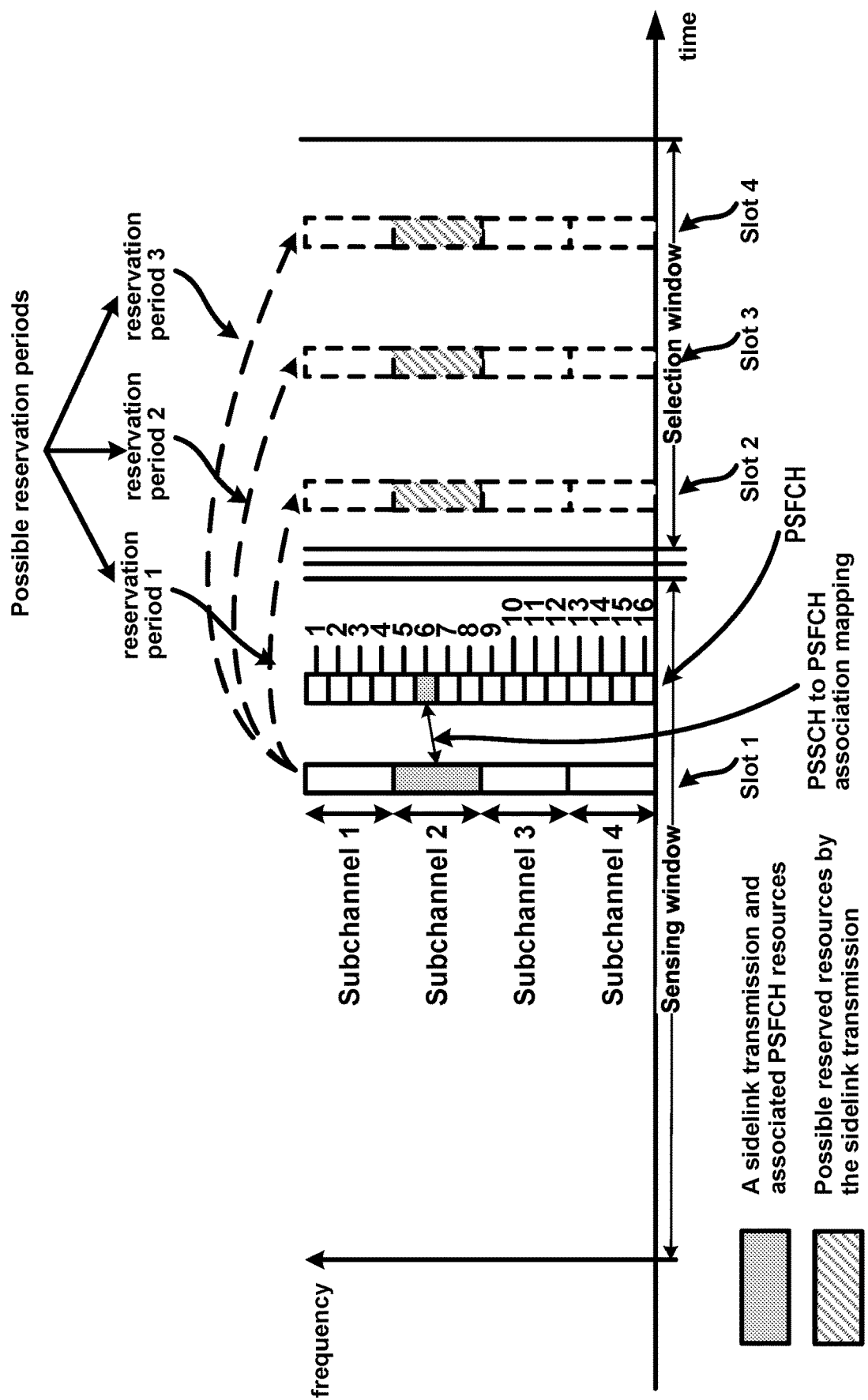
FIG. 26 shows an example sensing of a wireless device during a resource selection procedure.

FIG. 26 shows an example of an association mapping between PSSCH and PSFCH resources. FIG. 26 further shows resource selection based on sensing of a wireless device during a resource selection procedure (e.g., as described with reference to FIG. 21). Similar to FIG. 25, a resource pool may comprise four subchannels in the frequency domain. A PSFCH may be configured with the resource pool. The PSFCH may comprise sixteen candidate PSFCH resources. An association mapping may be configured/pre-configured for the resource pool. A first resource of subchannel 1 in slot 1 may be associated with the candidate PSFCH resource 2. A second resource of subchannel 2 in slot 1 may be associated with the candidate PSFCH resource 6. A third resource of subchannel 3 in slot 1 may be associated with the candidate PSFCH resource 10. A fourth resource of subchannel 4 in slot 1 may be associated with the candidate PSFCH resource 14. A first sidelink transmission may be sent via the second resource of the subchannel 2 in the slot 1. The first sidelink transmission may comprise a first PSCCH transmission and a first PSSCH transmission. A first HARQ feedback corresponding to the first PSSCH transmission of the first sidelink transmission may be sent via the candidate PSFCH resource 6. The first sidelink transmission may comprise SCI. The SCI may indicate the reservation period 1 for reserving resources of the subchannel 2 of slot 2 for a second sidelink transmission. A wireless device may not receive the SCI sent in slot 1. For example, the wireless device may send sidelink transmissions in the slot 1 and, as a result, be unable to receive the SCI transmitted in slot 1. As another example, the wireless device may receive data from a base station in the slot 1 and, as a result, be unable to receive the SCI transmitted in slot 1. The wireless device may perform a measurement in the measurement gap. The wireless device may not successfully receive the SCI. The wireless device may receive a HARQ-ACK feedback via a PSFCH resource of the PSFCH resources (e.g., resource #6). The PSFCH resource may be associated with (e.g., mapped to, or correspond to) a PSSCH resource in subchannel 2 of the slot 1. The wireless device may determine the PSSCH resource based on a mapping between one or more PSSCH resources and one or more PSFCH resources. The wireless device may determine that a sidelink transmission occurred in the subchannel 2 of the slot 1, for example, based on the PSFCH resource. The wireless device may exclude resources in a selection window based on the PSSCH resource and one or more reservation periods. As shown in FIG. 26, the wireless device may exclude subchannel 2 of slot 2, slot 3 and slot 4, corresponding to subchannel 2 of the slot 1, based on reservation period 1, reservation period 2 and reservation period 3.

Figure 27:
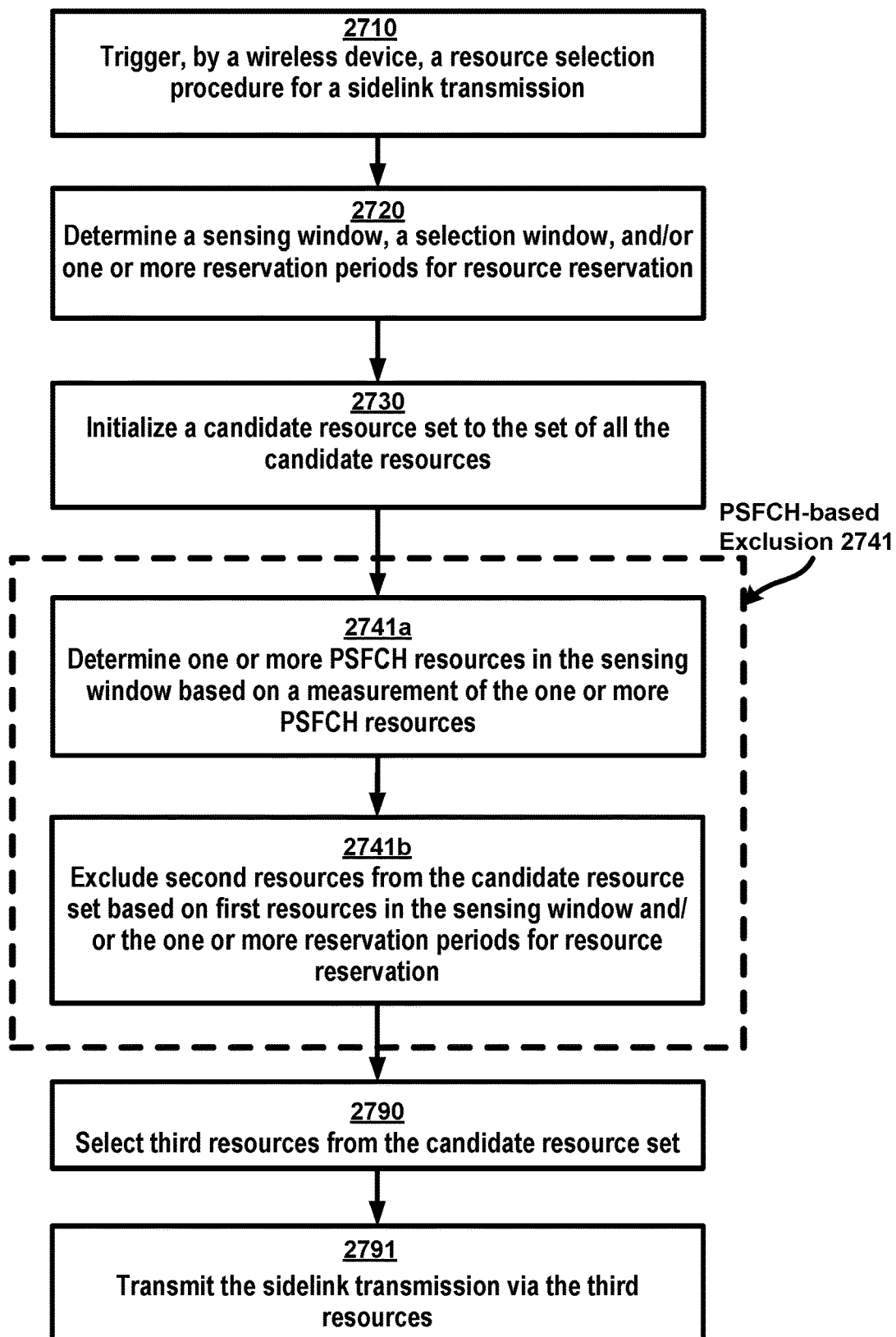
FIG. 27 shows an example method of PSFCH-based resource exclusion in a resource selection procedure.

FIG. 27 shows an example method of a PSFCH-based exclusion in a resource selection procedure. The example method 2741 may be performed by a wireless device. At step 2710, a wireless device may trigger a resource selection procedure for selecting resources for a sidelink transmission. The wireless device may trigger the resource selection procedure based on a determination that there are not enough available resources at the wireless device for sending the sidelink transmission. The wireless device may trigger the resource selection procedure based on a counter for counting a quantity of transmissions. The wireless device may set the counter to a first value (e.g., an initial value). The counter may be decreased by one based on (e.g., after) each transmission. The wireless device may trigger the resource selection procedure (e.g., with a particular probability) if a value of the counter equals zero. The wireless device may select a sidelink resource for a first sidelink transmission. The wireless device may determine a collision via the sidelink resource between the first sidelink transmission and a second sidelink transmission. The wireless device may trigger the resource selection procedure for re-selecting resources, for example, after or in response to determining the collision and before sending the first sidelink transmission via the sidelink resource.

At step 2720, the wireless device may determine a sensing window based on the triggering the resource selection procedure. A base station may send one or more messages to the wireless device for configuring one or more parameters. The one or more parameters may configure the sensing window. The one or more messages may comprise one or more RRC messages and/or SIBs. A second wireless device may send one or more messages, to the wireless device, for configuring the one or more parameters of the sensing window. The one or more messages may comprise one or more sidelink RRC messages, sidelink MAC CEs and/or SCI. The one or more parameters configuring the sensing window may be pre-configured for the wireless device. A memory of the wireless device may store the one or more parameters configuring the sensing window. The sensing window may be for a resource selection. The sensing window may be for a resource re-selection based on determining resource collision.

The wireless device may determine a selection window based on the triggering the resource selection procedure. A base station may send one or more messages to the wireless device for configuring one or more parameters. The one or more parameters may configure the selection window. The one or more messages may comprise one or more RRC messages and/or SIBs. A second wireless device may send one or more messages to the wireless device for configuring the one or more parameters of the selection window. The one or more messages may comprise one or more sidelink RRC messages, sidelink MAC CEs and/or SCI. The one or more parameters, configuring the selection window, may be pre-configured for the wireless device. A memory of the wireless device may store the one or more parameters defining the selection window. The selection window may be for a resource selection. The selection window may be for a resource re-selection based on determining resource collision.

The wireless device may determine one or more reservation periods for resource reservation. The one or more reservation periods may be configured for a resource pool. A base station may send one or more messages to the wireless device for configuring one or more parameters. The one or more parameters may indicate, to the wireless device, the one or more reservation periods. The one or more messages may comprise one or more RRC messages and/or SIBs. A second wireless device may send one or more messages to the wireless device. The one or more messages may comprise one or more messages for configuring the one or more reservation periods for the wireless device. The one or more messages may comprise one or more sidelink RRC messages, sidelink MAC CEs and/or SCI. The one or more reservation periods may be pre-configured for the wireless device. A memory of the wireless device may store the one or more reservation periods for resource reservation. The one or more reservation periods may be for resource reservation of an initial transmission and/or re-transmissions of a same TB. The one or more reservation periods may be for resource reservation of an initial transmission and/or re-transmissions of a different TB.

At step 2730, the wireless device may initialize a candidate resource set. The candidate resource set may comprise a plurality of candidate resources. The candidate resource set may be the union of the candidate resources in the selection window. A candidate resource may be a single-slot T/F resource. The candidate resource may comprise a slot in the time domain and one or more subchannels in the frequency domain. The candidate resource may be a single-subframe T/F resource. The candidate resource may comprise a subframe in the time domain and one or more subchannels in the frequency domain.

At step 2741a, the wireless device may determine one or more PSFCH resources in the sensing window. The wireless device may determine the one or more PSFCH resources based on a measurement of the one or more PSFCH resources. The measurement may be based on an energy detection of the one or more PSFCH resources. The measurement may correspond to received power(s) of signals sent via the one or more PSFCH resources, RSRP(s) of signals sent via the one or more PSFCH resources, received signal strength indications (RSSIs) of the one or more PSFCH resources, reference signal received qualities (RSRQs) of the one or more PSFCH resources, and/or a signal to interference ratios (SINRs) of the one or more PSFCH resources. The measurements may measure received power(s) associated with the one or more PSFCH resources. For example, the received power(s) may be average received power(s) of signals via the one or more PSFCH resources. For example, the received power(s) may be average received power(s) of one or more reference signals via the one or more PSFCH resources. The wireless device may assume that a transmission power of signals via the one or more PSFCH resources is equal to a maximum transmission power (or any other transmission power). The wireless device may compare the received power(s) of the one or more PSFCH resources with one or more threshold values. The wireless device may determine the one or more PSFCH resources based on the measurement of the one or more PSFCH resources and the one or more threshold values. A base station may send a message to the wireless device for configuring one or more parameters. The one or more parameters may indicate the one or more threshold values. The message may comprise an RRC message and/or SIB, a MAC CE, and/or DCI. A second wireless device may send a message to the wireless device for configuring the one or more threshold values. The message may comprise a sidelink RRC message, a sidelink MAC CE and/or SCI. The one or more threshold values may be pre-configured for the wireless device. A memory of the wireless device may store the one or more threshold values.

At step 2741b, the wireless device may exclude second resources from the candidate resource set. The wireless device may exclude the second resources, for example, based on first resources that are associated with: the one or more PSFCH resources in the sensing window and/or the one or more reservation periods for resource reservation. The second resources may be for a retransmission of a same TB as sent in a previous transmission via the first resources. The second resources may be for a new transmission of a TB different from a previous transmission via the first resources.

At step 2790, the wireless device may select third resources from the candidate resource set. The wireless device may select the third resources, for example, based on excluding the second resources from the candidate resource set. At step 2791, the wireless device may send the sidelink transmission via the selected third resources. The wireless device may perform a PSFCH-based exclusion 2741 described with respect to FIG. 27, for example, after a second exclusion 2250 as described with respect to FIG. 22. The wireless device may perform a PSFCH-based exclusion 2741 as described with respect to FIG. 27, for example, within a second exclusion 2250 as described with respect to FIG. 22.

Figure 28:
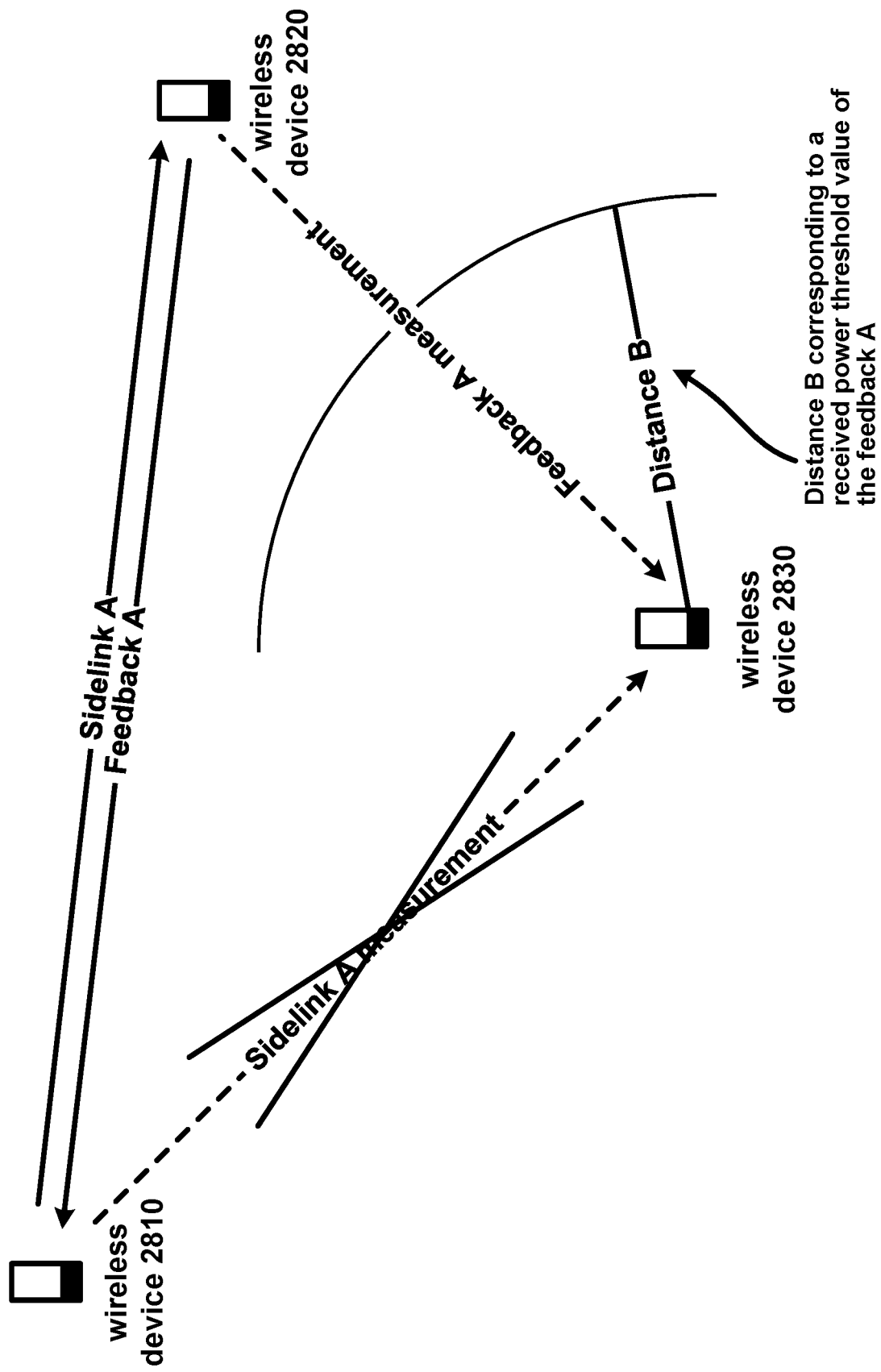
FIG. 28 shows an example of interference reduction based on feedback measurement in a resource selection procedure.

FIG. 28 shows an example of resource selection based on interference reduction. The example resource selection may be based on feedback measurement. A wireless device 2810 may send sidelink transmission A, via first resources, to a wireless device 2820. The wireless device 2820 may send feedback A to the wireless device 2810, for example, based on (e.g., after or in response to) receiving the sidelink transmission A. A wireless device 2830 may trigger the resource selection procedure to select third resources for sending a sidelink transmission. The wireless device may select the third resources from a candidate resource set. The wireless device 2830 may receive, in a sensing window, the feedback A from the wireless device 2820. The wireless device 2830 may measure the feedback A, for example, based on a received power of the feedback A sent via the PSFCH resources. The PSFCH resources may be associated with the first resources for sending the sidelink transmission A. The wireless device 2830 may or may not receive, in the sensing window, the sidelink transmission A from the wireless device 2810. The wireless device 2830 may determine the first resources based on an association mapping between the first resources and the PSFCH resources comprising the feedback A (e.g., the PSFCH resources via which the feedback A is sent). The wireless device 2830 may determine a distance B from the wireless device 2830, for example, based on a threshold value. A base station may send a message configuring the threshold value to the wireless device 2830. The message may comprise an RRC message, a SIB, a MAC CE, and/or DCI. A wireless device may send a message, for configuring the threshold value, to the wireless device 2830. The message may comprise a sidelink RRC message, a sidelink MAC CE and/or SCI. The threshold value may be pre-configured. A memory of the wireless device 2830 may store the pre-configured threshold value. The wireless device 2830 may determine the third resources based on the received power of the feedback A and the threshold value.

The wireless device 2830 may determine second resources that may have been reserved by SCI of the sidelink transmission A. The second resources may be for a future sidelink transmission from the wireless device 2810 to the wireless device 2820. The wireless device may determine the second resources, for example, based on the first resources and one or more reservation periods for resource reservation of a resource pool. For example, a base station may send a message for configuring the one or more reservation periods of the resource pool to the wireless device 2830. The resource pool may comprise the first resources, the second resources, the third resources, and/or the PSFCH resources. The message may comprise an RRC message, a SIB, a MAC CE, and/or DCI. For example, the one or more reservation periods of the resource pool may be pre-configured to the wireless device 2830. A memory of the wireless device 2830 may store the one or more reservation periods of the resource pool.

The wireless device 2830 may exclude the second resources based on one or more considerations. The wireless device 2830 may exclude the second resources from the candidate resource set, for example, based on the received power of the feedback A being greater than the threshold value. The wireless device 2830 may determine a distance from the wireless device 2830 to the wireless device 2820 being less than the distance B, for example, based on the received power of the feedback A being greater than the threshold value. The wireless device 2830 may not exclude the second resources from the candidate resource set, for example, based on the received power of the feedback A being less than the threshold value. The wireless device 2830 may determine a distance from the wireless device 2830 to the wireless device 2820 being larger than the distance B, for example, based on the received power of the feedback A being greater than the threshold value. The wireless device 2830 may select the third resources from the candidate resource set based on the excluding the second resources from the candidate resource set.

The wireless device 2830 may determine one or more distances from the wireless device 2830 based on one or more threshold values. The wireless device 2830 may determine the third resources based on the received power of the feedback A, the one or more threshold values, and/or a condition. The condition may be a probability for excluding the second resources from the candidate resource set. The probability may be based on the one or more threshold values. For example, the wireless device 2830 may compare the received power of the feedback A EA with a first threshold value Th1 and a second threshold value Th2, where Th1<Th2. The wireless device 2830 may determine a probability P1 for excluding the second resources from the candidate resource set if EA≤Th1. The wireless device 2830 may determine a probability P2 for excluding the second resources from the candidate resource set if Th1<EA<Th2. The wireless device 2830 may determine a probability P3 for excluding the second resources from the candidate resource set if Th2≤EA. In an example, 1≥P3≥P2≥P1≥0.

Figure 29:
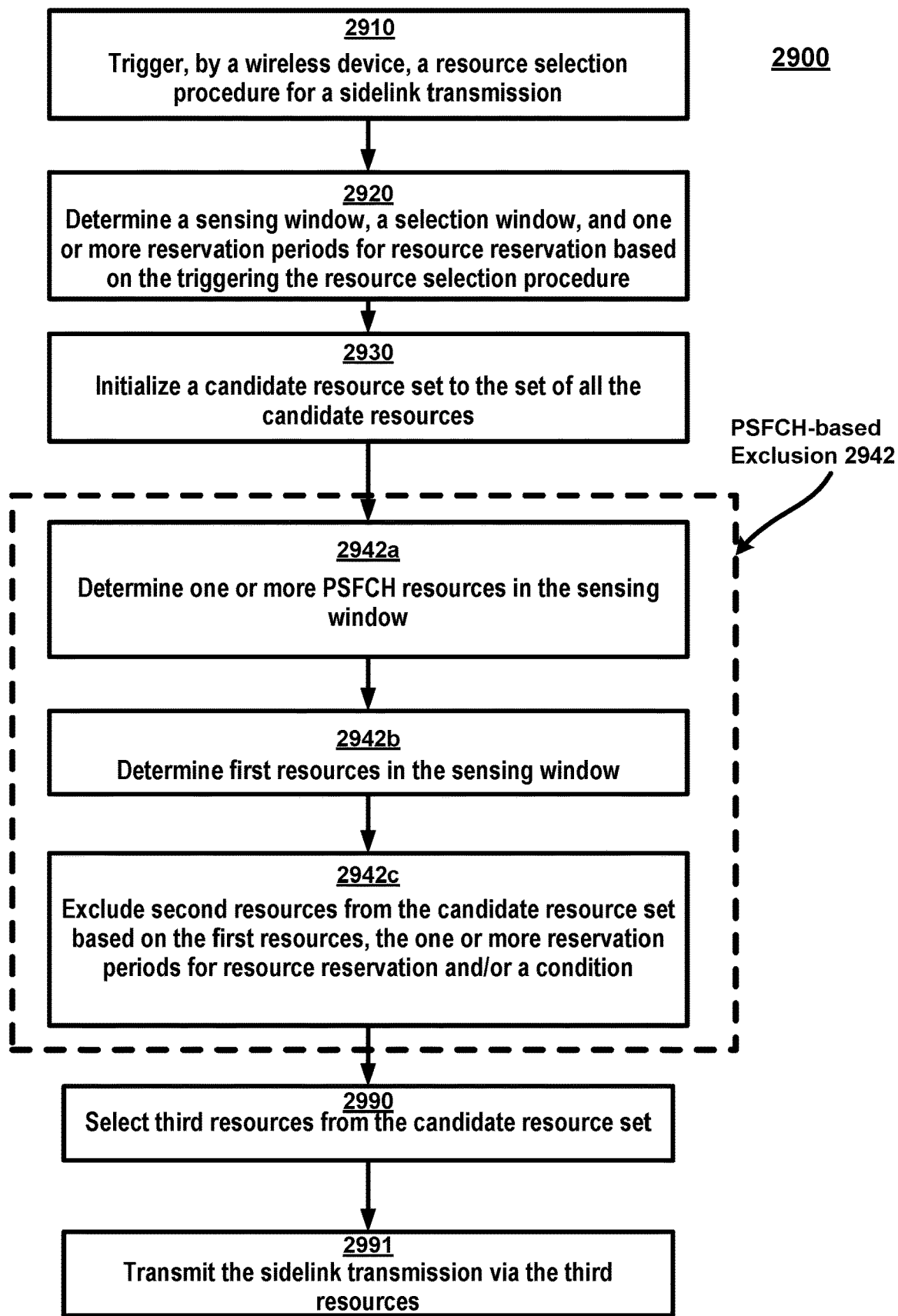
FIG. 29 shows an example method of PSFCH-based resource exclusion.

FIG. 29 shows an example method for resource selection. The example method for resource selection 2900 may be of PSFCH-based exclusion of resources. First resources may be determined concurrently with PSFCH resources in a sensing window. Steps 2910-2930 and 2990-2991 may correspond to steps 2710-2730 and 2790-2791, respectively, described with respect to FIG. 27. At step 2910, a wireless device may trigger a resource selection procedure for selecting resources for a sidelink transmission. The wireless device may trigger the resource selection procedure, for example, based on a determination that there are not enough available resources at the wireless device for sending the sidelink transmission. The wireless device may trigger the resource selection procedure based on a counter. The counter may track a quantity of transmissions. The wireless device may set a first value (e.g., an initial value) for the counter. The counter value may be decreased by one based on (e.g., after) each transmission. The wireless device may trigger the resource selection procedure (e.g., with a probability) if a second value of the counter equals zero. The wireless device may select a sidelink resource for a first sidelink transmission. The wireless device may determine a collision between the first sidelink transmission and a second sidelink transmission. The wireless device may trigger the resource selection procedure for re-selecting resources (e.g., based on determining the collision), for example, before sending the first sidelink transmission via the sidelink resource.

At step 2920, the wireless device may determine a sensing window. The wireless device may determine a sensing window, for example, based on the triggering the resource selection procedure. A base station may send one or more messages to the wireless device for configuring one or more parameters. The one or more parameters may configure the sensing window. The one or more messages may comprise one or more RRC messages and/or SIBs. A second wireless device may send one or more messages to the wireless device for configuring the one or more parameters of the sensing window. The one or more messages may comprise one or more comprise one or more RRC messages, sidelink MAC CEs, and/or SCI. The one or more parameters configuring the sensing window may be pre-configured at the wireless device. A memory of the wireless device may store the one or more parameters configuring the sensing window. The sensing window may be for resource selection. The sensing window may be for resource re-selection based on determining resource collision.

The wireless device may determine a selection window, for example, based on the triggering the resource selection procedure. A base station may send one or more messages to the wireless device for configuring one or more parameters. The one or more parameters may configure the selection window. The one or more messages may comprise one or more RRC messages and/or SIBs. A second wireless device may send one or more messages to the wireless device for configuring the one or more parameters of the selection window. The one or more messages may comprise one or more sidelink RRC messages, sidelink MAC CEs, and/or SCI. The one or more parameters configuring the selection window may be pre-configured at the wireless device. A memory of the wireless device may store the one or more parameters defining the selection window. The selection window may be for resource selection. The selection window may be for a resource re-selection based on determining resource collision.

The wireless device may determine one or more reservation periods for resource reservation. The one or more reservation periods may be configured for a resource pool. A base station may send one or more messages to the wireless device for configuring one or more parameters. The one or more parameters may indicate, to the wireless device, the one or more reservation periods. The one or more messages may comprise one or more RRC messages and/or SIBs. A second wireless device may send one or more messages, to the wireless device, for configuring the one or more reservation periods. The one or more messages may comprise one or more sidelink RRC messages, sidelink MAC CEs, and/or SCI. The one or more reservation periods may be pre-configured for the wireless device. A memory of the wireless device may store the one or more reservation periods for resource reservation. The one or more reservation periods may be for resource reservation of an initial transmission and/or re-transmissions of a same TB. The one or more reservation periods may be for resource reservation for an initial transmission and/or for re-transmissions of a different TB.

At step 2930, the wireless device may initialize a candidate resource set. The candidate resource set may comprise a plurality of candidate resources. The candidate resource set may be a union of the candidate resources in the selection window. A candidate resource may be a single-slot T/F resource. The candidate resource may comprise a slot in the time domain and one or more subchannels in the frequency domain. The candidate resource may be a single-subframe T/F resource. The candidate resource may comprise a subframe in the time domain and one or more subchannels in the frequency domain.

At step 2942a, the wireless device may determine one or more PSFCH resources in the sensing window. The wireless device may determine the one or more PSFCH resources, for example, based on a measurement of signals sent via the one or more PSFCH resources. The measurement may be based on an energy detection of the one or more PSFCH resources. The measurement may correspond to received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may indicate received power(s) of signals sent via the one or more PSFCH resources. For example, the received power(s) may be average received power(s) of signals sent via the one or more PSFCH resources. The received power(s) may be average received power(s) of one or more reference signals sent via the one or more PSFCH resources. The wireless device may assume/determine that a transmission power of signals sent via the one or more PSFCH resources is a maximum transmission power (or any other transmission power). The wireless device may compare the received power associated with the one or more PSFCH resources with one or more threshold values. The wireless device may determine the one or more PSFCH resources based on the measurements associated with the one or more PSFCH resources and the one or more threshold values. A base station may send a message to the wireless device for configuring one or more parameters. The one or more parameters may indicate the one or more threshold values. The message may comprise an RRC message, a SIB, a MAC CE, and/or DCI. A second wireless device may send a message to the wireless device for configuring the one or more threshold values. The message may comprise a sidelink RRC message, a sidelink MAC CE and/or SCI. The one or more threshold values may be pre-configured for the wireless device. A memory of the wireless device may store the one or more threshold values.

At step 2942b, the wireless device may determine first resources in the sensing window. The wireless device may determine the first resources, for example, based on an association mapping between the first resources and the one or more PSFCH resources. At step 2942c, the wireless device may exclude second resources from the candidate resource set based on the first resources, the one or more reservation periods for resource reservation, and/or a condition. The condition may be a probability of excluding the second resources from the candidate resource set. The probability may correspond to/based on the one or more threshold values (e.g., as described with respect to FIG. 28). The second resources may be for a retransmission of a same TB as included in previous transmission via the first resources. The second resources may be for a new transmission of a different TB than a TB included in a previous transmission via the first resources.

At step 2990, the wireless device may select third resources from the candidate resource set. The wireless device may select third resources based on the excluding the second resources from the candidate resource set. At step 2991, the wireless device may send the sidelink transmission via the selected third resources.

Figure 30:
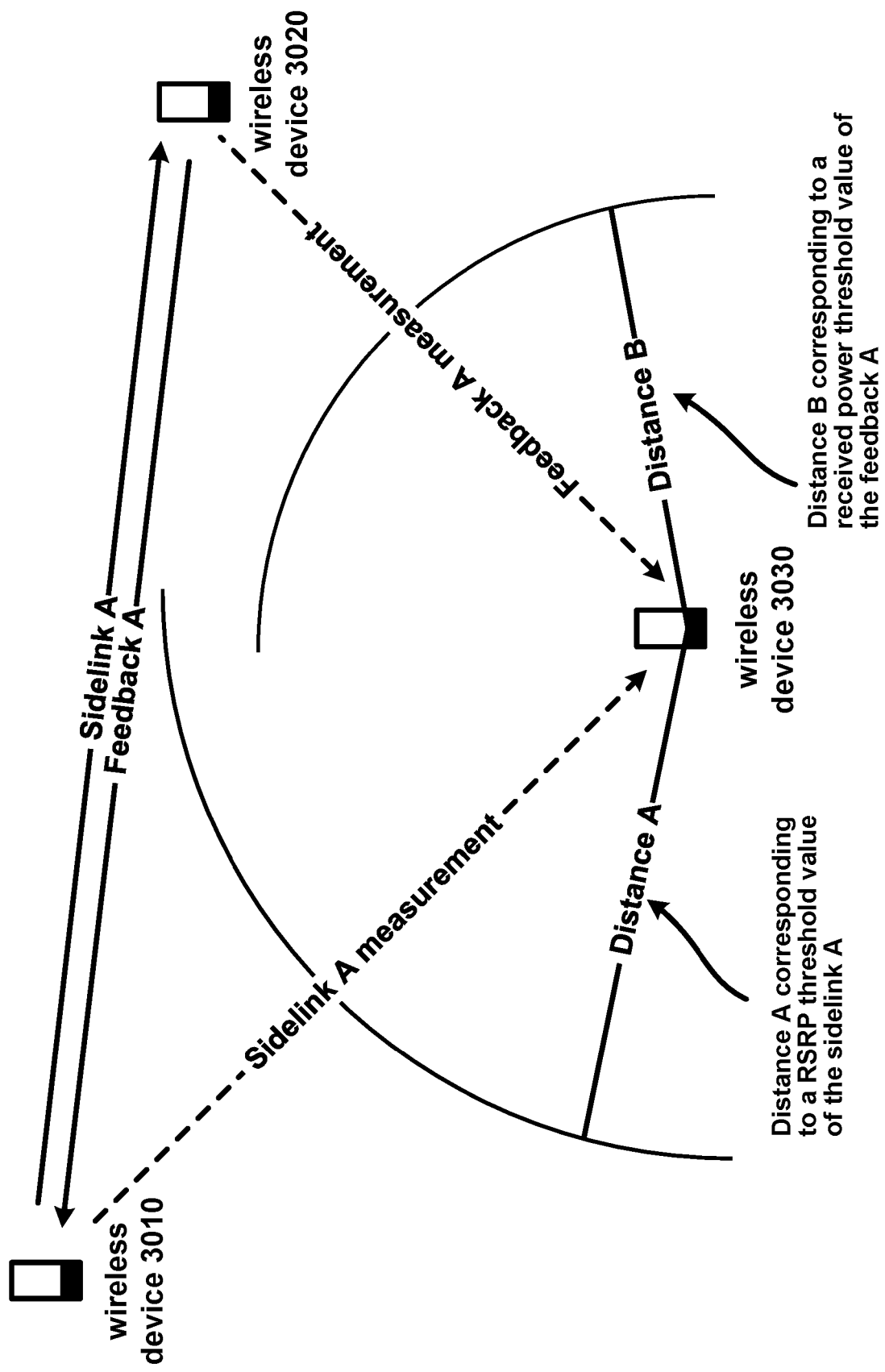
FIG. 30 shows an example of interference reduction based on feedback measurement in a resource selection procedure.

FIG. 30 shows an example communication for resource selection. The resource selection may target interference reduction. The resource selection may be performed based on feedback measurement and/or sidelink measurement. A wireless device 3010 may send, via first resources, sidelink transmission A to a wireless device 3020. The wireless device 3020 may send feedback A to the wireless device 3010, for example, based on (e.g., after or in response to) receiving the sidelink transmission A. A wireless device 3030 may trigger the resource selection procedure to select third resources for sending a sidelink transmission. The wireless device 30303 may select the third resources from the candidate resource set.

The wireless device 3030 may receive, from the wireless device 3010, the sidelink transmission A. The wireless device 3030 may receive the sidelink transmission A in a sensing window. The wireless device 3010 may measure an RSRP of the sidelink transmission A, for example, based on decoding SCI of the sidelink transmission A. The wireless device 3030 may determine a distance A from the wireless device 3010 based on a RSRP threshold value. The SCI may indicate a priority of the sidelink transmission A. A mapping between one or more RSRP threshold values and one or more priorities may exist and/or may be determined/configured. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device 3030 may determine the RSRP threshold value based on the priority of the sidelink transmission A, and/or the mapping between the one or more RSRP threshold values and the one or more priorities. A base station may send, to the wireless device 3030, a message configuring the RSRP threshold value. The message may comprise an RRC message, an SIB, a MAC CE, and/or DCI. Another wireless device may send, to the wireless device 3030, a message for configuring the RSRP threshold value. The message may comprise a sidelink RRC message, a sidelink MAC CE, and/or SCI. The RSRP threshold value may be pre-configured. A memory of the wireless device 3030 may store the pre-configured RSRP threshold value. The wireless device 3030 may determine the third resources based on the RSRP of the sidelink transmission A and the RSRP threshold value.

The wireless device 3030 may receive the feedback A from the wireless device 3020. The wireless device 3030 may receive the feedback A in the sensing window via PSFCH resources. The wireless device 3030 may measure the feedback A, for example, based on a received power of the feedback A. The PSFCH resources may be associated with the first resources used for sending the sidelink transmission A. The wireless device 3030 may determine a distance B from the wireless device 3020 based on a threshold value. A mapping between one or more threshold values and cast types may be configured. The cast types may comprise unicast, groupcast option 1, groupcast option 2, and/or broadcast. For example, a first threshold value may map to (or associate with) unicast, a second threshold value may map to (or associate with) groupcast option 1, a third threshold value may map to (or associate with) groupcast option 2, and/or a fourth threshold vale may map to (or associate with) broadcast. The wireless device 3030 may determine the threshold value based on a cast type of the sidelink transmission A. A base station may send a message configuring the threshold value for the wireless device 3030. The message may comprise an RRC message, an SIB, a MAC CE, and/or DCI. Another wireless device may send a message for configuring the threshold value to the wireless device 3030. The message may comprise a sidelink RRC message, a sidelink MAC CE, and/or a SCI. The threshold value may be pre-configured. A memory of the wireless device 3030 may store the pre-configured threshold value. The wireless device 3030 may determine the third resources based on the received power of the feedback A and the threshold value.

The wireless device 3030 may determine second resources based on decoding the SCI of the sidelink transmission A. The SCI may indicate resource assignment of the second resources for a future sidelink transmission, from the wireless device 3010 to the wireless device 3020, via a resource pool. The future sidelink transmission may be a retransmission of the same TB as sent via the sidelink transmission A. The SCI may indicate a reservation period, of one or more reservation periods, for reservation of the second resources. The second resources may be for a future sidelink transmission, from the wireless device 3010 to the wireless device 3020, via a resource pool. The future sidelink transmission may be a new transmission of a different TB than as sent via the sidelink transmission A. For example, a base station may send, to the wireless device 3030, a message for configuring the one or more reservation periods of the resource pool. The resource pool may comprise the first resources, the second resources, the third resources, and/or the PSFCH resources. The message may comprise an RRC message, an SIB, a MAC CE, and/or DCI. For example, the one or more reservation periods of the resource pool may be pre-configured for the wireless device 3030. A memory of the wireless device 3030 may store the one or more reservation periods of the resource pool.

The wireless device 3030 may exclude the second resources from the candidate resource set based on one or more considerations. The wireless device 3030 may exclude the second resources from the candidate resource set, for example, if the RSRP of the sidelink transmission A is greater than the RSRP threshold value and/or if the received power of the feedback A is greater than the threshold value. The wireless device 3030 may determine that a distance from the wireless device 3030 to the wireless device 3010 is less than the distance A and/or that a distance from the wireless device 3030 to the wireless device 3020 is less than the distance B, for example, based on the RSRP of the sidelink transmission A being greater than the RSRP threshold value and the received power of the feedback A is greater than the threshold value. The wireless device 3030 may not exclude the second resources from the candidate resource set, for example, if the RSRP of the sidelink transmission A is less than the RSRP threshold value and/or the received power of the feedback A is less than the threshold value. The wireless device 3030 may determine that a distance from the wireless device 3030 to the wireless device 3010 is larger than the distance A and a distance from the wireless device 3030 to the wireless device 3020 is larger than the distance B, for example, based on the RSRP of the sidelink transmission A being less than the RSRP threshold value and the received power of the feedback A being less than the threshold value. The wireless device 3030 may select the third resources from the candidate resource set based on the exclusion of the second resources from the candidate resource set.

The wireless device 3030 may determine one or more distances from the wireless device 3030, for example, based on one or more threshold values. The wireless device 3030 may determine the third resources based on the received power of the feedback A, the one or more threshold values, and a condition. The condition may be a probability for excluding the second resources from the candidate resource set. The probability may be based on the one or more threshold values. The wireless device 3030 may compare the received power of the feedback A EA with a first threshold value Th1 and a second threshold value Th2, where Th1<Th2. The wireless device 3030 may determine a probability P1 for excluding the second resources from the candidate resource set, for example, if EA≤Th1. The wireless device 3030 may determine a probability P2 for excluding the second resources from the candidate resource set, for example, if Th1<EA<Th2. The wireless device 3030 may determine a probability P3 for excluding the second resources from the candidate resource set, for example, if Th2≤EA. In an example, 1≥P3≥P2≥P1≥0.

Figure 31:
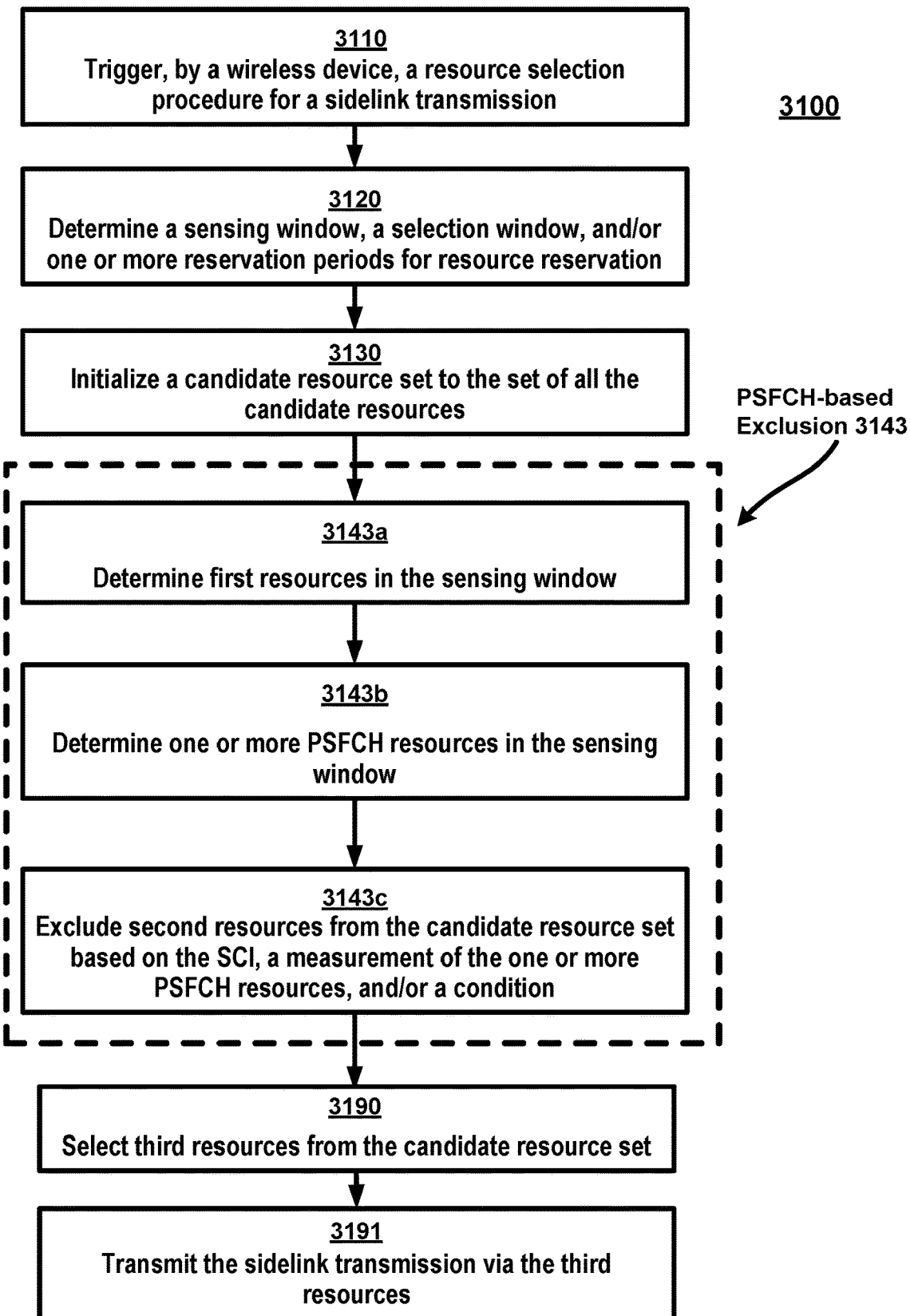
FIG. 31 shows an example method of PSFCH-based resource exclusion in a resource selection procedure.

FIG. 31 shows an example method for resource selection. The example method 3100 may comprise PSFCH-based exclusion of resources. Resources may be determined/selected based on a feedback measurement and/or based on a sidelink measurement. At step 3110, a wireless device may trigger a resource selection procedure for selecting resources for a sidelink transmission. The wireless device may trigger the resource selection procedure, for example, if the wireless device determines that there are not enough available resources at the wireless device for sending the sidelink transmission. The wireless device may trigger the resource selection procedure based on a counter for counting a quantity of transmissions. The wireless device may set a first value (e.g., an initial value) for the counter. The counter value may be decreased by one (or any other value) based on (e.g., after) each transmission. The wireless device may trigger the resource selection procedure (e.g., with a probability), for example, if a second value of the counter equals zero (or any other value). The wireless device may select a sidelink resource for a first sidelink transmission. The wireless device may determine a collision between the first sidelink transmission and a second sidelink transmission. The wireless device may trigger the resource selection procedure for re-selecting resources, for example, based on (e.g., after or in response to) determining the collision and before sending the first sidelink transmission via the sidelink resource.

At step 3120, the wireless device may determine a sensing window based on the triggering the resource selection procedure. A base station may send, to the wireless device, one or more messages. The one or more messages may comprise one or more messages for configuring one or more parameters. The one or more parameters may configure the sensing window. The one or more messages may comprise one or more RRC messages and/or SIBs. A second wireless device may send one or more messages to the wireless device for configuring the one or more parameters of the sensing window. The one or more messages may comprise one or more sidelink RRC messages, sidelink MAC CEs, and/or SCI. The one or more parameters configuring the sensing window may be pre-configured for the wireless device. A memory of the wireless device may store the one or more parameters configuring the sensing window. The sensing window may be for resource selection. The sensing window may be for resource re-selection based on determining resource collision.

The wireless device may determine a selection window based on the triggering the resource selection procedure. A base station may send one or more messages to the wireless device for configuring one or more parameters. The one or more parameters may configure the selection window. The one or more messages may comprise one or more RRC messages and/or SIBs. A second wireless device may send one or more messages to the wireless device for configuring the one or more parameters of the selection window. The one or more messages may comprise one or more sidelink RRC messages, sidelink MAC CEs and/or SCI. The one or more parameters, configuring the selection window, may be pre-configured for the wireless device. A memory of the wireless device may store the one or more parameters defining the selection window. The selection window may be for resource selection. The selection window may be for resource re-selection based on determining resource collision.

The wireless device may determine one or more reservation periods for resource reservation. The one or more reservation periods may be configured for a resource pool. A base station may send one or more messages to the wireless device for configuring one or more parameters. The one or more parameters may indicate, to the wireless device, the one or more reservation periods. The one or more messages may comprise one or more RRC messages and/or SIBs. A second wireless device may send one or more messages, to the wireless device, for configuring the one or more reservation periods. The one or more messages may comprise one or more sidelink RRC messages, sidelink MAC CEs, and/or SCI. The one or more reservation periods may be pre-configured for the wireless device. A memory of the wireless device may store the one or more reservation periods for resource reservation. The one or more reservation periods may be for resource reservation of an initial transmission and/or re-transmissions of a same TB. The one or more reservation periods may be for resource reservation of an initial transmission and/or re-transmissions of a different TB.

At step 3130, the wireless device may initialize a candidate resource set. The candidate resource set may comprise a plurality of candidate resources. The candidate resource set may comprise the union of the candidate resources in the selection window. A candidate resource may comprise a single-slot T/F resource. The candidate resource may comprise a slot in the time domain and one or more subchannels in the frequency domain. The candidate resource may comprise a single-subframe T/F resource. The candidate resource may comprise a subframe in the time domain and one or more subchannels in the frequency domain.

At step 3143a, the wireless device may determine first resources in the sensing window. A second wireless device may send a second sidelink transmission via the first resources. The second sidelink transmission may comprise SCI. The SCI may indicate resource assignment and/or reservation of second resources in the selection window. The SCI may indicate the resource assignment of the second resources. The second wireless device may send a third sidelink transmission, via the second resources. The third sidelink transmission may comprise the same TB as sent via the second sidelink transmission. The SCI may indicate a reservation period of the one or more reservation periods for the resource reservation of the second resources. The second wireless device may send a third sidelink transmission, via the second resources. The third sidelink transmission may comprise a different TB than a TB sent via the second sidelink transmission. The wireless device may measure an RSRP of the second sidelink transmission based on the SCI. The wireless device may compare the RSRP of the second sidelink transmission with an RSRP threshold value. The SCI may indicate a priority of the second sidelink transmission. A mapping between one or more RSRP threshold values and one or more priorities may be configured/determined. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device may determine the RSRP threshold value based on the priority of the second sidelink transmission and the mapping between the one or more RSRP threshold values and the one or more priorities. A base station may send a message, to the wireless device, for configuring/determining the RSRP threshold value. The message may comprise an RRC message, an SIB, a MAC CE, and/or DCI. A third wireless device may send a message, to the wireless device, for configuring the RSRP threshold value. The message may comprise a sidelink RRC message, a sidelink MAC CE and/or SCI. The RSRP threshold value(s) may be pre-configured. A memory of the wireless device may store the pre-configured RSRP threshold value(s).

At step 3143b, the wireless device may determine one or more PSFCH resources in the sensing window. The wireless device may determine the one or more PSFCH resources based on an association mapping between the first resources and the one or more PSFCH resources. At step 3143c, the wireless device may exclude second resources from the candidate resource set. The wireless device may exclude the second resources based on the SCI, a measurement of the one or more PSFCH resources, and/or a condition. The measurement may be based on an energy detection of the one or more PSFCH resources. The measurement may correspond to received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may comprise received power(s) of signals sent via the one or more PSFCH resources. For example, the received power(s) may be average received power(s) of signals sent via the one or more PSFCH resources. For example, the received power(s) may be average received power(s) of one or more reference signals sent via the one or more PSFCH resources. The wireless device may assume/determine a transmission power of signals sent via the one or more PSFCH resources to be a maximum transmission power (or any other transmission power). The wireless device may compare the received power(s) of signals sent via the one or more PSFCH resources with one or more threshold values. A mapping between one or more threshold values and cast types may exist (e.g., may be configured/determined). The cast types may comprise unicast, groupcast option 1, groupcast option 2, and/or broadcast. For example, a first threshold value may map to (or associate with) unicast, a second threshold value may map to (or associate with) groupcast option 1, a third threshold value may map to (or associate with) groupcast option 2, and/or a fourth threshold vale may map to (or associate with) broadcast. The wireless device may determine the threshold value based on a cast type of the second sidelink transmission. A base station may send a message to the wireless device for configuring one or more parameters. The one or more parameters may indicate the one or more threshold values. The message may comprise an RRC message, an SIB, a MAC CE, and/or DCI. A fourth wireless device may send a message to the wireless device for configuring the one or more threshold values. The message may comprise a sidelink RRC message, a sidelink MAC CE and/or SCI. The one or more threshold values may be pre-configured for the wireless device. A memory of the wireless device may store the one or more threshold values. The condition may be a probability of excluding the second resources from the candidate resource set. The probability may be based on the one or more threshold values. The wireless device may exclude the second resources from the candidate resource set if, for example, the RSRP of the second sidelink transmission is greater than the RSRP threshold value and/or the received power of signals via the one or more PSFCH resources is greater than a threshold value of the one or more threshold values. At step 3190, the wireless device may select third resources from the candidate resource set. The wireless device may select the third resources based on excluding the second resources from the candidate resource set. At step 3191, the wireless device may send the sidelink transmission via the selected third resources.

Figure 32:
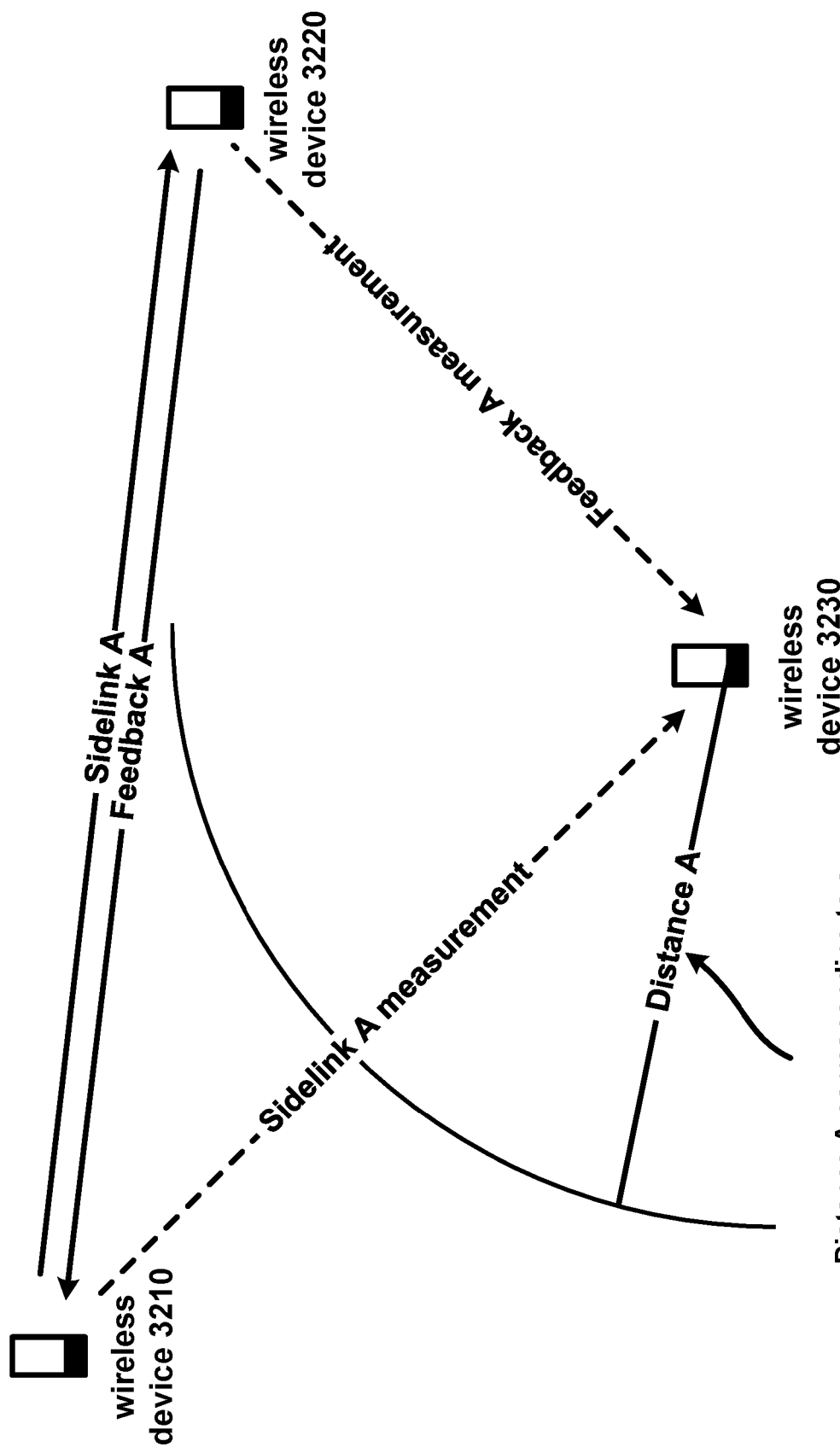
FIG. 32 shows an example of interference reduction based on feedback measurement in a resource selection procedure.

FIG. 32 shows an example communication for resource selection. The resource selection may target interference reduction. The resource selection may be based on the collective RSRP value of a feedback and sidelink measurement. A wireless device 3210 may send sidelink transmission A, via first resources, to a wireless device 3220. The wireless device 3220 may send feedback A to the wireless device 3210, for example, after receiving the sidelink transmission A. A wireless device 3230 may trigger the resource selection procedure to select third resources from a candidate resource set. The third resources may be for sending a sidelink transmission.

The wireless device 3230 may receive the sidelink transmission A from the wireless device 3210. The wireless device 3230 may receive the sidelink transmission A in a sensing window. The wireless device 3230 may measure an RSRP of the sidelink transmission A, for example, based on decoding SCI of the sidelink transmission A. The wireless device 3230 may determine a distance A from the wireless device 3230, for example, based on a RSRP threshold value. The SCI may further indicate a priority of the sidelink transmission A. A mapping between one or more RSRP threshold values and one or more priorities may be configured/determined. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device 3230 may determine the RSRP threshold value, for example, based on the priority of the sidelink transmission A and the mapping between the one or more RSRP threshold values and the one or more priorities. A base station may send a message, to the wireless device 3230, configuring the RSRP threshold value. The message may comprise an RRC message, an SIB, a MAC CE, and/or DCI. A wireless device may send a message, to the wireless device 3230, for configuring the RSRP threshold value. The message may comprise a sidelink RRC message, a sidelink MAC CE and/or SCI. The RSRP threshold value(s) may be pre-configured. A memory of the wireless device 3230 may store the pre-configured RSRP threshold value(s). The wireless device 3230 may determine the third resources based on the RSRP of the sidelink transmission A and the RSRP threshold value(s).

The wireless device 3230 may receive the feedback A, via PSFCH resources, from the wireless device 3220. The wireless device 3230 may receive the feedback A in the sensing window. The wireless device 3230 may measure the feedback A, for example, based on a received power of the feedback A. The PSFCH resources may be associated with the first resources for sending the sidelink transmission A. The wireless device 3230 may determine an offset value of one or more offset values based on a threshold value of one or more threshold values. A mapping between the one or more threshold values and cast types may be configured. The cast types may comprise unicast, groupcast option 1, groupcast option 2, and/or broadcast. For example, a first threshold value may map to (or associate with) unicast, a second threshold value may map to (or associate with) groupcast option 1, a third threshold value may map to (or associate with) groupcast option 2, and/or a fourth threshold vale may map to (or associate with) broadcast. The wireless device 3230 may determine the threshold value based on a cast type of the sidelink transmission A. A mapping between the one or more offset values and the one or more threshold values may be configured/determined. For example, a first offset value of the one or more offset values may map to (or associate with) a first threshold value of the one or more threshold values, and a second offset value of the one or more offset values may map to (or associate with) a second threshold value of the one or more threshold values. The wireless device 3230 may determine the offset value based on the threshold value and the mapping between the one or more offset values and the one or more threshold values. A base station may send a message, to the wireless device 3230, which may configure the one or more offset values and/or the one or more threshold values. The message may comprise an RRC message, an SIB, a MAC CE, and/or DCI. A wireless device may send a message, to the wireless device 3230, for configuring the one or more offset values and/or the one or more threshold values. The message may comprise a sidelink RRC message, a sidelink MAC CE and/or SCI. The one or more offset values and/or the one or more threshold values may be pre-configured. A memory of the wireless device 3230 may store the pre-configured one or more offset values and/or one or more threshold values. The wireless device 3230 may determine the third resources based on the received power of the feedback A, the offset value, and/or the threshold value.

The wireless device 3230 may determine second resources based on decoding the SCI of the sidelink transmission A. The SCI may indicate resource assignment of the second resources. The second resources may be for a future sidelink transmission, from the wireless device 3210 to the wireless device 3220, via a resource pool. The future sidelink transmission may be a retransmission of the same TB as sent in the sidelink transmission A. The SCI may indicate a reservation period, of one or more reservation periods, for resource reservation of the second resources for the future sidelink transmission. The future sidelink transmission may be a new transmission of a different TB than a TB sent in the sidelink transmission A. For example, a base station may send a message, to the wireless device 3230, for configuring the one or more reservation periods of the resource pool. The resource pool may comprise the first resources, the second resources, the third resources, and/or the PSFCH resources. The message may comprise an RRC message, an SIB, a MAC CE, and/or DCI. The one or more reservation periods of the resource pool may be pre-configured for the wireless device 3230. A memory of the wireless device 3230 may store the one or more reservation periods of the resource pool.

The wireless device 3230 may exclude the second resources from the candidate resource set. The wireless device 3230 may exclude the second resources from the candidate resource set, for example, based on the RSRP of the sidelink transmission A, the RSRP threshold value, and/or the offset value. The offset value may be added to the RSRP of the sidelink transmission A. The wireless device 3230 may exclude the second resources from the candidate resource set, for example, if (the RSRP of the sidelink A+the offset value)≥the RSRP threshold value. The wireless device 3230 may not exclude the second resources from the candidate resource set, for example, if (the RSRP of the sidelink A+the offset value)< the RSRP threshold value. The offset value may be added to the RSRP threshold value. The wireless device 3230 may exclude the second resources from the candidate resource set, for example, if the RSRP of the sidelink A (the RSRP threshold value+the offset value). The wireless device 3230 may not exclude the second resources from the candidate resource set, for example, if the RSRP of the sidelink A<(the RSRP threshold value+the offset value). The wireless device 3230 may select the third resources from the candidate resource set based on excluding the second resources from the candidate resource set.

The wireless device 3230 may determine one or more offset values based on one or more threshold values. The wireless device 3230 may determine the third resources based on the one or more offset values. The wireless device 3230 may compare the received power of the feedback A EA with a first threshold value Th1 and a second threshold value Th2, where Th1<Th2. The wireless device 3230 may determine a first offset value, of the one or more offset values, for excluding the second resources from the candidate resource set, for example, if EA≤Th1. The wireless device 3230 may determine a second offset value, of the one or more offset values, for excluding the second resources from the candidate resource set, for example, if Th1<EA<Th2. The wireless device 3230 may determine a third offset value of the one or more offset values for excluding the second resources from the candidate resource set, for example, if Th2≤EA.

Figure 33:
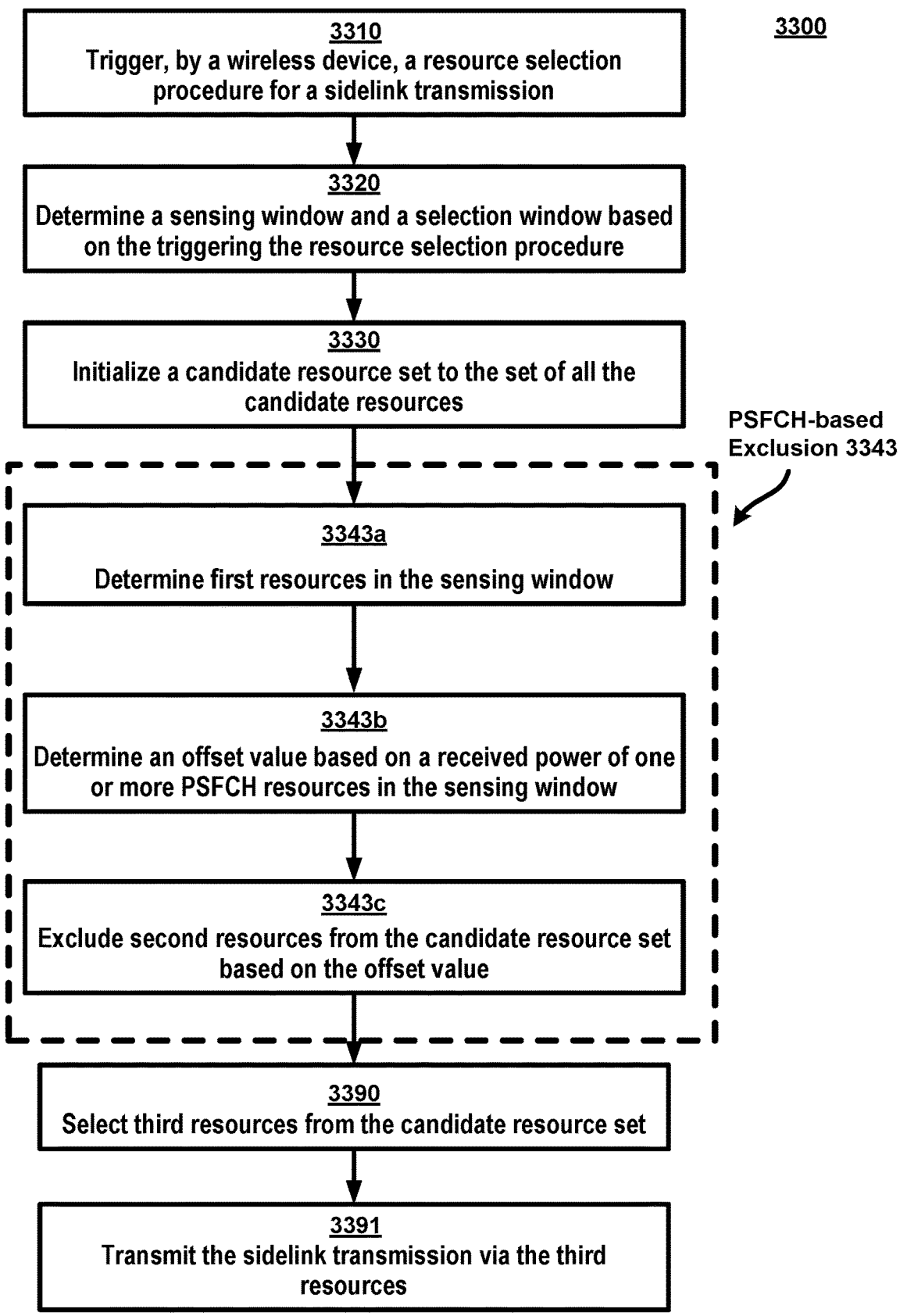
FIG. 33 shows an example method of PSFCH-based resource exclusion based on an offset value.

FIG. 33 shows an example method for resource selection. The example method 3300 may comprise PSFCH-based exclusion. At step 3310, a wireless device may trigger a resource selection procedure for selecting resources for a sidelink transmission. The wireless device may trigger the resource selection procedure based on a determination that there are not enough available resources at the wireless device for sending the sidelink transmission. The wireless device may trigger the resource selection procedure based on a counter for counting/determining a quantity of transmissions. The wireless device may set a first value (e.g., an initial value) for the counter. The counter value may be decreased by one based on (e.g., after) each transmission. The wireless device may trigger the resource selection procedure (e.g., with a probability), for example, if a second value of the counter equals zero. The wireless device may select/determine a sidelink resource for a first sidelink transmission. The wireless device may determine a collision between the first sidelink transmission and a second sidelink transmission. The wireless device may trigger the resource selection procedure for re-selecting resources, for example, based on (e.g., after or in response to) determining the collision and before sending the first sidelink transmission via the sidelink resource.

At step 3320, the wireless device may determine a sensing window based on the triggering the resource selection procedure. A base station may send one or more messages, to the wireless device, for configuring one or more parameters. The one or more parameters may configure the sensing window. The one or more messages may comprise one or more RRC messages and/or SIBs. A second wireless device may send one or more messages, to the wireless device, for configuring the one or more parameters of the sensing window. The one or more messages may comprise one or more sidelink RRC messages, sidelink MAC CEs, and/or SCI. The one or more parameters configuring the sensing window may be pre-configured for the wireless device. A memory of the wireless device may store the one or more parameters configuring the sensing window. The sensing window may be for resource selection. The sensing window may be for resource re-selection based on determining resource collision.

The wireless device may determine a selection window, for example, based on the triggering the resource selection procedure. A base station may send one or more messages, to the wireless device, for configuring one or more parameters. The one or more parameters may configure the selection window. The one or more messages may comprise one or more RRC messages and/or SIBs. A second wireless device may send one or more messages, to the wireless device, for configuring the one or more parameters of the selection window. The one or more messages may comprise one or more sidelink RRC messages, sidelink MAC CEs, and/or SCI. The one or more parameters configuring the selection window may be pre-configured for the wireless device. A memory of the wireless device may store the one or more parameters defining the selection window. The selection window may be for resource selection. The selection window may be for resource re-selection based on determining resource collision.

The wireless device may determine one or more reservation periods for resource reservation. The one or more reservation periods may be configured for a resource pool. A base station may send one or more messages, to the wireless device, for configuring one or more parameters. The one or more parameters may indicate the one or more reservation periods to the wireless device. The one or more messages may comprise one or more RRC messages and/or SIBs. A second wireless device may send one or more messages, to the wireless device, for configuring the one or more reservation periods. The one or more messages may comprise one or more sidelink RRC messages, sidelink MAC CEs, and/or SCI. The one or more reservation periods may be pre-configured for the wireless device. A memory of the wireless device may store the one or more reservation periods for resource reservation. The one or more reservation periods may be for resource reservation for an initial transmission and/or re-transmissions of a same TB. The one or more reservation periods may be for resource reservation for an initial transmission and/or re-transmissions of a different TB.

At step 3330, the wireless device may initialize a candidate resource set. The candidate resource set may comprise a plurality of candidate resources. The candidate resource set may be the union of the candidate resources in the selection window. A candidate resource may be a single-slot T/F resource. The candidate resource may comprise a slot in the time domain and one or more subchannels in the frequency domain. The candidate resource may be a single-subframe T/F resource. The candidate resource may comprise a subframe in the time domain and one or more subchannels in the frequency domain.

At step 3343a, the wireless device may determine first resources in the sensing window. A second wireless device may send a second sidelink transmission via the first resources. The second sidelink transmission may comprise SCI. The SCI may indicate resource assignment and/or reservation of second resources in the selection window. The SCI may indicate the resource assignment of the second resources. The second wireless device may send a third sidelink transmission, via the second resources. The third sidelink transmission may comprise the same TB as sent via the second sidelink transmission. The SCI may indicate a reservation period, of the one or more reservation periods, for the resource reservation of the second resources. The second wireless device may send a third sidelink transmission, via the second resources. The third sidelink transmission may comprise a different TB than as sent via the second sidelink transmission. The wireless device may measure an RSRP of the second sidelink transmission based on the SCI. The wireless device may compare the RSRP of the second sidelink transmission with an RSRP threshold value. The SCI may further indicate a priority of the second sidelink transmission. A mapping between one or more RSRP threshold values and one or more priorities may be configured. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device may determine the RSRP threshold value based on the priority of the second sidelink transmission, and the mapping between the one or more RSRP threshold values and the one or more priorities. A base station may send, to the wireless device, a message configuring the RSRP threshold value. The message may comprise an RRC message, an SIB, a MAC CE, and/or DCI. A third wireless device may send, to the wireless device, a message for configuring the RSRP threshold value. The message may comprise a sidelink RRC message, a sidelink MAC CE and/or SCI. The RSRP threshold value may be pre-configured. A memory of the wireless device may store the pre-configured RSRP threshold value.

At step 3343b, the wireless device may determine an offset value of one or more offset values. The wireless device may determine the offset value based on a measurement of one or more PSFCH resources in the sensing window. The wireless device may determine the one or more PSFCH resources based on an association mapping between the first resources and the one or more PSFCH resources. The measurement may be based on an energy detection of the one or more PSFCH resources. The measurement may correspond to received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may comprise received power(s) of signals via the one or more PSFCH resources. For example, the received power(s) may be average received power(s) of signals sent via the one or more PSFCH resources. For example, the received power(s) may be average received power(s) of one or more reference signals sent via the one or more PSFCH resources. The wireless device may assume that a transmission power of signals via the one or more PSFCH resources is a maximum transmission power (or any other transmission power). The wireless device may compare the received power(s) of signals sent via the one or more PSFCH resources with one or more threshold values. The wireless device may determine the offset value based on a threshold value of the one or more threshold values. A mapping between the one or more threshold values and cast types may be configured. The cast types may comprise unicast, groupcast option 1, groupcast option 2 and broadcast. For example, a first threshold value may map to (or associate with) unicast, a second threshold value may map to (or associate with) groupcast option 1, a third threshold value may map to (or associate with) groupcast option 2, and a fourth threshold vale may map to (or associate with) broadcast. The wireless device may determine the threshold value based on a cast type of the second sidelink transmission. A mapping between the one or more offset values and the one or more threshold values may be configured. For example, a first offset value of the one or more offset values may map to (or associate with) a first threshold value of the one or more threshold values, and a second offset value of the one or more offset values may map to (or associate with) a second threshold value of the one or more threshold values. The wireless device may determine the offset value based on the threshold value, and the mapping between the one or more offset values and the one or more threshold values. A base station may send a message, to the wireless device, for configuring one or more parameters. The one or more parameters may indicate the one or more offset values and/or the one or more threshold values. The message may comprise an RRC message, an SIB, a MAC CE, and/or DCI. A fourth wireless device may send a message, to the wireless device, for configuring the one or more offset values and/or the one or more threshold values. The message may comprise a sidelink RRC message, a sidelink MAC CE and/or SCI. The one or more offset values and/or the one or more threshold values may be pre-configured for the wireless device. A memory of the wireless device may store the one or more offset values and/or the one or more threshold values.

At step 3343c, the wireless device may exclude second resources from the candidate resource set. The wireless device may exclude second resources based on the offset value. The offset value may be added to the RSRP of the second sidelink transmission. The wireless device may exclude the second resources from the candidate resource set, for example, if (the RSRP of the second sidelink transmission+the offset value)≥the RSRP threshold value. The wireless device may not exclude the second resources from the candidate resource set, for example, if (the RSRP of the second sidelink transmission+the offset value)<the RSRP threshold value. The offset value may be added to the RSRP threshold value of the one or more RSRP threshold values. The wireless device may exclude the second resources from the candidate resource set, for example, if the RSRP of the second sidelink transmission≥(the RSRP threshold value+the offset value). The wireless device may not exclude the second resources from the candidate resource set, for example, if the RSRP of the second sidelink transmission<(the RSRP threshold value+the offset value). The wireless device may select the third resources from the candidate resource set based on the excluding the second resources from the candidate resource set. At step 3390, the wireless device may select third resources from the candidate resource set. The wireless device may select the third resources based on the excluding the second resources from the candidate resource set. At step 3391, the wireless device may send the sidelink transmission via the selected third resources.

Figure 34:
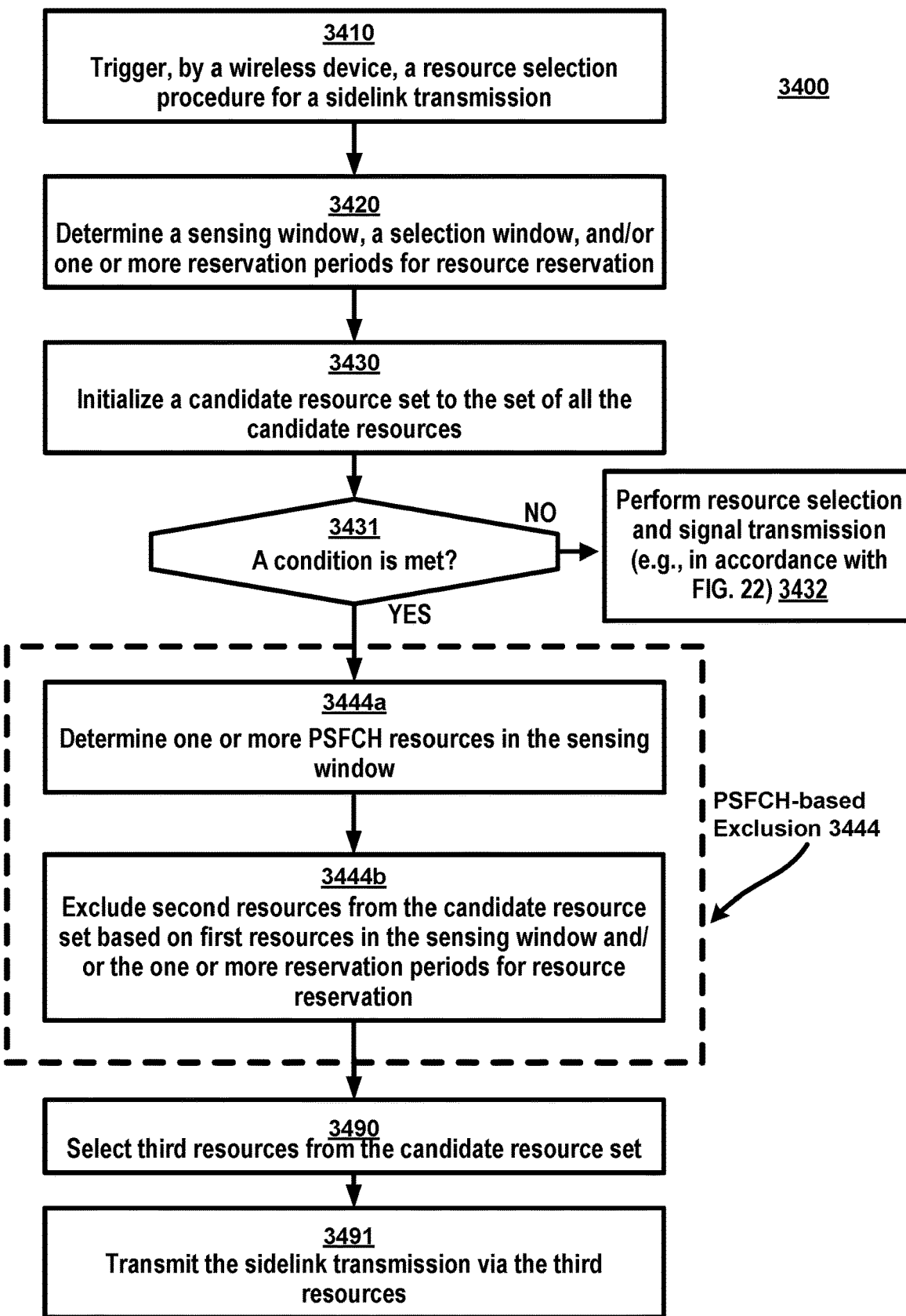
FIG. 34 shows an example method of conditional triggering of PSFCH-based resource exclusion.

FIG. 34 shows an example method for resource selection. The example method 3400 may comprise a PSFCH-based exclusion of resources. At step 3410, a wireless device may trigger a resource selection procedure for selecting resources for a sidelink transmission. At step 3420, the wireless device may determine a sensing window, for example, based on the triggering the resource selection procedure. The wireless device may determine a selection window, for example, based on the triggering the resource selection procedure. The wireless device may determine one or more reservation periods for resource reservation. At step 3430, the wireless device may initialize a candidate resource set to be a set of candidate resources. The candidate resource set may be the union of the candidate resources in the selection window.

At step 3431, the wireless device may determine to trigger a PSFCH-based exclusion procedure based on a condition. The condition may comprise a channel busy ratio (CBR) in the sensing window being greater than a CBR threshold value. The condition may comprise a packet delay budget (PDB) for the sidelink transmission being less than a PDB threshold value. The condition may comprise a priority of the sidelink transmission being greater than a priority threshold value. A base station may send a message, to the wireless device, for configuring one or more parameters. The one or more parameters may indicate the CBR threshold value, the PDB threshold value, and/or the priority threshold value. The message may comprise an RRC message, a SIB, a MAC CE, and/or DCI. A second wireless device may send a message to the wireless device for configuring the CBR threshold value, the PDB threshold value, and/or the priority threshold value. The message may comprise a sidelink RRC message, a sidelink MAC CE, and/or SCI. The CBR threshold value, the PDB threshold value, and/or the priority threshold value may be pre-configured for the wireless device. A memory of the wireless device may store the CBR threshold value, the PDB threshold value, and/or the priority threshold value.

The wireless device may determine one or more PSFCH resources in the sensing window, for example, if the condition is met, at step 3444*a*. The wireless device may determine the one or more PSFCH resources based on a measurement of the one or more PSFCH resources. The measurement may be based on an energy detection of the one or more PSFCH resources. The measurement may correspond to received power(s) of signals sent via the one or more PSFCH resources, RSRPs of signals sent via the one or more PSFCH resources, RSSIs of the one or more PSFCH resources, RSRQs of the one or more PSFCH resources, and/or SINRs of the one or more PSFCH resources. The measurement may correspond to received power(s) of signals sent via the one or more PSFCH resources. For example, the received power(s) may be average received power(s) of signals sent via the one or more PSFCH resources. For example, the received power(s) may be average received power(s) of one or more reference signals sent via the one or more PSFCH resources. The wireless device may assume/determine that a transmission power of signals sent via the one or more PSFCH resources is a maximum transmission power (or any other transmission power). The wireless device may compare the received power(s) of signals sent via the one or more PSFCH resources with one or more threshold values. The wireless device may determine the one or more PSFCH resources, for example, based on the measurement of the one or more PSFCH resources and the one or more threshold values. A base station may send a message, to the wireless device, for configuring one or more parameters. The one or more parameters may indicate the one or more threshold values. The message may comprise an RRC message, an SIB, a MAC CE, and/or DCI. A second wireless device may send a message, to the wireless device, for configuring the one or more threshold values. The message may comprise a sidelink RRC message, a sidelink MAC CE and/or SCI. The one or more threshold values may be pre-configured for the wireless device. A memory of the wireless device may store the one or more threshold values.

At step 3444*b*, the wireless device may exclude second resources from the candidate resource set. The wireless device may exclude the second resources, for example, based on first resources (e.g., that are associated with the one or more PSFCH resources) in the sensing window and/or the one or more reservation periods for resource reservation. The second resources may be for a retransmission of the same TB as sent in a previous transmission via the first resources. The second resources may be for a new transmission of a different TB than a TB sent in a previous transmission via the first resources.

At step 3490, the wireless device may select third resources from the candidate resource set based on the excluding the second resources from the candidate resource set. The wireless device may bypass the PSFCH-based exclusion 3444 and perform steps 3490 and 3491, if, for example, the condition is not met in step 3431. At step 3491, the wireless device may send the sidelink transmission via the selected third resources.

The PSFCH-based exclusion procedure described herein may or may not be performed in addition to the resource exclusion procedure described with respect to FIG. 22, for example, based on the condition being met. As shown in step 3432, the wireless device may perform resource selection and transmission based on the resource exclusion procedure described with respect to FIG. 22 (and not perform the PSFCH-based exclusion procedure), for example, if the condition is not met.

Figure 35:
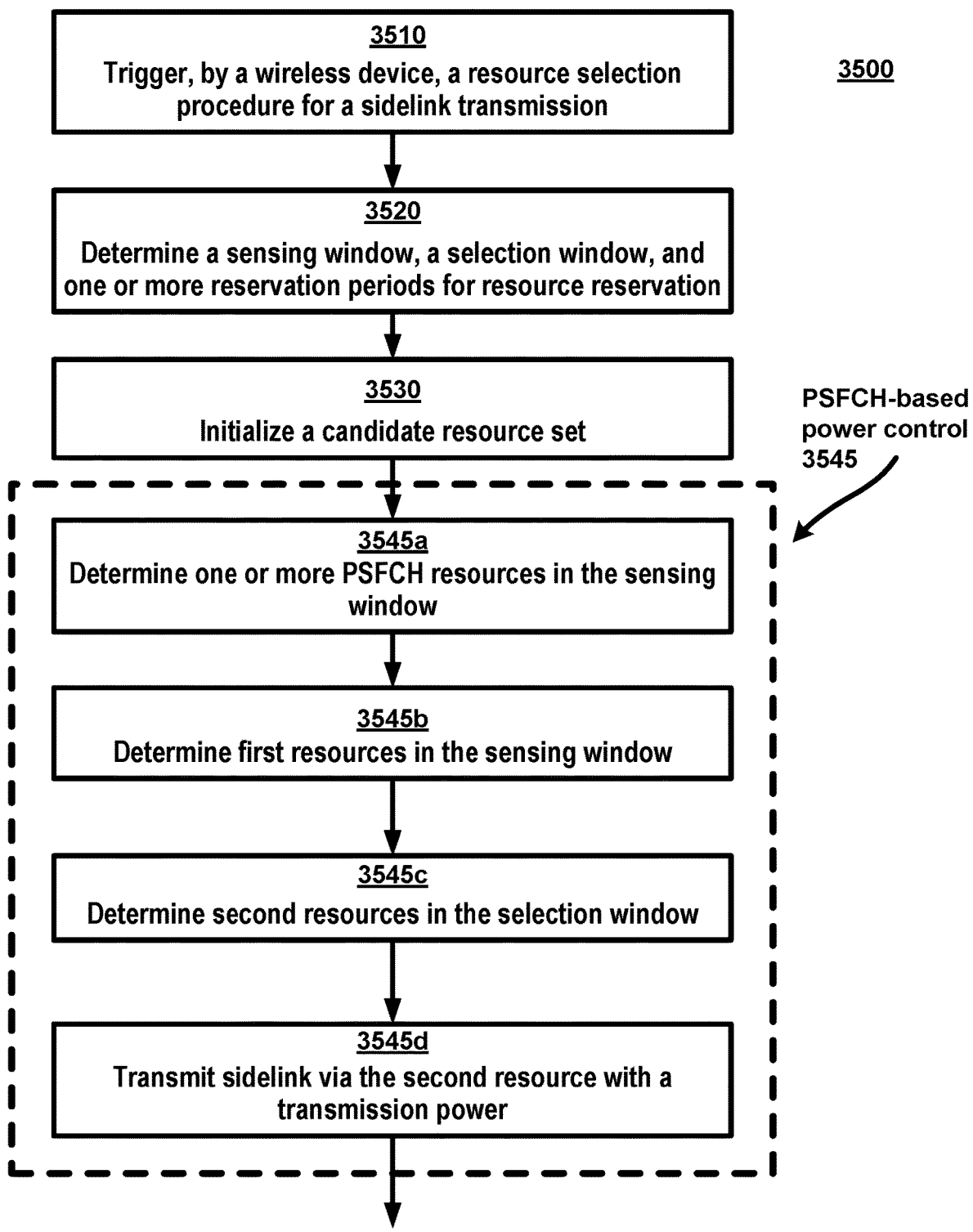
FIG. 35 shows an example method of PSFCH-based power control in a resource selection procedure.

FIG. 35 shows an example method for power control for a sidelink transmission. The example method 3500 may be based on measurements performed on PSFCH resources. At step 3510, a wireless device may trigger a resource selection procedure for selecting resources for a sidelink transmission. The wireless device may trigger the resource selection procedure, for example, if the wireless device determines that not enough resources are available at the wireless device for sending the sidelink transmission. The wireless device may trigger the resource selection procedure based on a counter for counting a quantity of transmissions. The wireless device may set a first value (e.g., an initial value) for the counter. The counter value may be decreased by one based on (e.g., after) each transmission. The wireless device may trigger the resource selection procedure (e.g., based on a probability) for example, if a second value of the counter equals zero. The wireless device may select a sidelink resource for a first sidelink transmission. The wireless device may determine a collision between the first sidelink transmission and a second sidelink transmission. The wireless device may trigger the resource selection procedure for re-selecting resources, for example, based on (e.g., after or in response to) determining the collision and before sending the first sidelink transmission via the sidelink resource.

At step 3520, the wireless device may determine a sensing window based on the triggering the resource selection procedure. A base station may send one or more messages, to the wireless device, for configuring one or more parameters. The one or more parameters may configure the sensing window. The one or more messages may comprise one or more RRC messages and/or SIBs. A second wireless device may send one or more messages, to the wireless device, for configuring the one or more parameters of the sensing window. The one or more messages may comprise one or more sidelink RRC messages, sidelink MAC CEs, and/or SCI. The one or more parameters configuring the sensing window may be pre-configured for the wireless device. A memory of the wireless device may store the one or more parameters configuring the sensing window. The sensing window may be for resource selection. The sensing window may be for resource re-selection based on determining resource collision.

The wireless device may determine a selection window, for example, based on the triggering the resource selection procedure. A base station may send one or more messages, to the wireless device, for configuring one or more parameters. The one or more parameters may configure the selection window. The one or more messages may comprise one or more RRC messages and/or SIBs. A second wireless device may send one or more messages, to the wireless device, for configuring the one or more parameters of the selection window. The one or more messages may comprise one or more sidelink RRC messages, sidelink MAC CEs, and/or SCI. The one or more parameters configuring the selection window may be pre-configured for the wireless device. A memory of the wireless device may store the one or more parameters defining the selection window. The selection window may be for resource selection. The selection window may be for resource re-selection based on determining resource collision.

The wireless device may determine one or more reservation periods for resource reservation. The one or more reservation periods may be configured for a resource pool. A base station may send one or more messages, to the wireless device, for configuring one or more parameters. The one or more parameters may indicate the one or more reservation periods to the wireless device. The one or more messages may comprise one or more RRC messages and/or SIBs. A second wireless device may send one or more messages, to the wireless device, for configuring the one or more reservation periods. The one or more messages may comprise one or more sidelink RRC messages, sidelink MAC CEs, and/or SCI. The one or more reservation periods may be pre-configured for the wireless device. A memory of the wireless device may store the one or more reservation periods for resource reservation. The one or more reservation periods may be for resource reservation for an initial transmission and/or re-transmissions of a same TB. The one or more reservation periods may be for resource reservation for an initial transmission and/or re-transmissions of a different TB.

At step 3530, the wireless device may initialize a candidate resource set. The candidate resource set may comprise a plurality of candidate resources. The candidate resource set may comprise the union of the candidate resources in the selection window. A candidate resource may comprise a single-slot T/F resource. The candidate resource may comprise a slot in the time domain and one or more subchannels in the frequency domain. The candidate resource may comprise a single-subframe T/F resource. The candidate resource may comprise a subframe in the time domain and one or more subchannels in the frequency domain.

At step 3545a, the wireless device may determine one or more PSFCH resources in the sensing window. The wireless device may determine the one or more PSFCH resources based on a measurement of the one or more PSFCH resources. The measurement may be based on an energy detection of the one or more PSFCH resources. The measurement may correspond to received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may correspond to received power(s) of signals sent via the one or more PSFCH resources. For example, the received power(s) may comprise average received power(s) of signals sent via the one or more PSFCH resources. For example, the received power(s) may comprise average received power(s) of one or more reference signals sent via the one or more PSFCH resources. The wireless device may assume that a transmission power of signals sent via the one or more PSFCH resources is a maximum transmission power (or any other transmission power). The wireless device may compare the received power(s) of signals sent via the one or more PSFCH resources with one or more threshold values. The wireless device may determine the one or more PSFCH resources based on the measurement of the one or more PSFCH resources and the one or more threshold values. A base station may send a message to the wireless device for configuring one or more parameters. The one or more parameters may indicate the one or more threshold values. The message may comprise an RRC message, an SIB, a MAC CE, and/or DCI. A second wireless device may send a message to the wireless device for configuring the one or more threshold values. The message may comprise a sidelink RRC message, a sidelink MAC CE and/or SCI. The one or more threshold values may be pre-configured for the wireless device. A memory of the wireless device may store the one or more threshold values.

At step 3545b, the wireless device may determine first resources in the sensing window. The wireless device may determine the first resources based on an association mapping between the first resources and the one or more PSFCH resources. At step 3545c, the wireless device may determine second resources (e.g., based on the first resources) and/or the one or more reservation periods for resource reservation. The wireless device may not receive a second sidelink transmission via the first resources. The wireless device may determine the second resources (e.g., that might be reserved by SCI of the second sidelink transmission via the first resources) and one or more reservation periods for resource reservation of a resource pool. For example, a base station may send, to the wireless device, a message for configuring the one or more reservation periods of the resource pool. The resource pool may comprise the first resources, the second resources, the third resources, and the PSFCH resources. The message may comprise an RRC message, an SIB, a MAC CE, and/or DCI. For example, the one or more reservation periods of the resource pool may be pre-configured for the wireless device. A memory of the wireless device may store the one or more reservation periods of the resource pool. The wireless device may receive a second sidelink transmission via the first resources. The second sidelink transmission may comprise SCI. The SCI may indicate resource assignment and/or reservation of the second resources in the selection window. The SCI may indicate the resource assignment of the second resources. The second wireless device may send a third sidelink transmission, via the second resources. The third sidelink transmission may comprise the same TB as sent via the second sidelink transmission. The SCI may indicate a reservation period of the one or more reservation periods for the resource reservation of the second resources. The second wireless device may send a third sidelink transmission, via the second resources. The third sidelink transmission may comprise a different TB than a TB sent via the second sidelink transmission.

At step 3545d, the wireless device may send the sidelink transmission via the second resources. The wireless device may use a transmission power for sending the sidelink transmission. The wireless device may determine the transmission power based on the measurement of the one or more PSFCH resources. The wireless device may determine a first transmission power for sending the sidelink transmission, for example, based on the received power of the one or more PSFCH resources being greater than a threshold value of the one or more threshold values. The wireless device may determine a second transmission power for sending the sidelink transmission, for example, based on the received power of the one or more PSFCH resources being less than the threshold value of the one or more threshold values. The first transmission power may be less than the second transmission power.

Figure 36:
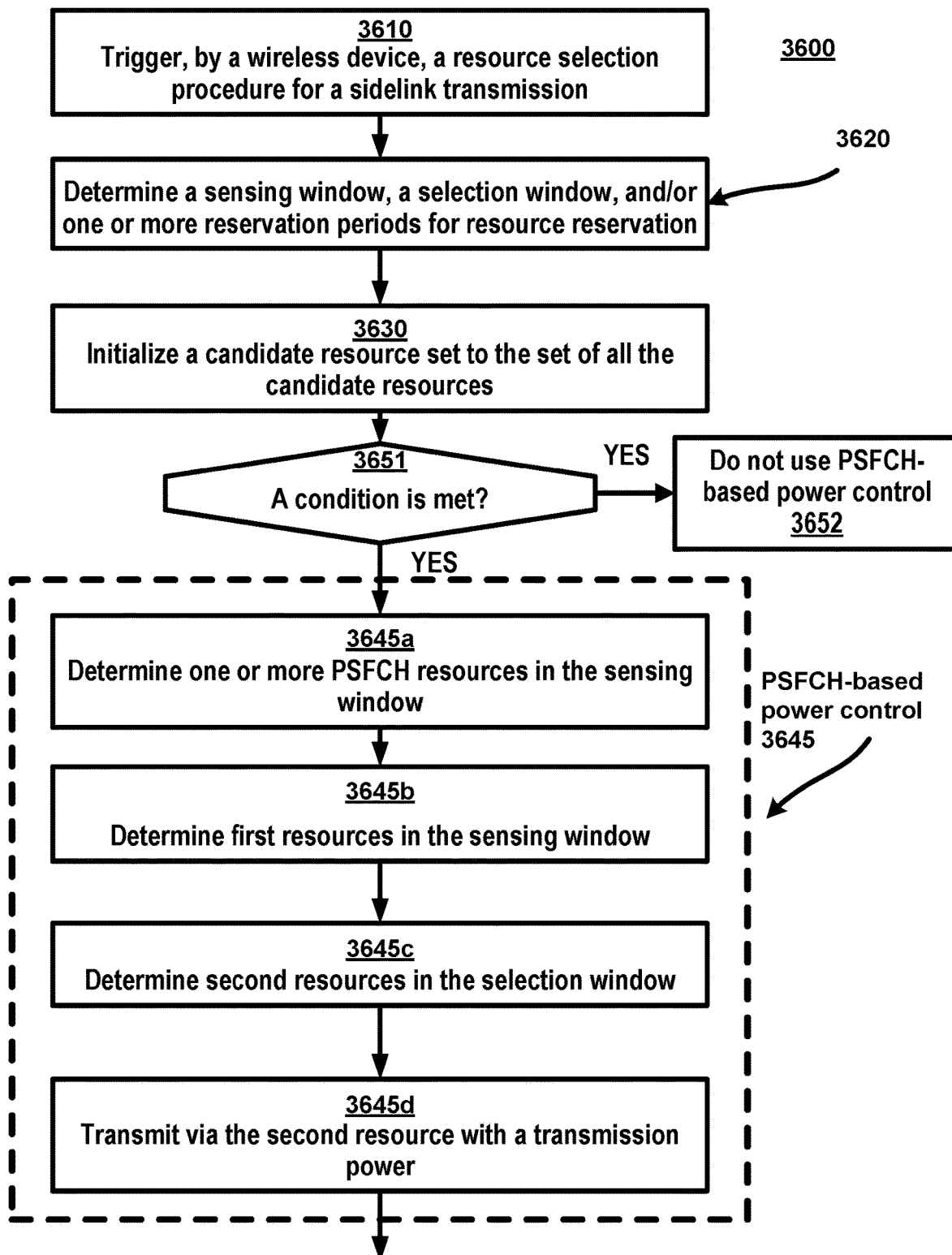
FIG. 36 shows an example method of conditional triggering of PSFCH-based power control in a resource selection procedure.

FIG. 36 shows an example method for power control for a sidelink transmission. The example method 3600 may use one or more conditions for triggering PSFCH-based power control. The PSFCH-based power control may be used with one or more resource selection procedures as described herein. At step 3610, a wireless device may trigger a resource selection procedure for selecting resources for a sidelink transmission. The wireless device may trigger the resource selection procedure, for example, based on a determination that not enough available resources are available at the wireless device for sending the sidelink transmission. The wireless device may trigger the resource selection procedure based on a counter for counting a quantity of transmissions. The wireless device may set a first value (e.g., an initial value) for the counter. The first value of the counter may be decreased by one after each transmission. The wireless device may trigger the resource selection procedure (e.g., based on a probability), for example, if a second value of the counter equals zero. The wireless device may select a sidelink resource for a first sidelink transmission. The wireless device may determine a collision between the first sidelink transmission and a second sidelink transmission. The wireless device may trigger the resource selection procedure for re-selecting resources, for example, based on (e.g., after or in response to) determining the collision and before sending the first sidelink transmission via the sidelink resource.

At step 3620, the wireless device may determine a sensing window based on the triggering the resource selection procedure. A base station may send one or more messages, to the wireless device, for configuring one or more parameters. The one or more parameters may configure the sensing window. The one or more messages may comprise one or more RRC messages and/or SIBs. A second wireless device may send one or more messages, to the wireless device, for configuring the one or more parameters of the sensing window. The one or more messages may comprise one or more sidelink RRC messages, sidelink MAC CEs, and/or SCI. The one or more parameters configuring the sensing window may be pre-configured for the wireless device. A memory of the wireless device may store the one or more parameters configuring the sensing window. The sensing window may be for resource selection. The sensing window may be for resource re-selection based on determining resource collision.

The wireless device may determine a selection window based on the triggering the resource selection procedure. A base station may send one or more messages, to the wireless device, for configuring one or more parameters. The one or more parameters may configure the selection window. The one or more messages may comprise one or more RRC messages and/or SIBs. A second wireless device may send one or more messages, to the wireless device, for configuring the one or more parameters of the selection window. The one or more messages may comprise one or more sidelink RRC messages, sidelink MAC CEs, and/or SCI. The one or more parameters configuring the selection window may be pre-configured for the wireless device. A memory of the wireless device may store the one or more parameters defining the selection window. The selection window may be for resource selection. The selection window may be for resource re-selection based on determining resource collision.

The wireless device may determine one or more reservation periods for resource reservation. The one or more reservation periods may be configured for a resource pool. A base station may send one or more messages, to the wireless device, for configuring one or more parameters. The one or more parameters may indicate, to the wireless device, the one or more reservation periods. The one or more messages may comprise one or more RRC messages and/or SIBs. A second wireless device may send one or more messages, to the wireless device, for configuring the one or more reservation periods. The one or more messages may comprise one or more sidelink RRC messages, sidelink MAC CEs, and/or SCI. The one or more reservation periods may be pre-configured for the wireless device. A memory of the wireless device may store the one or more reservation periods for resource reservation. The one or more reservation periods may be for resource reservation for an initial transmission and/or re-transmissions of a same TB. The one or more reservation periods may be for resource reservation for an initial transmission and/or re-transmissions of a different TB.

At step 3630, the wireless device may initialize a candidate resource set. The candidate resource set may comprise a plurality of candidate resources. The candidate resource set may be the union of the candidate resources in the selection window. A candidate resource may be a single-slot T/F resource. The candidate resource may comprise a slot in the time domain and one or more subchannels in the frequency domain. The candidate resource may be a single-subframe T/F resource. The candidate resource may comprise a subframe in the time domain and one or more subchannels in the frequency domain.

At step 3651, the wireless device may determine to trigger a PSFCH-based power control 3645 based on a condition. The wireless device may determine (e.g., step 3652) not to trigger the PSFCH-based power control 3645 if the condition is not met. The condition may be a CBR in the sensing window being greater than a CBR threshold value. The condition may be a PDB for the sidelink transmission being smaller than a PDB threshold value. The condition may be a priority of the sidelink transmission being greater than a priority threshold value. A base station may send a message, to the wireless device, for configuring one or more parameters. The one or more parameters may indicate the CBR threshold value, the PDB threshold value, and/or the priority threshold value. The message may comprise an RRC message, an SIB, a MAC CE, and/or DCI. A second wireless device may send a message, to the wireless device, for configuring the CBR threshold value, the PDB threshold value, and/or the priority threshold value. The message may comprise a sidelink RRC message, a sidelink MAC CE, and/or SCI. The CBR threshold value, the PDB threshold value, and/or the priority threshold value may be pre-configured for the wireless device. A memory of the wireless device may store the CBR threshold value, the PDB threshold value, and/or the priority threshold value.

At step 3645, the wireless device may determine one or more PSFCH resources in the sensing window, for example, based on the condition being met. The wireless device may determine the one or more PSFCH resources based on a measurement of the one or more PSFCH resources. The measurement may be based on an energy detection of the one or more PSFCH resources. The measurement may correspond to received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may correspond to received power(s) of signals sent via the one or more PSFCH resources. For example, the received power(s) may comprise average received power(s) of signals sent via the one or more PSFCH resources. For example, the received power(s) may comprise average received power(s) of one or more reference signals sent via the one or more PSFCH resources. The wireless device may assume that a transmission power of signals sent via the one or more PSFCH resources is a maximum transmission power (or any other transmission power). The wireless device may compare the received power(s) of signals sent via the one or more PSFCH resources with one or more threshold values. The wireless device may determine the one or more PSFCH resources based on the measurement of the one or more PSFCH resources and the one or more threshold values. A base station may send a message to the wireless device for configuring one or more parameters. The one or more parameters may indicate the one or more threshold values. The message may comprise an RRC message, an SIB, a MAC CE, and/or DCI. A second wireless device may send a message to the wireless device for configuring the one or more threshold values. The message may comprise a sidelink RRC message, a sidelink MAC CE, and/or SCI. The one or more threshold values may be pre-configured for the wireless device. A memory of the wireless device may store the one or more threshold values.

At step 3645b, the wireless device may determine first resources in the sensing window. The wireless device may determine the first resources based on an association mapping between the first resources and the one or more PSFCH resources. At step 3645c, the wireless device may determine second resources (e.g., based on the first resources) and the one or more reservation periods for resource reservation. The wireless device may not receive a second sidelink transmission via the first resources. The wireless device may determine the second resources (e.g., that might be reserved by SCI of the second sidelink transmission via the first resources) and one or more reservation periods for resource reservation of a resource pool. For example, a base station may send, to the wireless device, a message for configuring the one or more reservation periods of the resource pool. The resource pool may comprise the first resources, the second resources, the third resources, and/or the PSFCH resources. The message may comprise an RRC message, an SIB, a MAC CE, and/or DCI. For example, the one or more reservation periods of the resource pool may be pre-configured for the wireless device. A memory of the wireless device may store the one or more reservation periods of the resource pool. The wireless device may receive a second sidelink transmission via the first resources. The second sidelink transmission may comprise SCI. The SCI may indicate resource assignment and/or reservation of the second resources in the selection window. The SCI may indicate the resource assignment of the second resources. The second wireless device may send a third sidelink transmission, via the second resources. The third sidelink transmission may comprise the same TB as sent via the second sidelink transmission. The SCI may indicate a reservation period of the one or more reservation periods for the resource reservation of the second resources. The second wireless device may send a third sidelink transmission via the second resources. The third sidelink transmission may comprise a different TB than a TB sent via the second sidelink transmission.

At step 3645d, the wireless device may send the sidelink transmission via the second resources. The wireless device may send the sidelink transmission using a transmission power. The wireless device may determine the transmission power based on the measurement of the one or more PSFCH resources. The wireless device may determine a first transmission power for sending the sidelink transmission, for example, based on the received power of the one or more PSFCH resources being greater than a threshold value of the one or more threshold values. The wireless device may determine a second transmission power for sending the sidelink transmission, for example, based on the received power of the one or more PSFCH resources being less than the threshold value of the one or more threshold values. The first transmission power may be less than the second transmission power.

A wireless device may trigger a resource selection procedure for a sidelink transmission. The wireless device may determine a sensing window, for example, based on the triggering the resource selection procedure. The wireless device may determine a selection window, for example, based on the triggering the resource selection procedure. The wireless device may determine one or more reservation periods for resource reservation. The wireless device may initialize a candidate resource set comprising candidate resources in the selection window. The wireless device may determine one or more PSFCH resources in the sensing window based on a measurement of the one or more PSFCH resources. The wireless device may exclude second resources from the candidate resource set based on first resources in the sensing window and the one or more reservation periods. The first resources may be associated with the one or more PSFCH resources. The wireless device may select third resources from the candidate resource set based on the excluding the second resources from the candidate resource set. The wireless device may send the sidelink transmission via the third resources. The measurement may be based on an energy detection of the one or more PSFCH resources. The measurement may measure a received power of signals sent via the one or more PSFCH resources.

The wireless device may receive one or more RRC messages and/or SIBs. The one or more RRC messages and/or SIBs may comprise one or more parameters. The one or more parameters may indicate one or more threshold values. The wireless device may determine the one or more PSFCH resources in the sensing window, for example, based on the received power of the one or more PSFCH resources being greater than a threshold value of the one or more threshold values. The wireless device may determine a probability for excluding the second resources from the candidate resource set based on the received power of the one or more PSFCH resources and the one or more threshold values.

The wireless device may receive a first sidelink transmission via the first resources. The first sidelink transmission may comprise SCI. The SCI may comprise one or more parameters indicating resource assignment of the second resources for a second sidelink transmission. The second sidelink transmission may comprise a same TB as sent in the first sidelink transmission. The SCI may comprise one or more parameters indicating resource reservation of the second resources for a second sidelink transmission. The second sidelink transmission may comprise a different TB than a TB sent via the first sidelink transmission.

The one or more RRC messages and/or SIBs may further comprise one or more second parameters. The one or more second parameters may indicate a mapping between one or more RSRP threshold values and one or more priorities. The SCI may further indicate a priority of the first sidelink transmission. The wireless device may determine an RSRP threshold value, of the one or more RSRP threshold values, for example, based on the mapping between the one or more RSRP threshold values and the one or more priorities, and the priority of the first sidelink transmission. The wireless device may exclude the second resources from the candidate resource set based on a RSRP of the first sidelink transmission being greater than the RSRP threshold value, and/or the received power of the one or more PSFCH resources being greater than the threshold value.

The one or more RRC messages and/or SIBs may further comprise one or more third parameters. The one or more third parameters may indicate a mapping between one or more threshold values and cast types. The wireless device may determine the threshold value, for example, based on the mapping between the one or more threshold values and the cast types, and a cast type of the first sidelink transmission.

The one or more RRC messages and/or SIBs may comprise one or more fourth parameters. The one or more fourth parameters may indicate one or more offset values. The wireless device may determine an offset value of the one or more offset values, for example, based on the received power of the one or more PSFCH resources and the one or more threshold values. The wireless device may exclude the second resources from the candidate resource set, for example, based on a summation of an RSRP of the first sidelink transmission and the offset value being greater than the RSRP threshold value. The wireless device may exclude the second resources from the candidate resource set, for example, based on an RSRP of the first sidelink transmission being greater than a summation of the offset value and the RSRP threshold value.

The one or more RRC messages and/or SIBs may comprise one or more fifth parameters. The one or more fifth parameters may indicate a mapping between the one or more threshold values and cast types. The wireless device may determine the offset value, for example, based on the mapping between one or more threshold values and the cast types, and a cast type of the first sidelink transmission.

A wireless device may trigger a resource selection procedure for a sidelink transmission. The wireless device may determine a sensing window, for example, based on the triggering the resource selection procedure. The wireless device may determine a selection window, for example, based on the triggering the resource selection procedure. The wireless device may determine one or more reservation periods for resource reservation. The wireless device may determine a received power of signals sent one or more PSFCH resources in the sensing window. The wireless device may determine first resources in the sensing window. The first resources may be associated with the one or more PSFCH resources. The wireless device may determine second resources in the selection window based on the first resources and the one or more reservation periods. The wireless device may send the sidelink transmission via the second resources using a transmission power. The transmission power may be based on the received power of signals sent via the one or more PSFCH resources.

A wireless device may trigger a resource selection procedure for a sidelink transmission. The wireless device may determine a sensing window, for example, based on the triggering the resource selection procedure. The wireless device may determine a selection window, for example, based on the triggering the resource selection procedure. The wireless device may receive SCI via first resources in the sensing window. The SCI may indicate resource assignment of second resources in the selection window. The wireless device may determine a received power of signals sent via one or more PSFCH resources in the sensing window. The one or more PSFCH resources may be associated with the first resources. The wireless device may send the sidelink transmission via the second resources using a transmission power. The transmission power may be based on the received power of the one or more PSFCH resources.

Resource selection for communications (e.g., sidelink transmissions, and or any other type of communication) based on exclusion of resources may not always be optimal. For example, excluding resources may result in resource shortage and/or increase latency. Various examples described herein may use resource exclusion based on one or more considerations. For example, a priority of the communications may be considered for determining whether enhanced resource selection may be used. As described herein, one or more priority levels of a sidelink transmission (e.g., the sidelink transmission A and/or the sidelink transmission B, as described above) may be considered (e.g., used as a criteria) for implementing the enhanced resource selection procedure (e.g., based on feedback A measurement by a wireless device). Use of priority levels as described herein may provide advantages such as reduced interference to other wireless devices, reduced processing latency for resource selection, and/or improved robustness and/or link quality of wireless device transmissions (e.g., sidelink transmissions).

Returning to FIG. 24, an enhanced resource selection that may be performed/used by a wireless device (e.g., wireless device 2430) may be improved by using one or more priorities. For example, a resource selection mechanism may account for a one or more priorities, such as a first priority level of the sidelink transmission A and a second priority level of wireless device 2430's sidelink transmission B. Implementing the enhanced resource selection procedure for selecting non-overlapped resources by wireless device 2430 may increase a processing latency for selecting the third resources for the sidelink transmission B. Increased processing latency for selecting the third resources for the sidelink transmission B may be disadvantageous, for example, if the second priority level of the sidelink transmission B is greater than the first priority level of the sidelink transmission A. Implementing the enhanced resource selection procedure for reducing the power for sending the sidelink transmission B by wireless device 2430 may decrease robustness and link quality of the sidelink transmission B. Various examples herein use priority levels of the sidelink transmission A and/or the sidelink transmission B for implementing the enhanced resource selection procedure (e.g., based on feedback A measurement) by a wireless device. Use of priority levels may reduce the interference from the wireless device to other wireless devices, reduce the processing latency for selecting resources for the sidelink transmission B, and/or improve the robustness and/or the link quality of the sidelink transmission B.

For example, the wireless device 2430 may exclude the second resources from a candidate resource set based on the first priority level of the sidelink transmission A and the feedback A measurement. The wireless device 2430 may determine a threshold value based on the first priority level and/or the second priority level of the sidelink transmission B. The wireless device 2430 may exclude the second resources from the candidate resource set, for example, if the feedback A measurement indicates that a received power of the feedback A is greater than the threshold value. The wireless device 2430 may exclude the second resources from the candidate resource set, for example, based on an RSRP of the sidelink transmission A being greater than an RSRP threshold value and/or a received power of the feedback A being greater than a threshold value. The wireless device 2430 may exclude the second resources from the candidate resource set, for example, based on an RSRP threshold. The wireless device 2430 may determine the RSRP threshold, for example, based on a received power of the feedback A. The wireless device 2430 may exclude the second resources from the candidate resource set, for example, if the sidelink transmission A measurement indicates that an RSRP of the first resources is greater than the RSRP threshold. The wireless device 2430 may determine a transmit power for sending the sidelink transmission B, via the third resources, based on the feedback A measurement. The wireless device 2430 may send the sidelink transmission B, via the third resources, using the transmit power. An association mapping between a PSSCH and one or more PSFCH resources may be used, such as described above.

Figure 37:
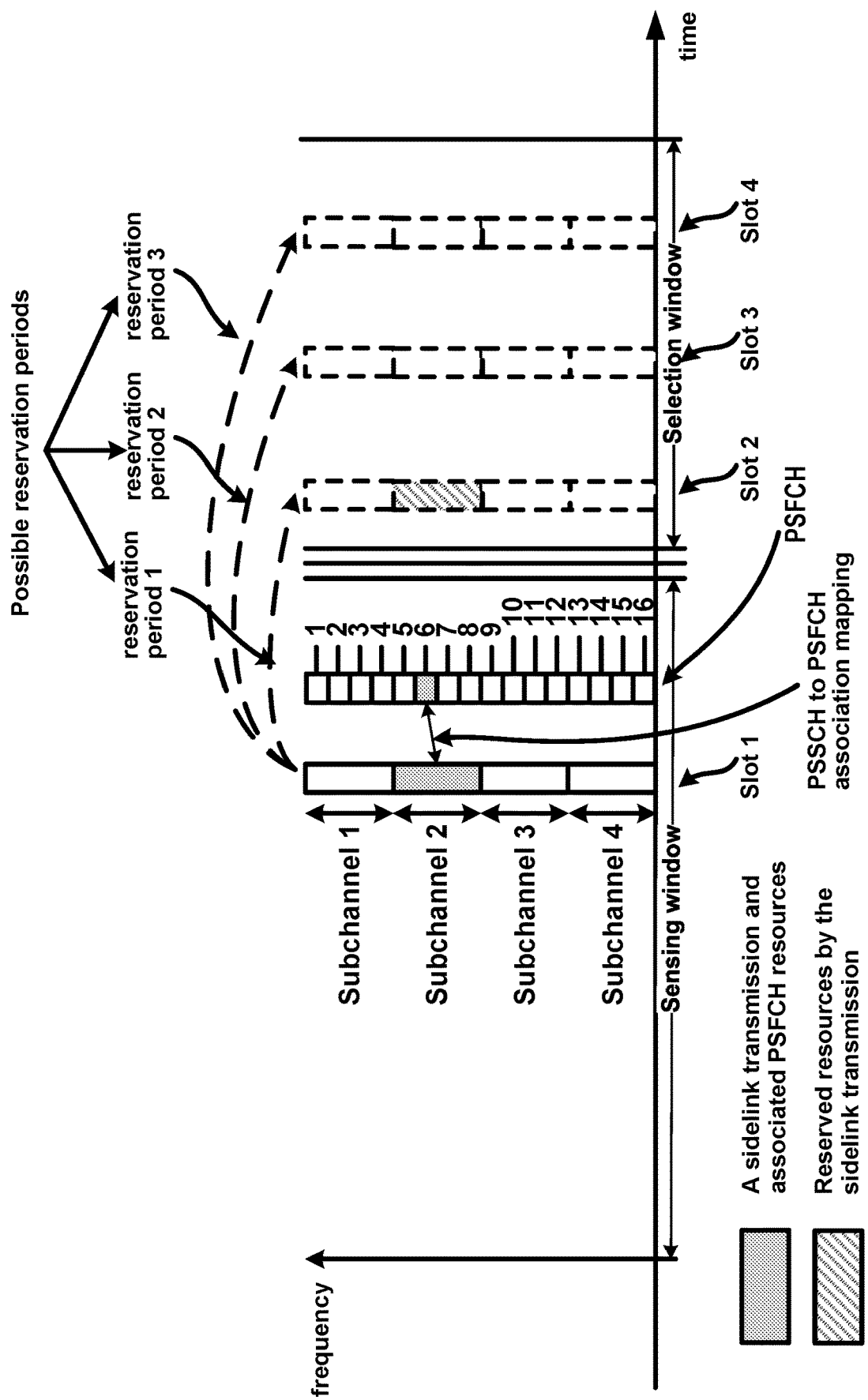
FIG. 37 shows an example sensing of a wireless device during a resource selection procedure.

FIG. 37 shows an example of an association mapping between PSSCH and PSFCH resources. The example association mapping may be based on sensing of a wireless device during a resource selection procedure. The mapping may correspond to the mapping described with respect to FIG. 26, except, for example, the possible reserved resources by a sidelink transmission may differ. The possible reserved resources by a sidelink transmission in FIG. 37, for example, may be in slot 2. Any slots may be used for the possible reserved resources by a sidelink transmission.

Figure 38:
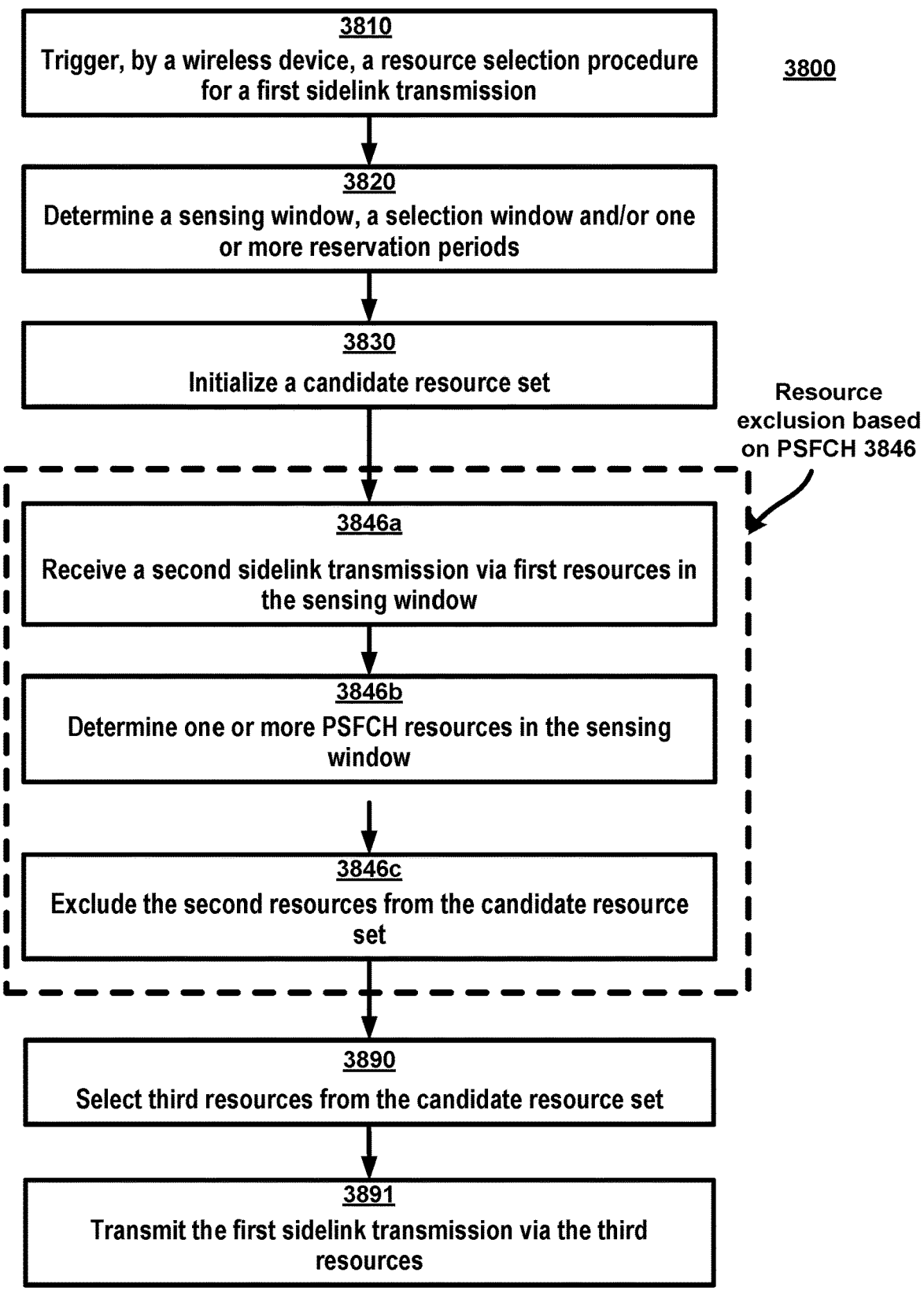
FIG. 38 shows an example method of PSFCH-based resource exclusion in a resource selection procedure.

FIG. 38 shows an example method for resource selection. The example method 3800 may comprise PSFCH-based exclusion of resources. At step 3810, a wireless device may trigger a resource selection procedure for selecting resources for a first sidelink transmission. The wireless device may trigger the resource selection procedure, for example, based on (e.g., after or in response to) determining that there are not enough available resources at the wireless device for sending the first sidelink transmission. The wireless device may trigger the resource selection procedure, for example, based on a counter for counting a quantity of transmissions. The wireless device may set the counter equal to a first value (e.g., an initial value). The counter may be decreased by one based on (e.g., after) each transmission. The wireless device may trigger the resource selection procedure (e.g., with a probability), for example, if a value of the counter equals zero (or any other value). The wireless device may have selected one or more resources for the first sidelink transmission. The wireless device may determine a resource collision via the selected one or more resources. The wireless device may trigger the resource selection procedure for re-selecting resources, for example, based on (e.g., after or in response to) determining the collision. Steps 3820 and 3830 in FIG. 38 may correspond to steps 2720 and 2730 described with respect to FIG. 27.

At step 3846a, the wireless device may receive a second sidelink transmission, via first resources, in the sensing window. The second sidelink transmission may comprise SCI and/or a TB. The SCI may indicate a priority of the second sidelink transmission. The SCI may indicate a resource assignment for second resources in the selection window. The wireless device may send, via the second resources, the same TB as received in the second sidelink transmission. The SCI may indicate a reservation period, of the one or more reservation periods, for resource reservation of second resources in the selection window. The wireless device may send, via the second resources, a different TB than the TB received in the second sidelink transmission. The priority may be a physical layer priority of a packet in the second sidelink transmission. The priority may map to (or associate with) one or more logical channel priorities (LCPs) of the second sidelink transmission.

At step 3846b, the wireless device may determine one or more PSFCH resources in the sensing window. The one or more PSFCH resources may be associated with the first resources, for example, based on an association mapping between a PSSCH of the second sidelink transmission and the one or more PSFCH resources. The wireless device may determine the one or more PSFCH resources based on a measurement of the one or more PSFCH resources. The measurement may be based on an energy detection of the one or more PSFCH resources. The measurement may comprise received power(s) of signals sent via the one or more PSFCH resources, RSRP(s) of signals sent via the one or more PSFCH resources, RSSIs of the one or more PSFCH resources, a RSRQs of the one or more PSFCH resources, and/or SINRs of the one or more PSFCH resources. The measurement may comprise received power(s) of signals sent via the one or more PSFCH resources. For example, the received power(s) may comprise average or highest received power(s) of signals sent via the one or more PSFCH resources. For example, the received power(s) may comprise average or highest received power(s) of one or more reference signals sent via the one or more PSFCH resources. The wireless device may assume/determine that a transmission power of signals sent via the one or more PSFCH resources is a maximum transmission power (or any other transmission power). The wireless device may compare the received power(s) of signals sent via the one or more PSFCH resources with one or more threshold values. The wireless device may determine the one or more PSFCH resources based on the measurement of the one or more PSFCH resources and the one or more threshold values. A base station may send a message to the wireless device for configuring one or more parameters. The one or more parameters may indicate the one or more threshold values. The message may comprise an RRC message and/or SIB, a MAC CE, and/or DCI. A second wireless device may send a message to the wireless device for configuring the one or more threshold values. The message may comprise a sidelink RRC message, a sidelink MAC CE, and/or SCI. The one or more threshold values may be pre-configured for the wireless device. A memory associated with the wireless device may store the one or more threshold values.

At step 3846c, the wireless device may exclude the second resources from the candidate resource set, for example, based on the measurement of the one or more PSFCH resources associated with first resources. The wireless device may exclude the second resources from the candidate resource set, for example, further based on the priority of the second sidelink transmission via the first resources and/or a priority of the first sidelink transmission. At step 3890, the wireless device may select third resources from the candidate resource set based on the excluding the second resources from the candidate resource set. At step 3891, the wireless device may send the first sidelink transmission via the selected third resources.

Figure 39:
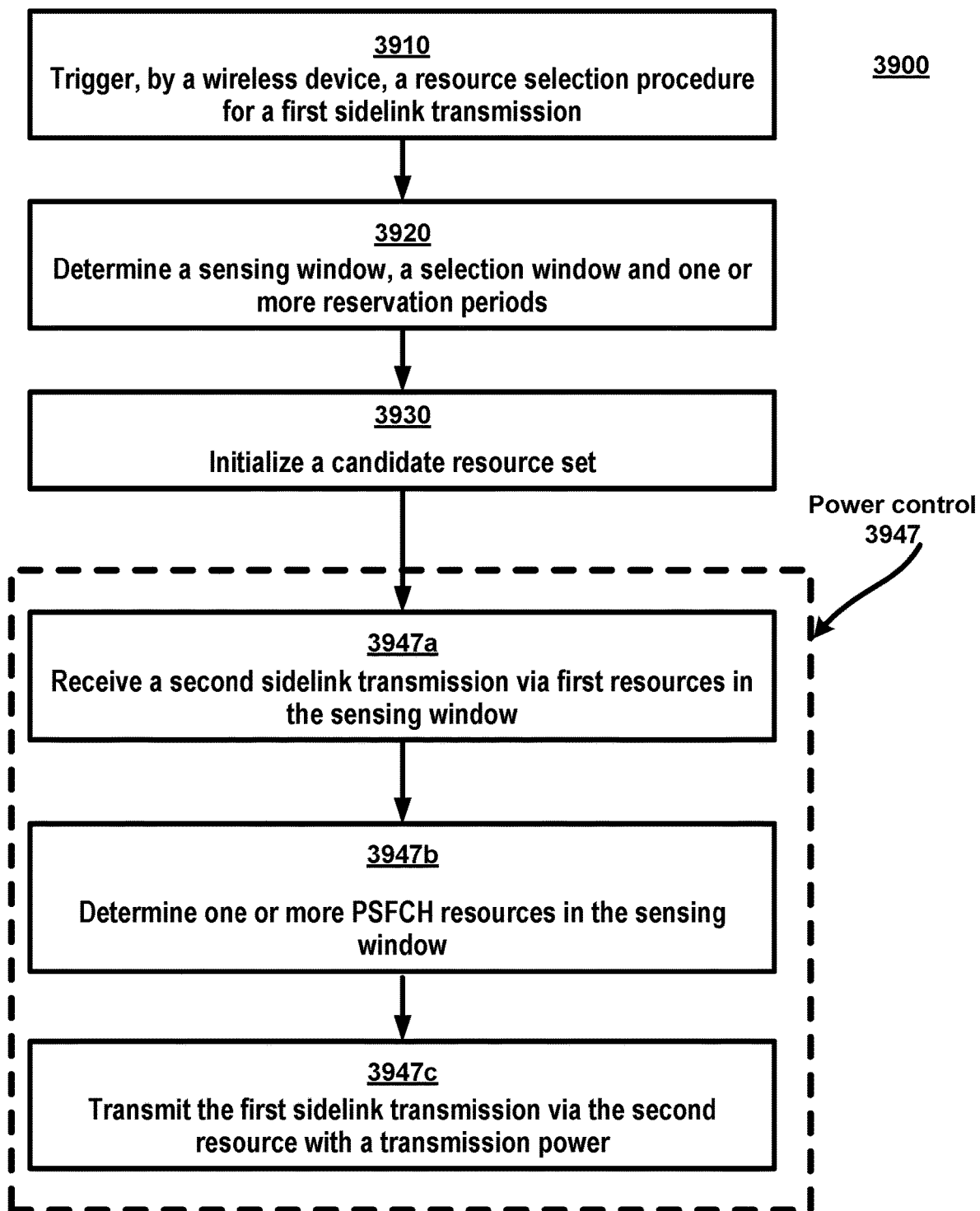
FIG. 39 shows an example method of PSFCH-based power control in a resource selection procedure.

FIG. 39 shows an example method for power control in a resource selection procedure. The example method 3900 may comprise PSFCH-based power control. At step 3910, a wireless device may trigger a resource selection procedure for selecting resources for a first sidelink transmission. The wireless device may trigger the resource selection procedure, for example, based on (e.g., after or in response to) determining that there are not enough available resources at the wireless device for sending the first sidelink transmission. The wireless device may trigger the resource selection procedure based on a counter for counting a quantity of transmissions. The wireless device may set the counter equal to a first value (e.g., an initial value). The counter may be decreased by one based on (e.g., after) each transmission. The wireless device may trigger the resource selection procedure (e.g., with a probability) if a value of the counter equals zero. The wireless device may have selected one or more resources for the first sidelink transmission. The wireless device may determine a resource collision via the selected one or more resources. The wireless device may trigger the resource selection procedure for re-selecting resources, for example, based on (e.g., after or in response to) determining the collision. Steps 3920 and 3930 in FIG. 39 may correspond to steps 2720 and 2730 described with respect to FIG. 27.

At step 3947a, the wireless device may receive a second sidelink transmission via first resources in the sensing window. The second sidelink transmission may comprise SCI and a TB. The SCI may indicate a priority of the second sidelink transmission. The SCI may indicate a resource assignment for second resources in the selection window. The wireless device may send, via the second resources the same TB as received in the second sidelink transmission. The SCI may indicate a reservation period, of the one or more reservation periods, for resource reservation of second resources in the selection window. The wireless device may send, via the second resources, a different TB than the TB received in the second sidelink transmission. The priority may be a physical layer priority of a packet in the second sidelink transmission. The priority may map to (or associate with) one or more LCPs of the second sidelink transmission.

At step 3947b, the wireless device may determine one or more PSFCH resources in the sensing window. The one or more PSFCH resources may be associated with the first resources based on an association mapping between a PSSCH of the second sidelink transmission and the one or more PSFCH resources. The wireless device may determine the one or more PSFCH resources based on a measurement of the one or more PSFCH resources. The measurement may be based on an energy detection of the one or more PSFCH resources. The measurement may comprise received power(s) of signals sent via the one or more PSFCH resources, RSRPs of signals sent via the one or more PSFCH resources, RSSI(s) of signals sent via the one or more PSFCH resources, RSRQ(s) of signals sent via the one or more PSFCH resources, and/or SINR(s) of the one or more PSFCH resources. The measurement may comprise received power(s) of signals sent via the one or more PSFCH resources. The received power(s) may comprise average or highest received power(s) of signals sent via the one or more PSFCH resources. The received power(s) may comprise average or highest received power(s) of one or more reference signals sent via the one or more PSFCH resources. The wireless device may assume/determine that a transmission power of signals sent via the one or more PSFCH resources is a maximum transmission power (or any other transmission power). The wireless device may compare the received power(s) of signals sent via the one or more PSFCH resources with one or more threshold values. The wireless device may determine the one or more PSFCH resources based on the measurement of the one or more PSFCH resources and the one or more threshold values. A base station may send a message to the wireless device for configuring one or more parameters. The one or more parameters may indicate the one or more threshold values. The message may comprise an RRC message and/or SIB, a MAC CE, and/or DCI. A second wireless device may send a message to the wireless device for configuring the one or more threshold values. The message may comprise a sidelink RRC message, a sidelink MAC CE, and/or SCI. The one or more threshold values may be pre-configured for the wireless device. A memory of the wireless device may store the one or more threshold values.

At step 3947c, the wireless device may send the first sidelink transmission via the second resources. The wireless device may send the first sidelink transmission using a transmission power. The wireless device may determine the transmission power based on the measurement of the one or more PSFCH resources. The wireless device may determine the transmission power further based on the priority of the second sidelink transmission via the first resources and/or a priority of the first sidelink transmission.

Figure 40:
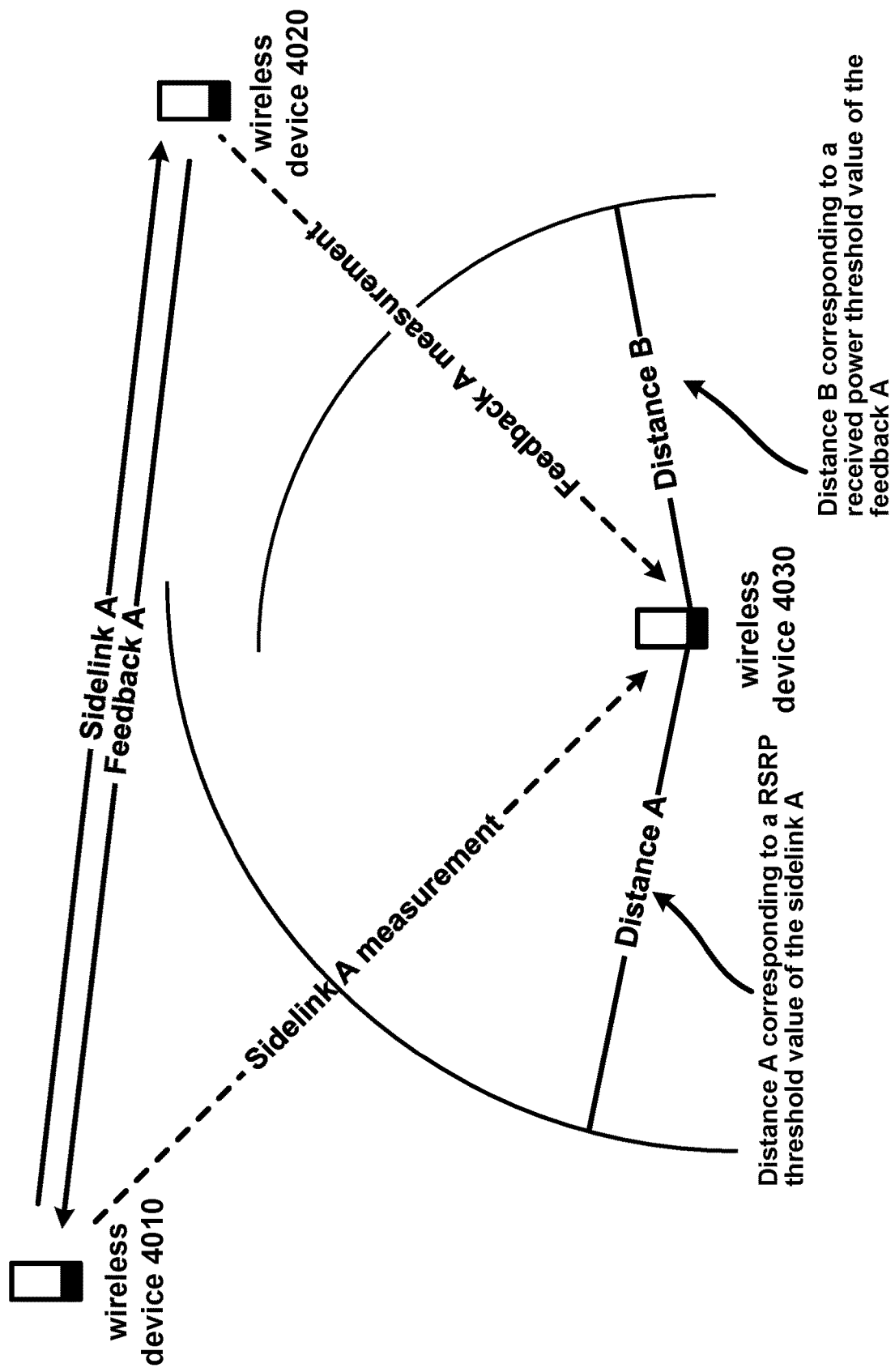
FIG. 40 shows an example of interference reduction based on feedback measurement in a resource selection procedure.

FIG. 40 shows an example resource selection for interference reduction. The example resource selection may be based on a feedback measurement and a sidelink measurement. A wireless device 4010 may send, via first resources, sidelink transmission A to a wireless device 4020. The wireless device 4020 may send feedback A to the wireless device 4010, for example, based on (e.g., after or in response to) receiving the sidelink transmission A. The wireless device 4030 may trigger the resource selection procedure to select third resources from a candidate resource set. The third resources may be for sending a sidelink transmission.

The wireless device 4030 may receive, from the wireless device 4010, the sidelink transmission A in a sensing window. The wireless device 4030 may measure an RSRP of the sidelink transmission A. The wireless device 4030 may measure an RSRP based on SCI of the sidelink transmission A. The SCI may indicate a priority of the sidelink transmission A. A mapping between one or more RSRP threshold values and one or more priorities may be configured. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device 4030 may determine an RSRP threshold value based on the priority of the sidelink transmission A and/or based on the mapping between one or more RSRP threshold values and one or more priorities. The wireless device 4030 may determine a distance A from the wireless device 4030 based on the RSRP threshold value. A base station may send a message, to the wireless device 4030, for configuring/determining the RSRP threshold value. The message may comprise an RRC message, a MAC CE, and/or DCI. A wireless device may send a message, to the wireless device 4030, for configuring/determining the RSRP threshold value. The message may comprise SCI. The RSRP threshold value may be pre-configured. A memory associated with the wireless device 4030 may store the pre-configured RSRP threshold value. The wireless device 4030 may determine the third resources, for example, based on the RSRP of the sidelink transmission A and the RSRP threshold value.

The wireless device 4030 may receive, from the wireless device 4020, the feedback A in the sensing window. The feedback A may be received via PSFCH resources. The wireless device 4030 may measure the feedback A based on a received power of the feedback A. The PSFCH resources may be associated with the first resources for sending the sidelink transmission A. The wireless device 4030 may determine a distance B from the wireless device 4030, for example, based on a received power threshold value. A base station may send a message, to the wireless device 4030, for configuring/determining the received power threshold value. The message may comprise an RRC message, a MAC CE, and/or DCI. A wireless device may send a message, to the wireless device 4030, for configuring/determining the received power threshold value. The message may comprise SCI. The received power threshold value may be pre-configured. A memory associated with the wireless device 4030 may store the pre-configured received power threshold value. The wireless device 4030 may determine the third resources, for example, based on the received power of the feedback A and the received power threshold value.

The wireless device 4030 may determine second resources based on the SCI of the sidelink transmission A. The SCI may indicate resource assignment of the second resources for a future sidelink transmission, via a resource pool, from the wireless device 4010 to the wireless device 4020. The future sidelink transmission may be a retransmission of the same TB as sent in the sidelink transmission A. The SCI may indicate a reservation period, of one or more reservation periods, for resource reservation of the second resources. The second resources may be for a future sidelink transmission from the wireless device 4010, via a resource pool, to the wireless device 4020. The future sidelink transmission may be a new transmission of a different TB than a TB sent in the sidelink transmission A. For example, a base station may send, to the wireless device 4030, a message for configuring the one or more reservation periods of the resource pool. The resource pool may comprise the first resources, the second resources, the third resources, and the PSFCH resources. The message may comprise an RRC message, a MAC CE, and/or DCI. For example, the one or more reservation periods of the resource pool may be pre-configured for the wireless device 4030. A memory associated with the wireless device 4030 may store the one or more reservation periods of the resource pool.

The wireless device 4030 may exclude the second resources from the candidate resource set based on one or more considerations. The wireless device 4030 may exclude the second resources from the candidate resource set, for example, if the RSRP of the sidelink transmission A is greater than the RSRP threshold value and/or the received power of the feedback A is greater than the received power threshold value. The wireless device 4030 may determine that a distance from the wireless device 4030 to the wireless device 4010 is smaller than the distance A and a distance from the wireless device 4030 to the wireless device 4020 is smaller than the distance B, for example, based on the RSRP of the sidelink transmission A being greater than the RSRP threshold value and/or the received power of the feedback A being greater than the received power threshold value. The wireless device 4030 may not exclude the second resources from the candidate resource set, if the RSRP of the sidelink transmission A is less than the RSRP threshold value and/or the received power of the feedback A is less than the received power threshold value. The wireless device 4030 may determine that a distance from the wireless device 4030 to the wireless device 4010 is larger than the distance A and a distance from the wireless device 4030 to the wireless device 4020 is larger than the distance B, for example, based on the RSRP of the sidelink transmission A being less than the RSRP threshold value and the received power of the feedback A being less than the received power threshold value.

The wireless device 4030 may determine the threshold value. The wireless device may determine the threshold value, for example, based on a first priority of the sidelink transmission A and/or based on and a mapping between one or more RSRP threshold values and one or more priorities. The mapping may map the threshold value of the one or more RSRP threshold values to the first priority of the one or more priorities. The wireless device 4030 may determine the threshold value based on a second priority of wireless device 4030's sidelink transmission and/or based on a mapping between one or more RSRP threshold values and one or more priorities. The mapping may map the threshold value of the one or more RSRP threshold values to the second priority of the one or more priorities. The wireless device 4030 may determine the threshold value based on a first priority of the sidelink transmission A, a second priority of wireless device 4030's sidelink transmission, and/or a mapping between one or more RSRP threshold values and one or more priorities. The mapping may map the threshold value of the one or more RSRP threshold values to a combination of the first priority and the second priority of the one or more priorities. For example, the combination of the first priority and the second priority may correspond to a summation operation of the first priority and the second priority. The wireless device 4030 may select the third resources from the candidate resource set based on the excluding the second resources from the candidate resource set.

The wireless device 4030 may determine one or more distances from the wireless device 4030, for example, based on one or more received power threshold values. The wireless device 4030 may determine the third resources based on the received power of the feedback A, the one or more received power threshold values, and/or a condition. The condition may be a probability for excluding the second resources from the candidate resource set, corresponding to the one or more received power threshold values. The wireless device 4030 may compare the received power of the feedback A EA with a first received power threshold value Th1 and a second received power threshold value Th2, where Th1<Th2. The wireless device 4030 may determine a probability P1 for excluding the second resources from the candidate resource set, for example, if EA≤Th1. The wireless device 4030 may determine a probability P2 for excluding the second resources from the candidate resource set, for example, if Th1<EA<Th2. The wireless device 4030 may determine a probability P3 for excluding the second resources from the candidate resource set, for example, if Th2≤EA. In an example, 1≥P3≥P2≥P1≥0.

Figure 41:
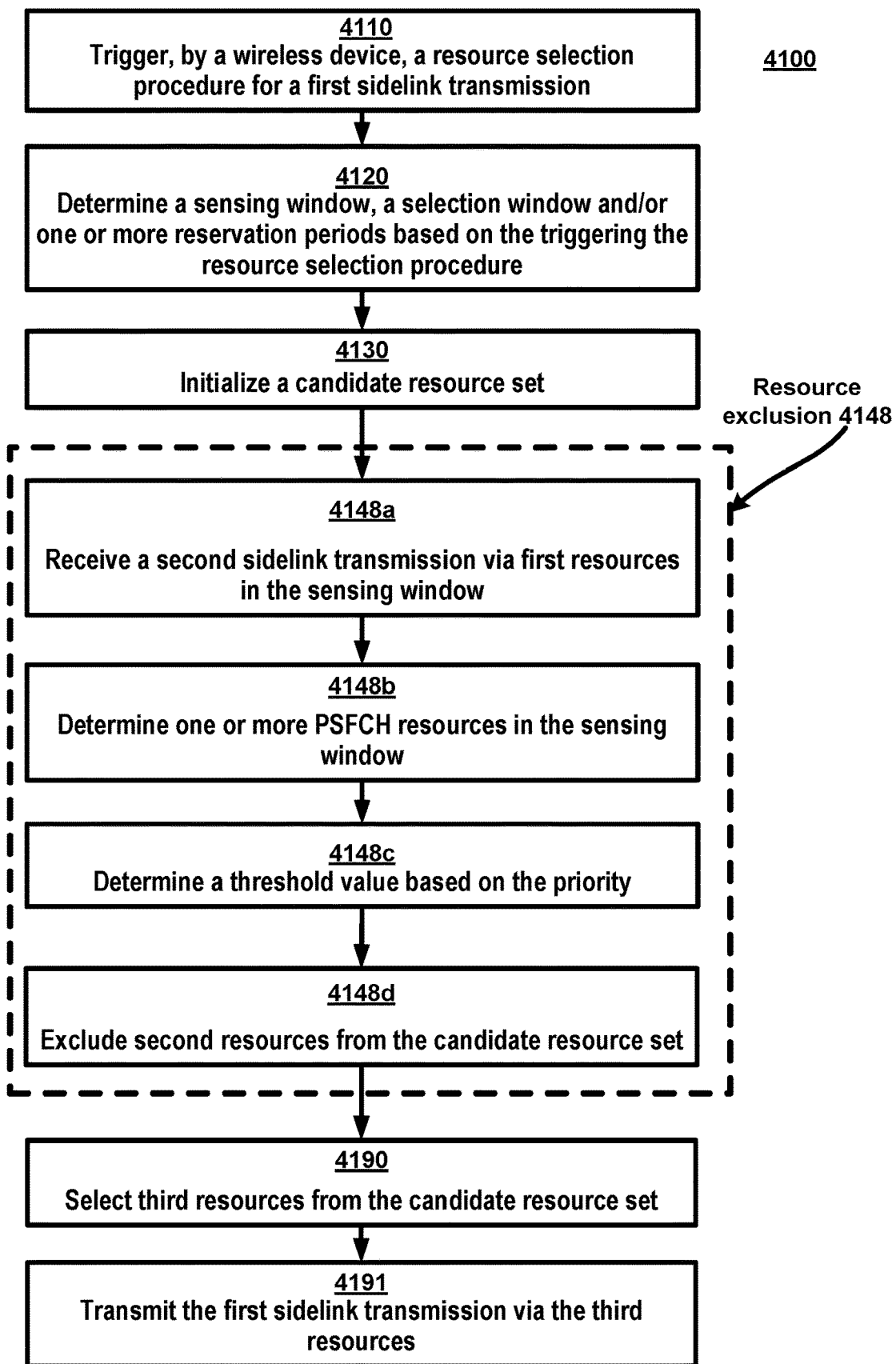
FIG. 41 is an example method of PSFCH-based resource exclusion in a resource selection procedure.

FIG. 41 shows an example method of resource selection. The example method 4100 may be based on a PSFCH-based exclusion. One or more resources may be excluded based on priorities of sidelink transmissions. Referring to FIG. 41, and at step 4110, a wireless device may trigger a resource selection procedure for selecting resources for a first sidelink transmission. At step 4120, the wireless device may determine a sensing window based on the resource selection procedure, a selection window based on the triggering the resource selection procedure, and/or one or more reservation periods for resource reservation. At step 4130, the wireless device may initialize a candidate resource set. The candidate resource set may comprise a plurality of candidate resources.

At step 4148a, the wireless device may receive a second sidelink transmission via first resources in the sensing window. The second sidelink transmission may comprise SCI and a TB. The SCI may indicate a priority of the second sidelink transmission. The SCI may indicate a resource assignment for second resources in the selection window. The wireless device may send, via the second resources, the same TB as received in the second sidelink transmission. The SCI may indicate a reservation period, of the one or more reservation periods, for resource reservation of second resources in the selection window. The wireless device may send, via the second resources, a different TB than the TB received in the second sidelink transmission. The priority may be a physical layer priority of a packet in the second sidelink transmission. The priority may map to (or associate with) one or more LCPs of the second sidelink transmission. The wireless device may measure an RSRP of the second sidelink transmission based on the SCI. The wireless device may compare the RSRP of the second sidelink transmission with an RSRP threshold value. A mapping between one or more RSRP threshold values and one or more priorities may be configured. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device may determine the RSRP threshold value, for example, based on the priority of the second sidelink transmission and the mapping between one or more RSRP threshold values and one or more priorities. The mapping may map/associate the RSRP threshold value to the priority of the second sidelink transmission. The wireless device may determine the RSRP threshold value, for example, based on a priority of the first sidelink transmission and the mapping between one or more RSRP threshold values and one or more priorities. The mapping may map/associate the RSRP threshold value to the priority of the first sidelink transmission. The wireless device may determine the RSRP threshold value, for example, based on the priority of the second sidelink transmission, a priority of the first sidelink transmission, and the mapping between one or more RSRP threshold values and one or more priorities. The mapping may map/associate the RSRP threshold value to a combination of the priority of the first sidelink transmission and the priority of the second sidelink transmission. For example, the combination may be an arithmetic (e.g., addition and/or subtraction) operation of the priority of the first sidelink transmission and the priority of the second sidelink transmission. A base station may send a message, to the wireless device, configuring the mapping. The message may comprise an RRC message, a MAC CE, and/or DCI. A third wireless device may send a message, to the wireless device, for configuring the mapping. The message may comprise SCI. The mapping may be pre-configured. A memory associated with the wireless device may store the pre-configured mapping.

At step 4148b, the wireless device may determine one or more PSFCH resources in the sensing window. The one or more PSFCH resources may be associated with the first resources, for example, based on an association mapping between a PSSCH of the second sidelink transmission and the one or more PSFCH resources. The wireless device may determine the one or more PSFCH resources based on a measurement of the one or more PSFCH resources. The measurement may be based on an energy detection of the one or more PSFCH resources. The measurement may comprise received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may comprise received power(s) of signals sent via the one or more PSFCH resources. For example, the received power may comprise average or highest received power(s) of signals sent via the one or more PSFCH resources. For example, the received power may comprise average or highest received power(s) of one or more reference signals sent via the one or more PSFCH resources. The wireless device may assume/determine that a transmission power of signals sent via the one or more PSFCH resources is a maximum transmission power (or any other transmission power).

At step 4148c, the wireless device may determine a threshold value based on the priority of the second sidelink transmission via the first resources and/or the priority of the first sidelink transmission. A mapping between one or more threshold values and one or more priorities may be configured/determined. A first priority of the one or more priorities may map to (or associate with) a first threshold value of the one or more threshold values. A second priority of the one or more priorities may map to (or associate with) a second threshold value of the one or more threshold values. The wireless device may determine the threshold value based on the priority of the second sidelink transmission and the mapping between one or more threshold values and one or more priorities. The mapping may map/associated the threshold value to the priority of the second sidelink transmission. The wireless device may determine the threshold value based on the priority of the first sidelink transmission and the mapping between one or more threshold values and one or more priorities. The mapping may map/associate the threshold value to the priority of the first sidelink transmission. The wireless device may determine the threshold value based on the priority of the second sidelink transmission, the priority of the first sidelink transmission, and the mapping between one or more threshold values and one or more priorities. The mapping may map/associate the threshold value to a combination of the priority of the first sidelink transmission and the priority of the second sidelink transmission. The combination may be an arithmetic (e.g., addition and/or subtraction) operation comprising the priority of the first sidelink transmission and the priority of the second sidelink transmission. A base station may send a message, to the wireless device, configuring the mapping. The message may comprise an RRC message, a MAC CE, and/or DCI. A third wireless device may send a message, to the wireless device, for configuring the mapping. The message may comprise SCI. The mapping may be pre-configured. A memory of the wireless device may store the pre-configured mapping.

At step 4148d, the wireless device may exclude the second resources from the candidate resource set. The wireless device may exclude the second resources from the candidate resource set, for example, based on the measurement of the one or more PSFCH resources associated with first resources. The wireless device may exclude the second resources from the candidate resource set, for example, if a received power of the one or more PSFCH resources is greater than the threshold value. At step 4190, the wireless device may select third resources from the candidate resource set. The wireless device may select third resources, for example, based on the excluding the second resources from the candidate resource set. At step 4191, the wireless device may send the first sidelink transmission via the selected third resources.

The wireless device may perform PSFCH-based exclusion 4148 described with respect to FIG. 41, for example, after a second exclusion 2250 such as described with respect to FIG. 22. The wireless device may perform PSFCH-based exclusion 4148 described with respect to FIG. 41, for example, within a second exclusion 2250 such as described with respect to FIG. 22 (e.g., as part of the second exclusion 2250).

Figure 42:
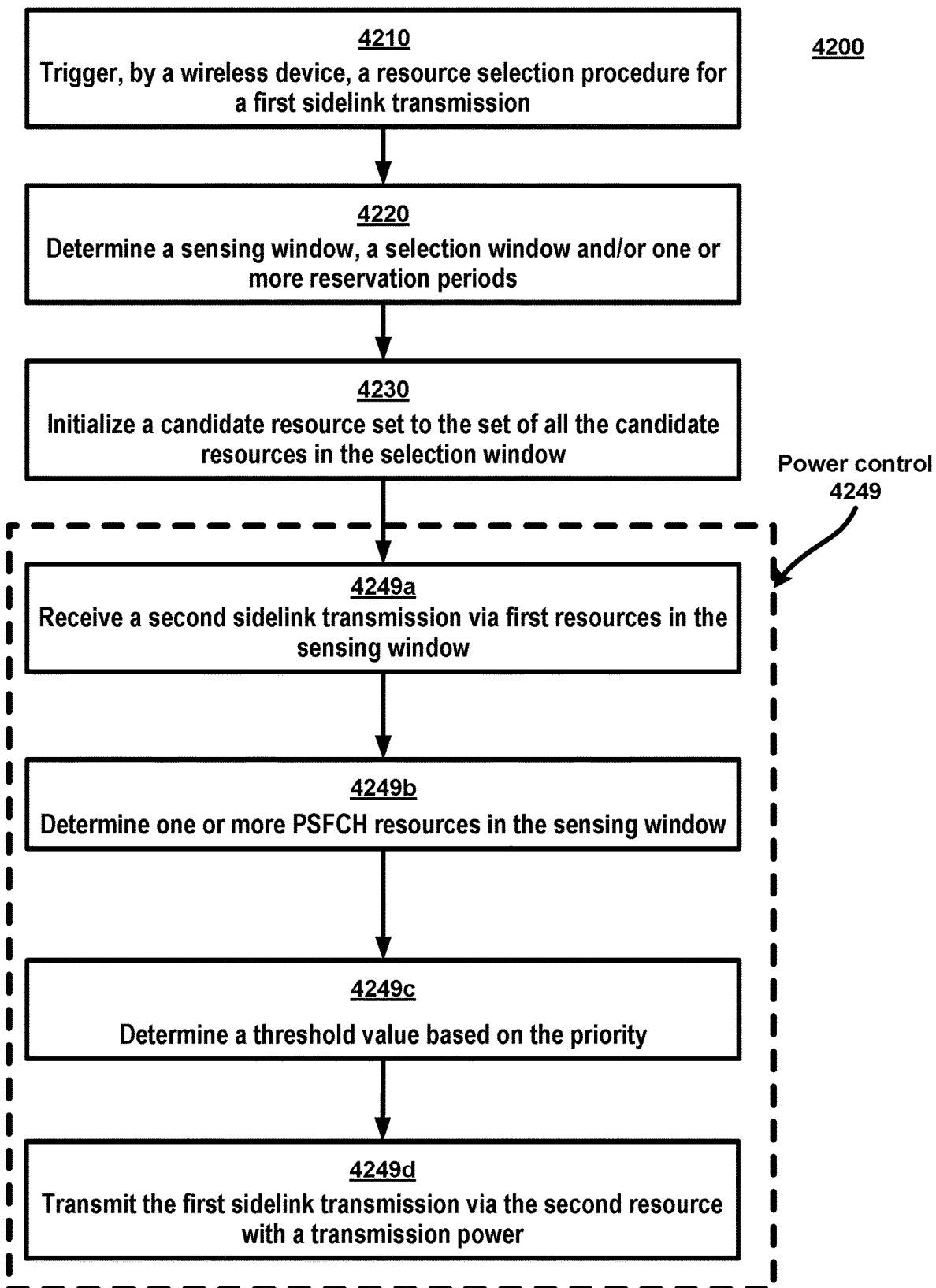
FIG. 42 is an example method of PSFCH-based power control in a resource selection procedure.

FIG. 42 shows an example method for determination of transmission power. The example method 4200 may comprise PSFCH-based power control in a resource selection procedure. A first sidelink transmission may be sent via a second resource with a determined transmission power. At step 4210, a wireless device may trigger a resource selection procedure for selecting resources for a first sidelink transmission. At step 4220, the wireless device may determine a sensing window based on the triggering the resource selection procedure. The wireless device may determine a selection window based on the triggering the resource selection procedure. The wireless device may determine one or more reservation periods for resource reservation. At step 4230, the wireless device may initialize a candidate resource set. The candidate resource set may comprise a plurality of candidate resources.

At step 4249a, the wireless device may receive, via first resources, a second sidelink transmission in the sensing window. The second sidelink transmission may comprise SCI and a TB. The SCI may indicate a priority of the second sidelink transmission. The SCI may indicate a resource assignment for second resources in the selection window. The wireless device may send, via the second resources, the same TB as received in the second sidelink transmission. The SCI may indicate a reservation period, of the one or more reservation periods, for resource reservation of second resources in the selection window. The wireless device may send, via the second resources, a different TB than the TB received in the second sidelink transmission. The priority may be a physical layer priority of a packet in the second sidelink transmission. The priority may map to (or associate with) one or more LCPs of the second sidelink transmission. The wireless device may measure an RSRP of the second sidelink transmission, for example, based on the SCI. The wireless device may compare the RSRP of the second sidelink transmission with an RSRP threshold value. A mapping between one or more RSRP threshold values and one or more priorities may be configured/determined. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device may determine the RSRP threshold value, for example, based on the priority of the second sidelink transmission, and the mapping between one or more RSRP threshold values and one or more priorities. The mapping may map/associate the RSRP threshold value to the priority of the second sidelink transmission. The wireless device may determine the RSRP threshold value, for example, based on a priority of the first sidelink transmission, and the mapping between one or more RSRP threshold values and one or more priorities. The mapping may map/ associate the RSRP threshold value to the priority of the first sidelink transmission. The wireless device may determine the RSRP threshold value based on the priority of the second sidelink transmission, a priority of the first sidelink transmission, and the mapping between one or more RSRP threshold values and one or more priorities. The mapping may map/associate the RSRP threshold value to a combination of the priority of the first sidelink transmission and the priority of the second sidelink transmission. For example, the combination may be an arithmetic (e.g., addition and/or subtraction) operation (or any other mathematical or logical operation) of the priority of the first sidelink transmission and the priority of the second sidelink transmission. A base station may send a message, to the wireless device, configuring the mapping. The message may comprise an RRC message, a MAC CE, and/or DCI. A third wireless device may send a message, to the wireless device, for configuring the mapping. The message may comprise SCI. The mapping may be pre-configured. A memory of the wireless device may store the pre-configured mapping.

As shown in step 4249b, the wireless device may determine one or more PSFCH resources in the sensing window. The one or more PSFCH resources may be associated with the first resources, for example, based on an association mapping between a PSSCH of the second sidelink transmission and the one or more PSFCH resources. The wireless device may determine the one or more PSFCH resources based on a measurement of the one or more PSFCH resources. The measurement may be based on an energy detection of the one or more PSFCH resources. The measurement may comprise received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may comprise received power(s) of signals sent via of the one or more PSFCH resources. For example, the received power(s) may be average or highest received power(s) of signals sent via the one or more PSFCH resources. For example, the received power(s) may be average or highest received power(s) of one or more reference signals sent via the one or more PSFCH resources. The wireless device may assume/determine that a transmission power of signals sent via the one or more PSFCH resources is a maximum transmission power (or any other transmission power).

As shown in step 4249c, the wireless device may determine a threshold value, for example, based on the priority of the second sidelink transmission via the first resources and/or the priority of the first sidelink transmission. A mapping between one or more threshold values and one or more priorities may be configured/determined. For example, a first priority of the one or more priorities may map to (or associate with) a first threshold value of the one or more threshold values. A second priority of the one or more priorities may map to (or associate with) a second threshold value of the one or more threshold values. The wireless device may determine the threshold value, for example, based on the priority of the second sidelink transmission, and the mapping between one or more threshold values and one or more priorities. The mapping may map/associate the threshold value to the priority of the second sidelink transmission. The wireless device may determine the threshold value, for example, based on the priority of the first sidelink transmission, and the mapping between one or more threshold values and one or more priorities. The mapping may map/associate the threshold value to the priority of the first sidelink transmission. The wireless device may determine the threshold value based on the priority of the second sidelink transmission, the priority of the first sidelink transmission, and the mapping between one or more threshold values and one or more priorities. The mapping may map/associate the threshold value to a combination of the priority of the first sidelink transmission and the priority of the second sidelink transmission. For example, the combination may be an arithmetic (e.g., addition and/or subtraction) operation of the priority of the first sidelink transmission and the priority of the second sidelink transmission. A base station may send a message, to the wireless device, configuring the mapping. The message may comprise an RRC message, a MAC CE, and/or DCI. A third wireless device may send a message, to the wireless device, for configuring the mapping. The message may comprise a SCI. The mapping may be pre-configured. A memory of the wireless device may store the pre-configured mapping.

As shown in step 4249d, the wireless device may send the first sidelink transmission via the second resources. The wireless device may send the first sidelink transmission using a transmission power. The wireless device may determine the transmission power, for example, based on the measurement of the one or more PSFCH resources. The wireless device may determine a first transmission power for sending the first sidelink transmission, for example, based on a received power of (e.g., received power of signals sent via) the one or more PSFCH resources is greater than a threshold value of the one or more threshold values. The wireless device may determine a second transmission power for sending the first sidelink transmission, for example, based on the received power of (e.g., received power of signals sent via) the one or more PSFCH resources being less than the threshold value of the one or more threshold values. The first transmission power may be less than the second transmission power.

Figure 43A:
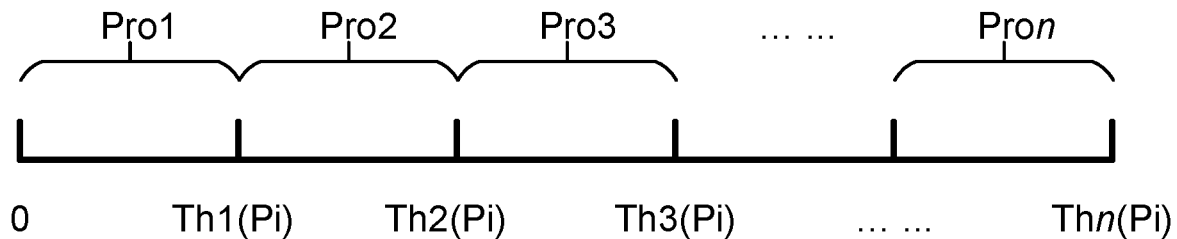
FIG. 43A, FIG. 43B, and FIG. 43C show examples of mapping between one or more threshold values and one or more priorities.
Figure 43B:
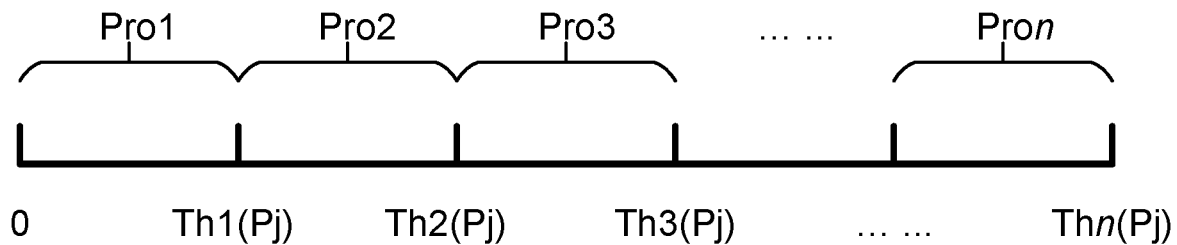
Figure 43C:
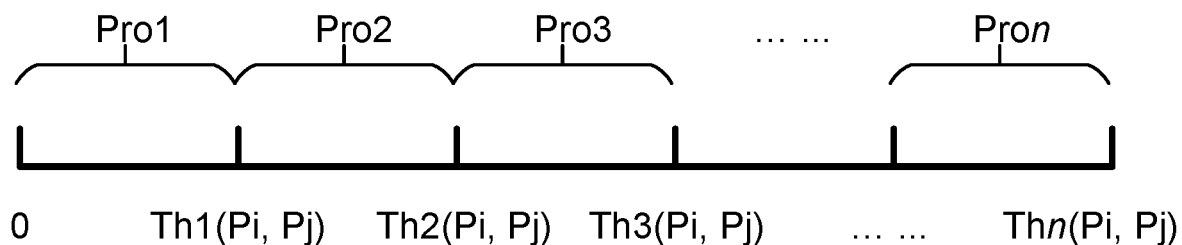

FIG. 43A, FIG. 43B, and FIG. 43C show examples of mapping between one or more threshold values and one or more priorities. A wireless device may trigger a resource selection procedure for sending a first sidelink transmission. The first sidelink transmission may have a priority Pi. The wireless device may receive a second sidelink transmission, via resources, in a sensing window. SCI of the second sidelink transmission may indicate a priority Pj of the second sidelink transmission. As shown in FIG. 43A, the wireless device may determine one or more threshold values, for example, based on the priority Pi of the first sidelink transmission. As shown in FIG. 43A, there may be n threshold values (e.g., Th1(Pi), Th2(Pi), Th3(Pi) Th4(Pi), and Thn(Pi)). Then threshold values may vary based on the priority Pi. The wireless device may determine probability for excluding the resources from a candidate resource set based on the one or more threshold values. The wireless device may determine the probability 3 (e.g., Pro3 in FIG. 43A), for example, if a received power Prx of PSFCH resources (e.g., signals sent via PSFCH resources) associated with the second sidelink transmission satisfies the condition $Th2(Pi)<Prx \leq Th3(Pi)$. As shown in FIG. 43B, the wireless device may determine one or more threshold values based on the priority Pj of the second sidelink transmission. As shown in FIG. 43B, there may be n threshold values (e.g., Th1(Pj), Th2(Pj), Th3(Pj), Th4(Pj), and Thn(Pj)). The n threshold values may vary based on the priority Pj. The wireless device may determine probability for excluding the resources from a candidate resource set based on the one or more threshold values. The wireless device may determine the probability 3 (e.g., Pro3 in FIG. 43B), for example, if a received power Prx of PSFCH resources (e.g., signals sent via PSFCH resources) associated with the second sidelink transmission satisfies $Th2(Pj)<Prx \leq Th3(Pj)$. As shown in FIG. 43C, the wireless device may determine one or more threshold values based on a combination of the priority Pi of the first sidelink transmission and the priority Pj of the second sidelink transmission. For example, the combination may be an arithmetic (e.g., addition and/or subtraction) operation (or any other operation) based on the priority Pi and the priority Pj. As shown in FIG. 43C, there may be n threshold values (e.g., Th1(Pi,Pj), Th2(Pi,Pj), Th3(Pi, Pj), Th4(Pi, Pj), and Thn(Pi, Pj)). The n threshold values may vary based on the priority Pi and the priority Pj. The wireless device may determine probability for excluding the resources from a candidate resource set based on the one or more threshold values. The wireless device may determine the probability 3 (e.g., Pro3 in FIG. 43C), for example, if a received power Prx of PSFCH resources (e.g., signals sent via PSFCH resources) associated with the second sidelink transmission satisfies $Th2(Pi, Pj)<Prx \leq Th3(Pi, Pj)$.

Figure 44:
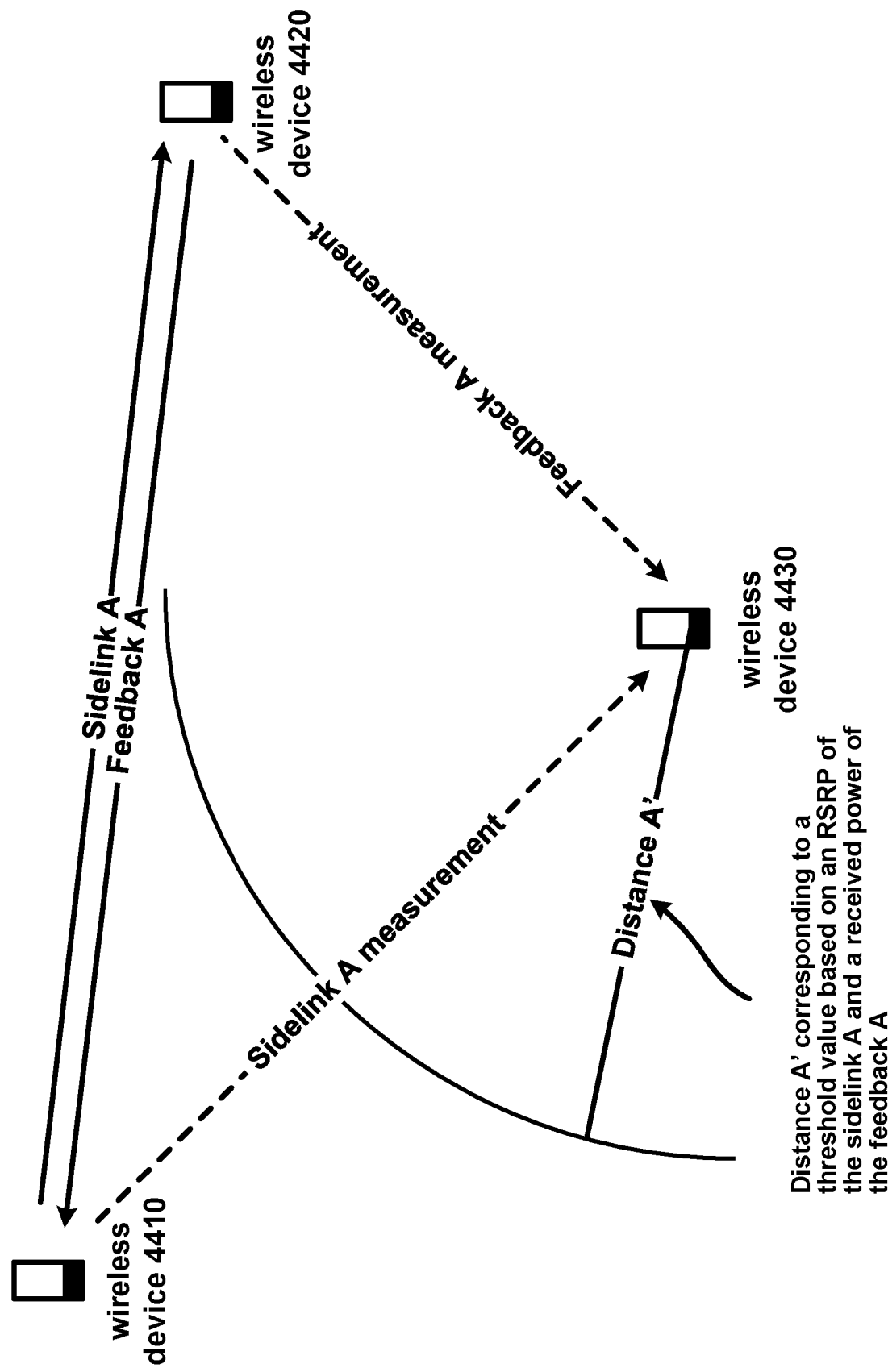
FIG. 44 shows an example of interference reduction based on feedback measurement in a resource selection procedure.

FIG. 44 shows an example resource selection for interference reduction. The example resource selection may be based on feedback measurement and sidelink measurement. An offset value to be used for resource exclusion may be calculated based on signal powers (e.g., RSRP) of sidelink A and feedback A. A wireless device 4410 may send, via first resources, sidelink transmission A to wireless device 4420. The wireless device 4420 may send feedback A to the wireless device 4410, for example, based on receiving the sidelink transmission A. A wireless device 4430 may trigger the resource selection procedure to select third resources from a candidate resource set. The third resource may be for sending a sidelink transmission by the wireless device 4430.

The wireless device 4430 may receive, from the wireless device 4410, the sidelink transmission A in a sensing window. The wireless device 4430 may measure an RSRP of the sidelink transmission A, for example, based on SCI of the sidelink transmission A. The SCI may indicate a priority of the sidelink transmission A. A mapping between one or more RSRP threshold values and one or more priorities may be configured. A first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device 4430 may determine an RSRP threshold value, for example, based on the priority of the sidelink transmission A, and the mapping between one or more RSRP threshold values and one or more priorities. A base station may send a message, to the wireless device 4430, for configuring/determining the RSRP threshold value. The message may comprise an RRC message, a MAC CE, and/or DCI. A wireless device may send a message for configuring/determining the RSRP threshold value to the wireless device 4430. The message may comprise SCI. The RSRP threshold value may be pre-configured. A memory of the wireless device 4430 may store the pre-configured RSRP threshold value. The wireless device 4430 may determine the third resources based on the RSRP of the sidelink transmission A and the RSRP threshold value.

The wireless device 4430 may receive the feedback A, from the wireless device 4420, in the sensing window. The wireless device 4430 may receive the feedback A via PSFCH resources. The wireless device 4430 may measure the feedback A based on a received power of the feedback A. The PSFCH resources may be associated with the first resources used for sending the sidelink transmission A. The wireless device 4430 may determine an offset value based on a threshold value. A mapping between one or more threshold values and one or more priorities may be configured/determined. A first priority of the one or more priorities may map to (or associate with) a first threshold value of the one or more threshold values. A second priority of the one or more priorities may map to (or associate with) a second threshold value of the one or more threshold values. The wireless device 4430 may determine the threshold value, for example, based on the priority of the sidelink transmission A, and the mapping between one or more threshold values and one or more priorities. A base station may send, to the wireless device 4430, a message configuring/determining the mapping. The message may comprise an RRC message, a MAC CE, and/or DCI. A wireless device may send, to the wireless device 4430, a message for configuring/determining the mapping. The message may comprise SCI. The mapping may be pre-configured. A memory associated with the wireless device 4430 may store the pre-configured mapping. The wireless device 4430 may determine the third resources, for example, based on the received power of the feedback A and the mapping.

The wireless device 4430 may determine second resources based on the SCI of the sidelink transmission A. The SCI may indicate resource assignment, of the second resources, for a future sidelink transmission. The future sidelink transmission may be from the wireless device 4410 to the wireless device 4420 via a resource pool. The future sidelink transmission may be a retransmission of the same TB as sent in the sidelink transmission A. The SCI may indicate a reservation period, of one or more reservation periods, for resource reservation of the second resources for a future sidelink transmission (e.g., from the wireless device 4410 to the wireless device 4420 of via a resource pool). The future sidelink transmission may be a new transmission of a different TB than TB sent in the sidelink transmission A. A base station may send a message for configuring/determining the one or more reservation periods of the resource pool to the wireless device 4430. The resource pool may comprise the first resources, the second resources, the third resources, and the PSFCH resources. The message may comprise an RRC message, a MAC CE, and/or DCI. The one or more reservation periods of the resource pool may be pre-configured for the wireless device 4430. A memory associated with the wireless device 4430 may store the one or more reservation periods of the resource pool.

The wireless device 4430 may exclude the second resources from the candidate resource set. The wireless device 4430 may exclude the second resources from the candidate resource set, for example, based on the RSRP of the sidelink transmission A, the RSRP threshold value, and/or the offset value. The wireless device 4430 may determine a distance A' based on the RSRP of the sidelink transmission A, the RSRP threshold value, and/or the offset value. The offset value may be added to the RSRP of the sidelink transmission A. The wireless device 4430 may exclude the second resources from the candidate resource set, for example, if (the RSRP of the sidelink A+the offset value)>the RSRP threshold value. The wireless device 4430 may not exclude the second resources from the candidate resource set, for example, if (the RSRP of the sidelink A+the offset value)<the RSRP threshold value. The offset value may be added to the RSRP threshold value. The wireless device 4430 may exclude the second resources from the candidate resource set, for example, if the RSRP of the sidelink A>(the RSRP threshold value+the offset value). The wireless device 4430 may not exclude the second resources from the candidate resource set, for example, if the RSRP of the sidelink A<(the RSRP threshold value+the offset value). The wireless device 4430 may select the third resources from the candidate resource set based on the excluding the second resources from the candidate resource set.

The wireless device 4430 may determine one or more offset values, for example, based on one or more threshold values. The wireless device 4430 may determine the third resources based on the one or more offset values. The wireless device 4430 may compare the received power of the feedback A EA with a first threshold value Th1 and a second threshold value Th2, where Th1<Th2 The wireless device 4430 may determine a first offset value of the one or more offset values for excluding the second resources from the candidate resource set, for example, if EA≤Th1. The wireless device 4430 may determine a second offset value of the one or more offset values for excluding the second resources from the candidate resource set, for example, if Th1<EA<Th2. The wireless device 4430 may determine a third offset value of the one or more offset values for excluding the second resources from the candidate resource set, for example, if Th2≤EA.

Figure 45:
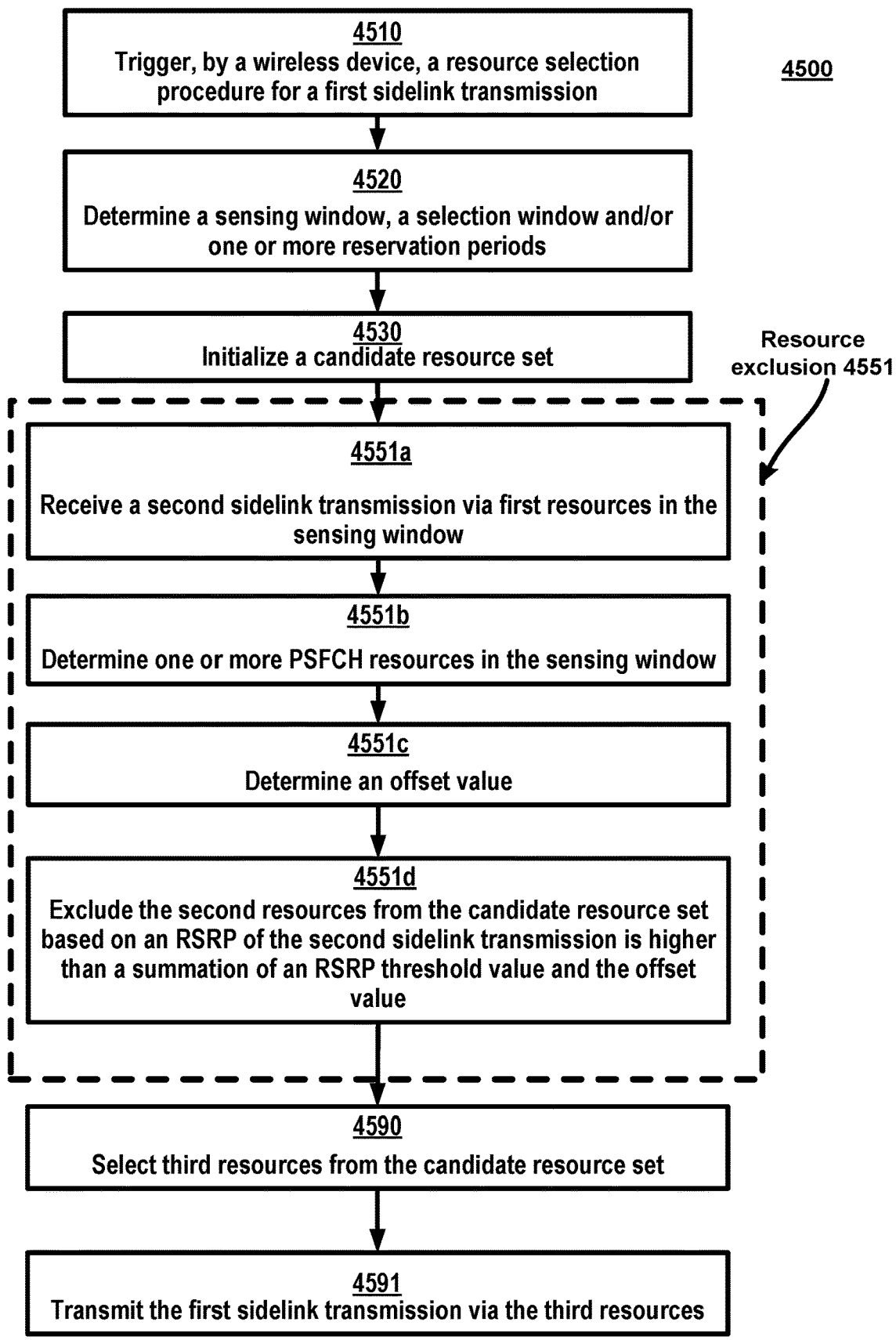
FIG. 45 shows an example method of PSFCH-based resource exclusion in a resource selection procedure.

FIG. 45 shows an example method for resource selection. The example method 4500 may comprise PSFCH-based resource exclusion based on an RSRP threshold value and an offset value. At step 4510, a wireless device may trigger a resource selection procedure for selecting resources for a first sidelink transmission. At step 4520, the wireless device may determine a sensing window based on the triggering the resource selection procedure. The wireless device may determine a selection window based on the triggering the resource selection procedure. The wireless device may determine one or more reservation periods for resource reservation. At step 4530, the wireless device may initialize a candidate resource set. The candidate resource set may comprise a plurality of candidate resources.

At step 4551*a*, the wireless device may receive, via first resources, a second sidelink transmission in the sensing window. The second sidelink transmission may comprise SCI and a TB. The SCI may indicate a priority of the second sidelink transmission. The SCI may indicate a resource assignment for second resources in the selection window. The wireless device may send, via the second resources, the same TB as included in the second sidelink transmission. The SCI may further indicate a reservation period, of the one or more reservation periods, for resource reservation of second resources in the selection window. The wireless device may send, via the second resources, a different TB than the TB included in the second sidelink transmission. The priority may be a physical layer priority of a packet in the second sidelink transmission. The priority may map to (or associate with) one or more LCPs of the second sidelink transmission. The wireless device may measure an RSRP of the second sidelink transmission, for example, based on the SCI. The wireless device may determine an RSRP threshold value based on a mapping between one or more RSRP threshold values and one or more priorities. For example, a first priority of the one or more priorities may map to (or associate with) a first RSRP threshold value of the one or more RSRP threshold values. A second priority of the one or more priorities may map to (or associate with) a second RSRP threshold value of the one or more RSRP threshold values. The wireless device may determine the RSRP threshold value, for example, based on the priority of the second sidelink transmission, and/or the mapping between one or more RSRP threshold values and one or more priorities. The mapping may map/associate the RSRP threshold value to the priority of the second sidelink transmission. The wireless device may determine the RSRP threshold value, for example, based on a priority of the first sidelink transmission, and/or the mapping between one or more RSRP threshold values and one or more priorities. The mapping may map/associate the RSRP threshold value to the priority of the first sidelink transmission. The wireless device may determine the RSRP threshold value, for example, based on the priority of the second sidelink transmission, a priority of the first sidelink transmission, and/or the mapping between one or more RSRP threshold values and one or more priorities. The mapping may map/associate the RSRP threshold value to a combination of the priority of the first sidelink transmission and the priority of the second sidelink transmission. For example, the combination may be an arithmetic (e.g., addition and/or subtraction) operation (or any other operation) comprising the priority of the first sidelink transmission and the priority of the second sidelink transmission. A base station may send a message, to the wireless device, configuring the mapping. The message may comprise an RRC message, a MAC CE, and/or DCI. A third wireless device may send a message, to the wireless device, for configuring the mapping. The message may comprise SCI. The mapping may be pre-configured. A memory associated with the wireless device may store the pre-configured mapping.

At step 4551b, the wireless device may determine one or more PSFCH resources in the sensing window. The one or more PSFCH resources may be associated with the first resources, for example, based on an association mapping between a PSSCH of the second sidelink transmission and the one or more PSFCH resources. The wireless device may determine the one or more PSFCH resources, for example, based on a measurement of the one or more PSFCH resources. The measurement may be based on an energy detection of the one or more PSFCH resources. The measurement may comprise received power(s) of signals sent via the one or more PSFCH resources, RSRP(s) of signals sent via the one or more PSFCH resources, RSSI(s) of the one or more PSFCH resources, RSRQ(s) of the one or more PSFCH resources, and/or SINR(s) of the one or more PSFCH resources. The measurement may comprise received power(s) of signals sent via the one or more PSFCH resources. For example, the received power(s) may comprise average or highest received power(s) of signals sent via the one or more PSFCH resources. For example, the received power may comprise average or highest received power(s) of one or more reference signals sent via the one or more PSFCH resources. The wireless device may assume/determine that a transmission power of signals sent via the one or more PSFCH resources is a maximum transmission power.

At step 4551c, the wireless device may determine an offset value. The wireless device may determine the offset value, for example, based on the measurement of one or more PSFCH resources in the sensing window, a set of threshold values, the priority of the first sidelink transmission, and/or the priority of the second sidelink transmission. The set of threshold values may comprise one or more threshold values. The wireless device may determine the one or more threshold values, for example, based on the priority of the second sidelink transmission via the first resources and/or the priority of the first sidelink transmission, and a mapping between one or more sets of threshold values and one or more priorities. A first priority of the one or more priorities may map to (or associate with) a first set of threshold values of the one or more sets of threshold values. A second priority of the one or more priorities may map to (or associate with) a second set of threshold values of the one or more sets of threshold values. The wireless device may determine the set of threshold values, for example, based on the priority of the second sidelink transmission, and/or the mapping between one or more sets of threshold values and one or more priorities. The mapping may map/associate the set of threshold values to the priority of the second sidelink transmission. The wireless device may determine the set of threshold values, for example, based on the priority of the first sidelink transmission, and/or the mapping between one or more sets of threshold values and one or more priorities. The mapping may map/associate the set of threshold values to the priority of the first sidelink transmission. The wireless device may determine the set of threshold values, for example, based on the priority of the second sidelink transmission, the priority of the first sidelink transmission, and/or the mapping between one or more sets of threshold values and one or more priorities. The mapping may map/associate the set of threshold value to a combination of the priority of the first sidelink transmission and the priority of the second sidelink transmission. For example, the combination may be an arithmetic (e.g., addition and/or subtraction) operation (or any other operation) of the priority of the first sidelink transmission and the priority of the second sidelink transmission. A base station may send a message, to the wireless device, configuring/determining the mapping. The message may comprise an RRC message, a MAC CE, and/or DCI. A third wireless device may send a message, to the wireless device, for configuring/determining the mapping. The message may comprise SCI. The mapping may be pre-configured. A memory associated with the wireless device may store the pre-configured mapping. The wireless device may determine the offset value based on the set of threshold values.

The wireless device may determine the offset value based on one or more considerations. The wireless device may determine the offset value, for example, based on the priority of the second sidelink transmission and/or the priority of the first sidelink transmission, and a mapping between one or more sets of offset values and one or more priorities. A set of offset values may comprise one or more offset values. For example, a first priority of the one or more priorities may map to (or associate with) first set of offset values of the one or more sets of offset values. A second priority of the one or more priorities may map to (or associate with) second set of offset values of the one or more sets of offset values. The wireless device may determine the offset value, for example, based on the priority of the second sidelink transmission, and the mapping between one or more sets of offset values and one or more priorities. The mapping may map/associate the offset value to the priority of the second sidelink transmission. The wireless device may determine the offset value, for example, based on the priority of the first sidelink transmission, and the mapping between one or more sets of offset values and one or more priorities. The mapping may map/associate the offset value to the priority of the first sidelink transmission. The wireless device may determine the offset value, for example, based on the priority of the second sidelink transmission, the priority of the first sidelink transmission, and the mapping between one or more sets of offset values and one or more priorities. The mapping may map/associate the offset value to a combination of the priority of the first sidelink transmission and the priority of the second sidelink transmission. For example, the combination may be an arithmetic (e.g., addition and/or subtraction) operation (or any other operation) comprising the priority of the first sidelink transmission and the priority of the second sidelink transmission. A base station may send, to the wireless device, a for message configuring/determining the mapping. The message may comprise an RRC message, a MAC CE, and/or DCI. A third wireless device may send, to the wireless device, a message for configuring/determining the mapping. The message may comprise SCI. The mapping may be pre-configured. A memory associated with the wireless device may store the pre-configured mapping.

At step 4551*d*, the wireless device may exclude the second resources from the candidate resource set. The wireless device may exclude the second resources, for example, based on the offset value. The wireless device may exclude the second resources from the candidate resource set, for example, if the RSRP of the second sidelink transmission>(the RSRP threshold value+the offset value). The wireless device may not exclude the second resources from the candidate resource set, for example, if the RSRP of the second sidelink transmission≤(the RSRP threshold value+ the offset value).

At step 4590, the wireless device may select third resources from the candidate resource set. The wireless device may select third resources based on the excluding the second resources from the candidate resource set. At step 4591, the wireless device may send the first sidelink transmission via the selected third resources.

The wireless device may perform PSFCH-based exclusion 4551 as described with respect to FIG. 45, for example, after the second exclusion 2250 described with respect to FIG. 22. The wireless device may perform PSFCH-based exclusion 4551 as described with respect to FIG. 45, for example, within the second exclusion 2250 such as described with respect to FIG. 22 (e.g., as part of the second exclusion 2250).

Figure 46A:
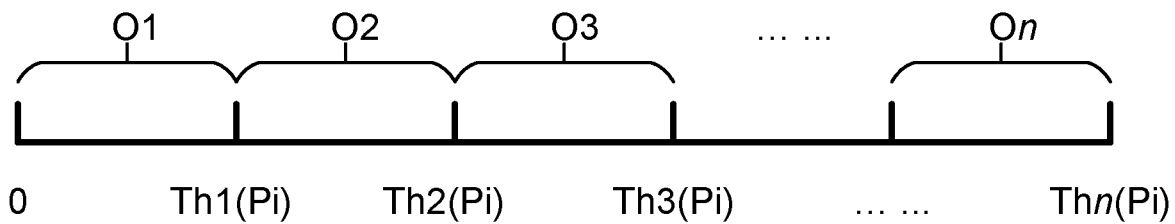
FIG. 46A, FIG. 46B, and FIG. 46C show examples of mapping between one or more threshold values and one or more priorities.
Figure 46B:
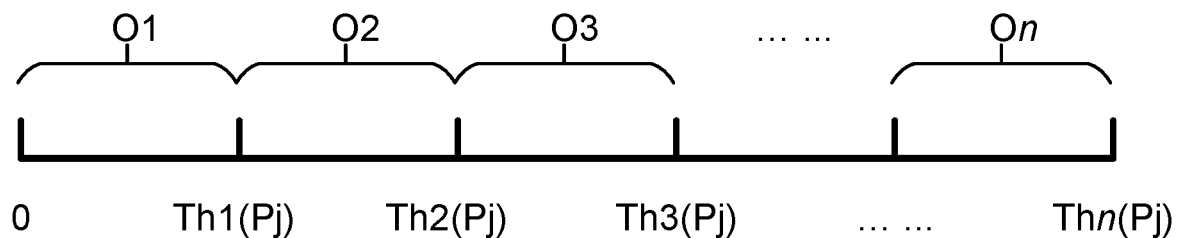
Figure 46C:
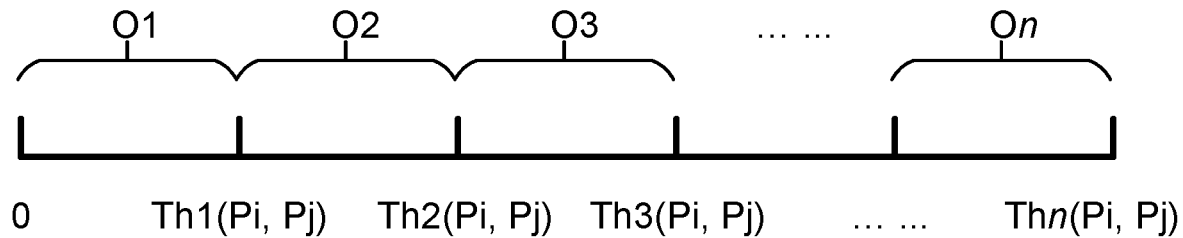

FIG. 46A, FIG. 46B, and FIG. 46C show example mapping between one or more threshold values and one or more priorities. A wireless device may trigger a resource selection procedure for sending a first sidelink transmission. The first sidelink transmission may have a priority Pi. The wireless device may receive a second sidelink transmission in a sensing window. SCI of the second sidelink transmission may indicate a priority Pj of the second sidelink transmission. As shown in FIG. 46A, the wireless device may determine one or more threshold values based on the priority Pi of the first sidelink transmission. FIG. 46A shows n threshold values (e.g., Th1(Pi), Th2(Pi), Th3(Pi), Th4(Pi), and Thn(Pi)). Then threshold values may vary based on the priority Pi. The wireless device may determine an offset value based on the one or more threshold values. The wireless device may determine the offset value 3 (e.g., O3 in FIG. 46A), for example, if a received power Prx of PSFCH resources (e.g., signals sent via PSFCH resources) associated with the second sidelink transmission satisfies the condition Th2(Pi)<Prx≤Th3(Pi). As shown in FIG. 46B, the wireless device may determine one or more threshold values based on the priority Pj of the second sidelink transmission. FIG. 46B shows n threshold values (e.g., Th1(Pj), Th2(Pj), Th3(Pj), Th4(Pj), and Thn(Pj)). The n threshold values may vary based on the priority Pj. The wireless device may determine an offset value based on the one or more threshold values. The wireless device may determine the offset value 3 (e.g., O3 in FIG. 46B), for example, if a received power Prx of PSFCH resources (e.g., signals sent via PSFCH resources) associated with the second sidelink transmission satisfies the condition Th2(Pj)<Prx≤Th3(Pj). As shown in FIG. 46C, the wireless device may determine one or more threshold values based on a combination of the priority Pi of the first sidelink transmission and the priority Pj of the second sidelink transmission. For example, the combination may be an arithmetic (e.g., addition and/or subtraction) operation (or any other operation comprising the priority Pi and the priority Pj. FIG. 46C shows n threshold values (e.g., Th1(Pi, Pj), Th2(Pi, Pj), Th3(Pi, Pj), Th4(Pi, Pj), and Th5(Pi, Pj)). The n threshold values may vary based on the priority Pi and the priority Pj. The wireless device may determine an offset value based on the one or more threshold values. The wireless device may determine the offset value 3 (e.g., O3 in FIG. 46C), for example, if a received power Prx of PSFCH resources (e.g., signals sent via PSFCH resources) associated with the second sidelink transmission satisfies the condition Th2(Pi, Pj)<Prx≤Th3(Pi, Pj).

Figure 47A:
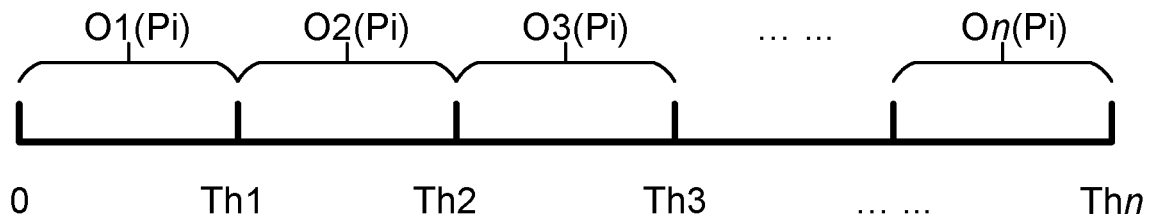
FIG. 47A, FIG. 47B, and FIG. 47C show examples of mapping between one or more offset values and one or more priorities.
Figure 47B:
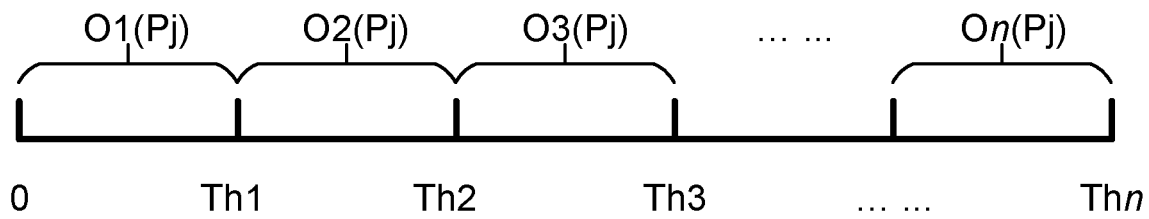
Figure 47C:
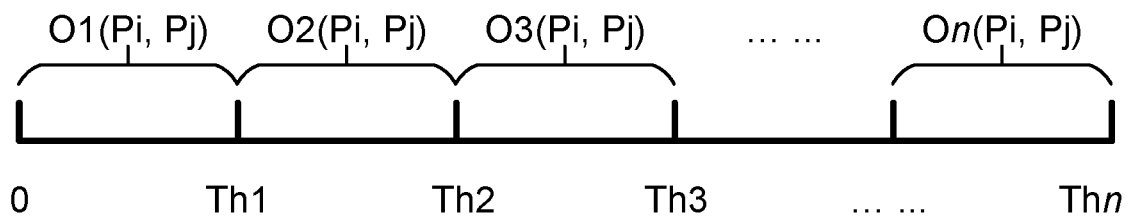

FIG. 47A, FIG. 47B, and FIG. 47C show example mapping between one or more offset values and one or more priorities. A wireless device may trigger a resource selection procedure for sending a first sidelink transmission. The first sidelink transmission may have a priority Pi. The wireless device may receive a second sidelink transmission in a sensing window. SCI of the second sidelink transmission may indicate a priority Pj of the second sidelink transmission. As shown in FIG. 47A, the wireless device may determine one or more offset values based on the priority Pi of the first sidelink transmission. FIG. 47A, shows n threshold values (e.g., Th1, Th2, Th3, Th4, and Thn). A base station or a second wireless device may configure the n threshold values for the wireless device. The n threshold values may be preconfigured for the wireless device. The wireless device may determine the one or more offset values, for example, based on the one or more threshold values and the priority Pi of the first sidelink transmission. The wireless device may determine the offset value 3 (e.g., O3(Pi) in FIG. 47A), for example, if a received power Prx of PSFCH resources (e.g., signals sent via PSFCH resources) associated with the second sidelink transmission satisfies the condition Th2<Prx≤Th3. As shown in FIG. 47B, the wireless device may determine one or more offset values based on the priority Pi of the first sidelink transmission. FIG. 47B, shows n threshold values (e.g., Th1, Th2, Th3, Th4, and Thn). A base station or a second wireless device may configure the n threshold values for the wireless device. The n threshold values may be preconfigured for the wireless device. The wireless device may determine the one or more offset values, for example, based on the one or more threshold values and the priority Pj of the second sidelink transmission. The wireless device may determine the offset value 3 (e.g., O3(Pj) in FIG. 47B), for example, if a received power Prx of PSFCH resources (e.g., signals sent via PSFCH resources) associated with the second sidelink transmission satisfies the condition Th2<Prx≤Th3. As shown in FIG. 47C, the wireless device may determine one or more offset values based on the priority Pi of the first sidelink transmission. In an example of FIG. 47C, there are n threshold values (e.g., Th1, Th2, Th3, Th4, and Thn). A base station or a second wireless device may configure the n threshold values for the wireless device. The n threshold values may be preconfigured for the wireless device. The wireless device may determine the one or more offset values, for example, based on the one or more threshold values, the priority Pi of the first sidelink transmission, and the priority Pj of the second sidelink transmission. The wireless device may determine the offset value 3 (e.g., O3(Pi, Pj) in FIG. 47C), for example, if a received power Prx of PSFCH resources (e.g., signals sent via PSFCH resources) associated with the second sidelink transmission satisfies the condition Th2<Prx≤Th3.

A wireless device may trigger a resource selection procedure for a first sidelink transmission. The wireless device may determine a sensing window based on the triggering the resource selection procedure. The wireless device may determine a selection window based on the triggering the resource selection procedure. The wireless device may initialize a candidate resource set comprising candidate resources in the selection window. The wireless device may receive a second sidelink transmission via first resources in the sensing window. SCI of the second sidelink transmission may indicate a priority of the second sidelink transmission and second resources in the selection window. The wireless device may determine one or more PSFCH resources in the sensing window. The one or more PSFCH resources may be associated with the first resources. The wireless device may exclude the second resources from the candidate resource set, for example, based on the priority of the second sidelink transmission and a measurement of the one or more PSFCH resources. The wireless device may select third resource from the candidate resource set based on the excluding. The wireless device may send the first sidelink transmission via the third resources.

The measurement may comprise a received power of signals sent via the one or more PSFCH resources. The wireless device may receive one or more RRC messages. The one or more RRC messages may comprise one or more parameters. The one or more parameters may indicate one or more threshold values. The wireless device may determine the one or more PSFCH resources in the sensing window, for example, based on the received power of signals sent via the one or more PSFCH resources being greater than a threshold value of the one or more threshold values. The wireless device may determine a probability for the excluding the second resources from the candidate resource set, for example, based on the received power of signals sent via the one or more PSFCH resources and the one or more threshold values. The SCI may comprise one or more parameters indicating resource assignment of the second resources for a third sidelink transmission. The third sidelink transmission may comprise a same TB as included in the second sidelink transmission.

The wireless device may receive one or more RRC message. The one or more RRC messages may comprise one or more first parameters. The one or more first parameters may configure one or more reservation periods of a resource pool. The SCI may further indicate a reservation period, of the one or more reservation periods, for resource reservation of the second resources for a third sidelink transmission. The third sidelink transmission may comprise a different TB than a TB included in the second sidelink transmission.

The one or more RRC messages may further comprise one or more second parameters. The one or more second parameters may indicate a mapping between one or more threshold values and one or more priorities. The wireless device may select a threshold value, from the one or more threshold values, for example, based on the priority of the second sidelink transmission. The wireless device may select a threshold value, from the one or more threshold values, for example, based on a priority of the first sidelink transmission. The wireless device may select a threshold value, from the one or more threshold values, for example, based on a combination of the priority of the second sidelink transmission and a priority of the first sidelink transmission. The combination may be an arithmetic operation (or any other operations) comprising the priority of the second sidelink transmission and the priority of the first sidelink transmission. The wireless device may exclude the second resources from the candidate resource set, for example, based on at least one of: an RSRP of the second sidelink transmission being greater than a RSRP threshold value, and the received power of signals sent via the one or more PSFCH resources being greater than the threshold value.

The wireless device may determine an offset value, for example, based on the threshold value. The wireless device may exclude the second resources from the candidate resource set, for example, based on an RSRP of the first sidelink transmission being greater than a summation of the offset value and an RSRP threshold value.

A wireless device may trigger a resource selection procedure for a first sidelink transmission. The wireless device may determine a sensing window based on the triggering the resource selection procedure, a selection window based on the triggering the resource selection procedure, and one or more reservation periods for resource reservation. The wireless device may initialize a candidate resource set. The candidate resource set may comprise candidate resources in the selection window. The wireless device may receive a second sidelink transmission via first resources in the sensing window. SCI of the second sidelink transmission may indicate a priority of the second sidelink transmission, and a reservation period, of the one or more reservation periods, for resource reservation of second resources in the selection window. The wireless device may determine one or more PSFCH resources in the sensing window. The one or more PSFCH resources may be associated with the first resources. The wireless device may send the first sidelink transmission, via the second resources, using a transmission power. The transmission power may be based on the priority of the second sidelink transmission and a measurement of the one or more PSFCH resources.

A wireless device may trigger a resource selection procedure for a first sidelink transmission. The wireless device may determine a sensing window based on the triggering the resource selection procedure, a selection window based on the triggering the resource selection procedure, and one or more reservation periods for resource reservation. The wireless device may initialize a candidate resource set. The candidate resource set may comprise candidate resources in the selection window. The wireless device may receive a second sidelink transmission, via first resources, in the sensing window. SCI of the second sidelink transmission may indicate a priority of the second sidelink transmission and a reservation period, of the one or more reservation periods, for resource reservation of second resources in the selection window. The wireless device may determine one or more PSFCH resources in the sensing window. The one or more PSFCH resources may be associated with the first resources. The wireless device may exclude the second resources from the candidate resource set, for example, based on the priority of the second sidelink transmission and a measurement of the one or more PSFCH resources. The wireless device may select third resources from the candidate resource set based on the excluding. The wireless device may send the first sidelink transmission via the third resources.

A wireless device may trigger a resource selection procedure for a first sidelink transmission. The wireless device may determine a sensing window based on the triggering the resource selection procedure and a selection window based on the triggering the resource selection procedure. The wireless device may initialize a candidate resource set. The candidate resource set may comprise candidate resources in the selection window. The wireless device may receive a second sidelink transmission, via first resources, in the sensing window. SCI of the second sidelink transmission may indicate a priority of the second sidelink transmission and second resources in the selection window. The wireless device may determine one or more PSFCH resources in the sensing window. The one or more PSFCH resources may be associated with the first resources. The wireless device may determine an offset value, for example, based on a measurement of the one or more PSFCH resources, a set of threshold values, and the priority of the second sidelink transmission. The wireless device may exclude the second resources from the candidate resource set, for example, based on an RSRP of the second sidelink transmission being greater than a summation of an RSRP threshold value and the offset value. The wireless device may select third resource from the candidate resource set based on the excluding. The wireless device may send the first sidelink transmission via the third resources.

A first wireless device may perform a method comprising multiple operations. The first wireless device may receive, via a first resource occurring in a sensing time period, control information indicating assignment of a second resource, occurring in a selection time period, for wireless communication by a second wireless device. The first wireless device may determine a received power of one or more feedback channel resources associated with the first resource. The first wireless device may determine, based on the received power of the one or more feedback channel resources satisfying a threshold, a third resource occurring in the selection time period. The first wireless device may transmit, via the third resource, a message to a third wireless device. The first wireless device may also perform one or more additional operations. The determining the third resource may comprise selecting the third resource from among a candidate resource set such that one or more reserved resources are excluded from selection as the third resource. The excluding the one or more reserved resources from selection as the third resource may be based on a probability corresponding to the threshold. The first wireless device may receive at least one configuration parameter indicating at least one of: the sensing time period; or the selection time period. The determining the received power of the one or more feedback channel resources associated with the first resource may comprise measuring a received power of one or more physical sidelink feedback channel (PSFCH) resources associated with the first resource. The control information may indicate one or more resource reservations of a candidate resource set. Determining the third resource may comprise excluding each resource, of the one or more resource reservations of the candidate resource set, that is associated with a feedback channel corresponding to a received power that is greater than a threshold. The determining the third resource may be further based on at least one of: a received signal received power (RSRP), associated with the receiving the control information, being greater than a threshold; or the received power of the one or more feedback channel resources being greater than the threshold. The first wireless device may receive an indication of a priority associated with the second resource. The determining the third resource may be further based on at least one of: the priority associated with the second resource; or a priority associated with the message. The determining the third resource may be further based on a summation of received signal received power (RSRP), associated with the receiving the control information, and an offset value being greater than a threshold. The control information may be for a second message from the second wireless device. The second message may be the same as the message. The threshold value may be based on a cast type of the wireless communication by the second wireless device. The first wireless device may comprise one or more processors; and memory storing instructions that, when executed by the one or more processors, cause the first wireless device to perform the described method, additional operations and/or include the additional elements. A system may comprise the first wireless device configured to perform the described method, additional operations and/or include the additional elements; and a base station configured to send the control information. A computer-readable medium may store instructions that, when executed, cause performance of the described method, additional operations and/or include the additional elements.

A first wireless device may perform a method comprising multiple operations. The first wireless device may receive at least one configuration parameter for selection of one or more resources to communicate with a second wireless device. The at least one configuration parameter may indicate a sensing time period and a selection time period. The first wireless device may receive, via a first resource occurring in the sensing time period, control information indicating assignment of a second resource, occurring in the selection time period, for wireless communication by a third wireless device. The first wireless device may determine, based on a received power of one or more feedback channel resources associated with the second resource, a third resource occurring in the selection time period. The first wireless device may transmit, via the third resource, a message to the second wireless device. The first wireless device may also perform one or more additional operations. The first wireless device may determine the received power of the one or more feedback channel resources associated with the second resource. The determining the received power of the one or more feedback channel resources associated with the first resource may comprise measuring a received power of one or more physical sidelink feedback channel (PSFCH) resources associated with the first resource. The determining the third resource may comprise selecting the third resource from among a candidate resource set such that one or more reserved resources of the candidate resource set are excluded from selection as the third resource. The control information may indicate one or more resource reservations of a candidate resource set. Determining the third resource may comprise excluding each resource, of the one or more resource reservations of the candidate resource set, that is associated with a feedback channel corresponding to a received power that is greater than a threshold. The determining the third resource may be further based on at least one of: a received signal received power (RSRP), associated with the receiving the control information, being greater than a threshold; or the received power of the one or more feedback channel resources being greater than the threshold. The first wireless device may receive an indication of a priority associated with the second resource. The determining the third resource may be further based on at least one of: the priority associated with the second resource; or a priority associated with the message. The first wireless device may comprise one or more processors; and memory storing instructions that, when executed by the one or more processors, cause the first wireless device to perform the described method, additional operations and/or include the additional elements. A system may comprise the first wireless device configured to perform the described method, additional operations and/or include the additional elements; and a base station configured to send the at least one configuration parameter. A computer-readable medium may store instructions that, when executed, cause performance of the described method, additional operations and/or include the additional elements.

A first wireless device may perform a method comprising multiple operations. The first wireless device may receive at least one configuration parameter for selection of one or more resources to communicate with a second wireless device The at least one configuration parameter may indicate a sensing time period for sensing transmission from a third wireless device. The first wireless device may determine a first resource from a candidate resource set. The first resource may be determined based on: control information received via a second resource occurring in the sensing time period, wherein the control information indicates one or more resource reservations of the candidate resource set; and a measurement of one or more feedback channel resources associated with the second resource. The first wireless device may transmit, via the first resource, a message to the second wireless device. The first wireless device may also perform one or more additional operations. The first wireless device may determine the measurement of the one or more feedback channel resources associated with the second resource by measuring a received power of one or more physical sidelink feedback channel (PSFCH) resources associated with the second resource. The determining the first resource may comprise selecting the first resource from the candidate resource set such that one or more reserved resources of the candidate resource set are excluded from selection as the first resource. The first wireless device may receive the control information. The control information may indicate one or more resource reservations of the candidate resource set. The determining the first resource may comprise excluding each resource, of the candidate resource set, that is associated with a feedback channel corresponding to a received power that is greater than a threshold. The determining the first resource may be further based on at least one of: a received signal received power (RSRP), associated with the receiving the control information, being greater than a threshold; or the received power of the one or more feedback channel resources being greater than the threshold. The first wireless device may receive an indication of a priority associated with the second resource. The determining the first resource may be further based on at least one of: the priority associated with the second resource; or a priority associated with the message. The first wireless device may comprise one or more processors; and memory storing instructions that, when executed by the one or more processors, cause the first wireless device to perform the described method, additional operations and/or include the additional elements. A system may comprise the first wireless device configured to perform the described method, additional operations and/or include the additional elements; and a base station configured to send the at least one configuration parameter. A computer-readable medium may store instructions that, when executed, cause performance of the described method, additional operations and/or include the additional elements.

A wireless device may perform a method comprising multiple operations. The wireless device may trigger a resource selection procedure for a sidelink transmission. The wireless device may determine: a sensing window based on the triggering the resource selection procedure; a selection window based on the triggering the resource selection procedure; and one or more reservation periods for resource reservation. The wireless device may determine a received power of one or more physical sidelink feedback channel (PSFCH) resources in the sensing window. The wireless device may determine first resources in the sensing window. The first resources may be associated with the one or more PSFCH resources. The wireless device may determine second resources in the selection window based on: the first resources; and the one or more reservation periods. The wireless device may transmit the sidelink transmission via the second resources with a transmission power based on the received power of the one or more PSFCH resources. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a second wireless device configured to receive the sidelink transmission. A computer-readable medium may store instructions that, when executed, cause performance of the described method, additional operations and/or include the additional elements.

A wireless device may perform a method comprising multiple operations. The wireless device may trigger a resource selection procedure for a sidelink transmission. The wireless device may determine: a sensing window based on the triggering the resource selection procedure; and a selection window based on the triggering the resource selection procedure. The wireless device may receive sidelink control information (SCI) via first resources in the sensing window. The SCI may indicate resource assignment of second resources in the selection window. The wireless device may determine a received power of one or more physical sidelink feedback channel (PSFCH) resources in the sensing window, wherein the one or more PSFCH resources may be associated with the first resources. The wireless device may transmit the sidelink transmission via the second resources with a transmission power based on the received power of the one or more PSFCH resources. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a second wireless device configured to receive the sidelink transmission. A computer-readable medium may store instructions that, when executed, cause performance of the described method, additional operations and/or include the additional elements.

A wireless device may perform a method comprising multiple operations. The wireless device may trigger a resource selection procedure for a sidelink transmission. The wireless device may determine: a sensing window based on the triggering the resource selection procedure; a selection window based on the triggering the resource selection procedure; and one or more reservation periods for resource reservation. The wireless device may initialize a candidate resource set comprising candidate resources in the selection window. The wireless device may determine one or more physical sidelink feedback channel (PSFCH) resources in the sensing window based on a measurement of the one or more PSFCH resources. The wireless device may exclude second resources from the candidate resource set based on: first resources in the sensing window, wherein the first resources are associated with the one or more PSFCH resources; and the one or more reservation periods. The wireless device may select third resource from the candidate resource set based on the excluding. The wireless device may transmit the sidelink transmission via the third resources. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a second wireless device configured to receive the sidelink transmission. A computer-readable medium may store instructions that, when executed, cause performance of the described method, additional operations and/or include the additional elements.

A wireless device may perform a method comprising multiple operations. The wireless device may trigger a resource selection procedure comprising: a sensing window for sensing sidelink transmissions; and a selection window for selecting resources for a first sidelink transmission. The wireless device may initialize a candidate resource set comprising candidate resources in the selection window. The wireless device may exclude a first resource from the candidate resource set based on: SCI, received via a second resource in the sensing window, indicating a resource reservation of the first resource; and a measurement of one or more physical sidelink feedback channel (PSFCH) resources associated with the second resource being greater than a threshold. The wireless device may transmit, via one or more resources of the candidate resource set other than the first resource, the first sidelink transmission. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a second wireless device configured to receive the first sidelink transmission. A computer-readable medium may store instructions that, when executed, cause performance of the described method, additional operations and/or include the additional elements.

A wireless device may perform a method comprising multiple operations. The wireless device may receive configuration parameters for a resource selection procedure. The configuration parameters may indicate: a sensing window for sensing sidelink transmissions; and a selection window for selecting resources for a first sidelink transmission. The wireless device may determine a candidate resource set comprising candidate resources in the selection window. The wireless device may transmit, via one or more resources of the candidate resource set, the first sidelink transmission (e.g., wherein the one or more resources does not comprise a first resource from the candidate resource set), based on: SCI, received via a second resource in the sensing window, indicating a resource reservation of the first resource; and a measurement of one or more physical sidelink feedback channel (PSFCH) resources associated with the second resource being greater than a threshold. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a second wireless device configured to receive the first sidelink transmission. A computer-readable medium may store instructions that, when executed, cause performance of the described method, additional operations and/or include the additional elements.

A wireless device may perform a method comprising multiple operations. The wireless device may trigger, for a first sidelink transmission, a resource selection procedure comprising: a sensing window; and a selection window. The wireless device may initialize a candidate resource set comprising candidate resources in the selection window. The wireless device may exclude, a first resource from the candidate resource set, based on: SCI, received via a second resource in the sensing window, indicating a resource reservation of the first resource; and a measurement of one or more physical sidelink feedback channel (PSFCH) resources associated with the second resource. The wireless device may transmit, based on the candidate resource set excluding the first resource, the first sidelink transmission. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a second wireless device configured to receive the first sidelink transmission. A computer-readable medium may store instructions that, when executed, cause performance of the described method, additional operations and/or include the additional elements.

A wireless device may perform a method comprising multiple operations. The wireless device may receive at least one configuration parameter indicating a set of received power ranges associated with a first priority and a second priority. The first priority may be associated with communication between the first wireless device and a second wireless device. The wireless device may receive, via a first resource, control information indicating: the second priority; and/or a reservation of a second resource. The wireless device may determine a received power range, from the set of received power ranges, comprising a value of a received power measurement of one or more feedback channel resources associated with the first resource. The wireless device may determine, based on the received power range and at least one of the first priority or the second priority, a third resource for communication between the first wireless device and the second wireless device. The wireless device may transmit, via the third resource, a message to the second wireless device. The wireless device may determine a candidate resource set comprising resources occurring in a selection time period, wherein the determining the third resource comprises selecting the third resource from the candidate resource set. The one or more feedback channel resources may comprise one or more physical sidelink feedback channel (PSFCH) resources. The wireless device may determine the third resource by excluding, from selection as the third resource, each resource, of the one or more feedback channel resources, corresponding to a received power range satisfying a threshold. The wireless device may determine, based on the received power range, a transmission power for transmission of the message. The wireless device may transmit the message using the transmission power. The at least one configuration parameter further may indicate: a sensing time period for the receiving the control information; and/or a selection time period during which the second resource occurs and during which the third resource occurs. The second priority may be higher than the first priority. The wireless device may determine the third resource for communication with the second wireless device by excluding, from among a candidate resource set comprising the third resource, one or more resources associated with the second priority. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive at least one configuration parameter for selection of one or more resources to communicate with a second wireless device. The at least one configuration parameter may indicate a sensing time period and a selection time period. The wireless device may receive, via a first resource occurring in the sensing time period, control information indicating: a reservation of a second resource; and/or a priority associated with the second resource. The wireless device may determine a received power range, from a set of received power ranges, comprising a value of a received power measurement of one or more feedback channel resources associated with the first resource. The wireless device may determine, based on the received power range and the priority, a third resource occurring in the selection time period. The wireless device may transmit, via the third resource, a message to the second wireless device. The wireless device may determine a candidate resource set comprising resources occurring in the selection time period. The wireless device may determine the third resource by selecting the third resource from the candidate resource set. The wireless device may determine a received power of one or more feedback channel resources associated with the second resource. The wireless device may determine the third resource based on the received power of the one or more feedback channel resources associated with the second resource. The one or more feedback channel resources may comprise one or more physical sidelink feedback channel (PSFCH) resources. The wireless device may determine the third resource by excluding, from selection as the third resource. Each resource, of the one or more feedback channel resources, may correspond to a received power range satisfying a threshold. The wireless device may determine, based on the received power range, a transmission power for transmission of the message. The wireless device may transmit the message using the transmission power. The priority associated with the second resource may comprise a first priority that is higher than a second priority associated with communication between the first wireless device and the second wireless device. The wireless device may determine the third resource by excluding, from among a candidate resource set comprising the third resource, one or more resources associated with the first priority. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive at least one configuration parameter for selection of one or more resources to communicate with a second wireless device. The wireless device may receive, via a first resource, control information indicating: a reservation of a second resource; and/or a first priority associated with the second resource. The wireless device may determine a received power range, from a set of received power ranges, comprising a value of a received power measurement of one or more feedback channel resources associated with the first resource. The wireless device may determine, based on received power range and based on at least one of the first priority or a second priority associated with a communication between the first wireless device and the second wireless device, a third resource. The wireless device may transmit, via the third resource, a message to the second wireless device. The wireless device may determine a candidate resource set comprising resources occurring in a selection time period, wherein the determining the third resource comprises selecting the third resource from the candidate resource set. The wireless device may determine a received power of one or more feedback channel resources associated with the second resource. The wireless device may determine the third resource based on the received power of the one or more feedback channel resources associated with the second resource. The one or more feedback channel resources may comprise one or more physical sidelink feedback channel (PSFCH) resources. The wireless device may determine, based on the received power range, a transmission power for transmission of the message. The wireless device may transmit the message using the transmission power. The at least one configuration parameter may indicate the first priority. The first priority may be higher than the second priority. The wireless device may determine the third resource by excluding, from among a candidate resource set comprising the third resource, one or more resources associated with the first priority. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive, for a resource selection procedure of a first sidelink transmission having a first priority, configuration parameters indicating a set of received power ranges associated with the first priority and a second priority. The wireless device may determine a candidate resource set comprising candidate resources in a selection window. The wireless device may receive, via a second resource, a sidelink control information (SCI) of a second sidelink transmission indicating: the second priority; and/or a resource reservation of a first resource. The wireless device may determine a received power range, from the set of received power ranges, including a value of a received power measurement of one or more physical sidelink feedback channel (PSFCH) resources associated with the second resource. The wireless device may exclude, based on the received power range, the first resource from the candidate resource set. The wireless device may transmit, via one or more resources of the candidate resource set other than the first resource, the first sidelink transmission. The configuration parameters may comprise: a sensing window; and/or the selection window. The wireless device may receive the SCI of the second sidelink transmission by receiving the SCI of the second sidelink transmissions in the sensing window. The wireless device may receive the configuration parameters by receiving one or more radio resource control (RRC) messages. The one or more RRC messages may comprise the configuration parameters. The one or more RRC messages may comprise one or more first parameters indicating a set of threshold values. The set of threshold values may comprise a first threshold value and a second threshold value. The received power range may be bounded by the first threshold value and the second threshold value. The wireless device may determine a probability for the excluding of the first resource from the candidate resource set based on the probability being corresponding to the received power range. The wireless device may exclude the first resource by excluding, based on the probability, the first resource from the candidate resource set. The wireless device may determine an offset value for the excluding of the first resource from the candidate resource set based on the offset value being corresponding to the received power range. The wireless device may exclude the first resource by excluding, based on a reference signal received power (RSRP) of the first sidelink transmission being higher than summation of the offset value and a RSRP threshold value, the first resource from the candidate resource set. The first sidelink transmission may comprise a same transport block (TB) as the second sidelink transmission. The first sidelink transmission may comprise a different TB than the second sidelink transmission. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive, for a resource selection procedure of a first sidelink transmission having a first priority, configuration parameters indicating a set of received power ranges associated with at least one of: the first priority; and/or a second priority. The wireless device may determine a candidate resource set comprising candidate resources in a selection window. The wireless device may receive, via a second resource, a sidelink control information (SCI) of a second sidelink transmission indicating: the second priority; and/or a resource reservation of a first resource. The wireless device may determine a received power range, from the set of received power ranges, including a value of a received power measurement of one or more physical sidelink feedback channel (PSFCH) resources associated with the second resource. The wireless device may exclude the first resource from the candidate resource set based on the received power range. The wireless device may transmit, via one or more resources of the candidate resource set other than the first resource, the first sidelink transmission. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive, for a resource selection procedure of a first sidelink transmission having a first priority, configuration parameters indicating a set of received power ranges associated with at least one of: the first priority; and/or a second priority. The wireless device may determine a candidate resource set comprising candidate resources in a selection window. The wireless device may receive, via a second resource, a sidelink control information (SCI) of a second sidelink transmission indicating: the second priority; and/or a resource reservation of a first resource. The wireless device may determine a received power range, from the set of received power ranges, comprising a value of a received power measurement of one or more physical sidelink feedback channel (PSFCH) resources associated with the second resource. The wireless device may determine a transmission power based on the received power range. The wireless device may transmit, via the first resource and with the transmission power, the first sidelink transmission. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive configuration parameters, for a resource selection procedure, comprising: a sensing window for sensing sidelink transmissions; a selection window for selecting resources for a first sidelink transmission having a first priority; and/or a set of threshold values comprising a first threshold value and a second threshold value. The set of threshold values may be associated with at least one of: the first priority; and/or a second priority. The wireless device may determine a candidate resource set comprising candidate resources in the selection window. The wireless device may receive, via a second resource in the sensing window, a sidelink control information (SCI) of a second sidelink transmission indicating: the second priority; and/or a resource reservation of a first resource. The wireless device may exclude the first resource from the candidate resource set based on: a measurement of one or more physical sidelink feedback channel (PSFCH) resources, associated with the second resource, being higher than the first threshold value; and/or the measurement of the one or more PSFCH resources being lower than the second threshold value. The wireless device may transmit, via one or more resources of the candidate resource set other than the first resource, the first sidelink transmission. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive, for a resource selection procedure, configuration parameters indicating: a sensing window for sensing sidelink transmissions; a selection window for selecting resources for a first sidelink transmission having a first priority; and/or a set of received power ranges associated with at least one of: the first priority; and/or a second priority. The wireless device may determine a candidate resource set comprising candidate resources in the selection window. The wireless device may receive, via a second resource in the sensing window, a sidelink control information (SCI) of a second sidelink transmission indicating: the second priority; and/or a resource reservation of a first resource. The wireless device may determine a received power range, from the set of received power ranges, including a value of a received power measurement of one or more physical sidelink feedback channel (PSFCH) resources associated with the second resource. The wireless device may exclude the first resource from the candidate resource set based on the received power range. The wireless device may transmit, via one or more resources of the candidate resource set other than the first resource, the first sidelink transmission. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

A wireless device may perform a method comprising multiple operations. The wireless device may receive, for a resource selection procedure of a first sidelink transmission having a first priority, configuration parameters indicating: a set of offset values associated with at least one of: the first priority value; and/or a second priority value; and/or a set of received power ranges associated to the set of offset values. The wireless device may determine a candidate resource set comprising candidate resources in a selection window. The wireless device may receive, via a second resource, a sidelink control information (SCI) of a second sidelink transmission indicating: the second priority; and/or a resource reservation of a first resource. The wireless device may determine a received power range, from the set of received power ranges, including a value of a received power measurement of one or more physical sidelink feedback channel (PSFCH) resources associated with the second resource. The wireless device may exclude, based on an offset value associated with the received power range, the first resource from the candidate resource set. The wireless device may transmit, via one or more resources of the candidate resource set other than the first resource, the first sidelink transmission. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and at least one of: a second wireless device configured to receive the message and/or a sidelink transmission, and/or a base station configured to send configuration parameters. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The technologies as described herein may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
  receiving, by a first wireless device from a second wireless device and via a physical sidelink feedback channel (PSFCH), feedback associated with a first resource, wherein the first resource is for a first sidelink transmission to the second wireless device;
  determining, for a second sidelink transmission via a second resource and based on the feedback, that the first resource overlaps the second resource; and
  transmitting the second sidelink transmission via a third resource selected from candidate resources of a candidate resource set that excludes at least a portion of the first resource that overlaps with the second resource.

2. The method of claim 1, wherein the first sidelink transmission is from a third wireless device to the second wireless device.

3. The method of claim 1, wherein the second sidelink transmission is to a third wireless device.

4. The method of claim 1, wherein the determining that the first resource overlaps with the second resource comprises determining that a received power of the feedback, associated with the first resource, is greater than a threshold.

5. The method of claim 1, further comprising receiving control information indicating assignment of the first resource for the first sidelink transmission to the second wireless device.

6. The method of claim 1, further comprising receiving, by the first wireless device, at least one configuration parameter for selection of one or more resources for communication, wherein the at least one configuration parameter indicates a sensing time period and a selection time period, wherein:
the receiving the feedback comprises receiving the feedback in the sensing time period; and
the transmitting the second sidelink transmission via the third resource comprises transmitting the second sidelink transmission in the selection time period.

7. The method of claim 1, further comprising:
receiving an indication of a priority associated with the first resource, wherein the transmitting the second sidelink transmission via the third resource is further based on at least one of:
the priority associated with the first resource; or
a priority associated with the second sidelink transmission.

8. The method of claim 1, wherein the determining that the first resource overlaps the second resource comprises determining that the first resource overlaps the second resource in at least one of time domain or frequency domain.

9. A first wireless device comprising:
one or more processors; and
memory storing instructions that, when executed by the one or more processors, cause the first wireless device to:
receive, from a second wireless device and via a physical sidelink feedback channel (PSFCH), feedback associated with a first resource, wherein the first resource is for a first sidelink transmission to the second wireless device;
determine, for a second sidelink transmission via a second resource and based on the feedback, that the first resource overlaps the second resource; and
transmit the second sidelink transmission via a third resource selected from candidate resources of a candidate resource set that excludes at least a portion of the first resource that overlaps with the second resource.

10. The first wireless device of claim 9, wherein the first sidelink transmission is from a third wireless device to the second wireless device.

11. The first wireless device of claim 9, wherein the second sidelink transmission is to a third wireless device.

12. The first wireless device of claim 9, wherein the instructions that, when executed by the one or more processors, cause the first wireless device to determine that the first resource overlaps with the second resource, cause the first wireless device to determine that the first resource overlaps with the second resource by determining that a received power of the feedback, associated with the first resource, is greater than a threshold.

13. The first wireless device of claim 9, wherein the instructions, when executed by the one or more processors, further cause the first wireless device to receive control information indicating assignment of the first resource for the first sidelink transmission to the second wireless device.

14. The first wireless device of claim 9, wherein the instructions, when executed by the one or more processors, further cause the first wireless device to receive at least one configuration parameter for selection of one or more resources for communication, wherein the at least one configuration parameter indicates a sensing time period and a selection time period; and
wherein the instructions that, when executed by the one or more processors, cause the wireless device to receive the feedback, cause the wireless device to receive the feedback in the sensing time period; and
wherein the instructions that, when executed by the one or more processors, cause the wireless device to transmit the second sidelink transmission via the third resource, cause the wireless device to transmit the second sidelink transmission via the third resource in the selection time period.

15. The first wireless device of claim 9, wherein the instructions, when executed by the one or more processors, further cause the first wireless device to receive an indication of a priority associated with the first resource; and
wherein the instructions that, when executed by the one or more processors, cause the wireless device to transmit the second sidelink transmission via the third resource, cause the wireless device to transmit the second sidelink transmission via the third resource based on at least one of:
the priority associated with the first resource; or
a priority associated with the second sidelink transmission.

16. The first wireless device of claim 9, wherein the instructions that, when executed by the one or more processors, cause the first wireless device to determine that the first resource overlaps the second resource, cause the first wireless device to determine that the first resource overlaps the second resource by determining that the first resource overlaps the second resource in at least one of time domain or frequency domain.

17. A non-transitory computer readable medium storing instructions that, when executed, configure a first wireless device to:
receive, from a second wireless device and via a physical sidelink feedback channel (PSFCH), feedback associated with a first resource, wherein the first resource is for a first sidelink transmission to the second wireless device;
determine, for a second sidelink transmission via a second resource and based on the feedback, that the first resource overlaps the second resource; and
transmit the second sidelink transmission via a third resource selected from candidate resources of a candidate resource set that excludes at least a portion of the first resource that overlaps with the second resource.

18. The non-transitory computer readable medium of claim 17, wherein the first sidelink transmission is from a third wireless device to the second wireless device.

19. The non-transitory computer readable medium of claim 17, wherein the second sidelink transmission is to a third wireless device.

20. The non-transitory computer readable medium of claim 17, wherein the instructions that, when executed, configure the first wireless device to determine that the first resource overlaps with the second resource, configure the first wireless device to determine that the first resource overlaps with the second resource by determining that a received power of the feedback, associated with the first resource, is greater than a threshold.

21. The non-transitory computer readable medium of claim 17, wherein the instructions, when executed, further configure the first wireless device to receive control information indicating assignment of the first resource for the first sidelink transmission to the second wireless device.

22. The non-transitory computer readable medium of claim 17, wherein the instructions, when executed, further configure the first wireless device to receive at least one configuration parameter for selection of one or more resources for communication, wherein the at least one configuration parameter indicates a sensing time period and a selection time period; and wherein the instructions that, when executed, configure the first wireless device to receive the feedback, configure the first wireless device to receive the feedback in the sensing time period; and wherein the instructions that, when executed, configure the first wireless device to transmit the second sidelink transmission via the third resource, configure the first wireless device to transmit the second sidelink transmission via the third resource in the selection time period.

23. The non-transitory computer readable medium of claim 17, wherein the instructions, when executed, configure the first wireless device to receive an indication of a priority associated with the first resource; and wherein the instructions that, when executed, configure the first wireless device to transmit the second sidelink transmission via the third resource, configure the first wireless device to transmit the second sidelink transmission via the third resource based on at least one of:
        the priority associated with the first resource; or
        a priority associated with the second sidelink transmission.

24. The non-transitory computer readable medium of claim 17, wherein the instructions that, when executed, configure the first wireless device to determine that the first resource overlaps the second resource, configure the first wireless device to determine that the first resource overlaps the second resource in at least one of time domain or frequency domain.

\* \* \* \* \*